(12) United States Patent
Hsu et al.

(10) Patent No.: US 11,256,069 B2
(45) Date of Patent: Feb. 22, 2022

(54) IMAGE CAPTURING OPTICAL SYSTEM, IMAGING APPARATUS AND ELECTRONIC DEVICE

(71) Applicant: LARGAN PRECISION CO., LTD., Taichung (TW)

(72) Inventors: Po-Lun Hsu, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 227 days.

(21) Appl. No.: 16/731,212

(22) Filed: Dec. 31, 2019

(65) Prior Publication Data

US 2020/0150394 A1    May 14, 2020

Related U.S. Application Data

(63) Continuation of application No. 16/384,036, filed on Apr. 15, 2019, now Pat. No. 10,564,403, which is a continuation of application No. 15/691,928, filed on Aug. 31, 2017, now Pat. No. 10,310,227.

(30) Foreign Application Priority Data

Feb. 18, 2017    (TW) .................. 106105479

(51) Int. Cl.
    *G02B 13/00*    (2006.01)
    *G02B 9/64*    (2006.01)

(52) U.S. Cl.
    CPC ........... *G02B 13/0045* (2013.01); *G02B 9/64* (2013.01)

(58) Field of Classification Search
    CPC ............................. G02B 13/0045; G02B 9/64
    See application file for complete search history.

(56) References Cited

U.S. PATENT DOCUMENTS

| 3,556,642 | A  | 1/1971  | Tibbetts |
| 6,144,499 | A  | 11/2000 | Yokota et al. |
| 9,366,845 | B2 | 6/2016  | Huang |
| 9,606,328 | B2 | 3/2017  | Chen |
| 9,753,258 | B2 | 9/2017  | Hashimoto |
| 9,904,014 | B1 | 2/2018  | Chang et al. |
| 9,961,244 | B2 | 5/2018  | Liao et al. |
| 10,191,248 | B2 | 1/2019 | Hashimoto |
| 2013/0314588 | A1 | 11/2013 | Kim |
| 2014/0211324 | A1 | 7/2014 | Ishizaka |
| 2015/0247990 | A1 | 9/2015 | Kubota et al. |
| 2016/0033742 | A1 | 2/2016 | Huang |
| 2016/0109687 | A1 | 4/2016 | Son |

(Continued)

FOREIGN PATENT DOCUMENTS

| CN | 204314533 U | 5/2015 |
| CN | 204832662 U | 12/2015 |

(Continued)

*Primary Examiner* — Jack Dinh
(74) *Attorney, Agent, or Firm* — McClure, Qualey & Rodack, LLP

(57) ABSTRACT

An image capturing optical system includes seven lens elements, the seven lens elements being, in order from an object side to an image side, a first lens element, a second lens element, a third lens element, a fourth lens element, a fifth lens element, a sixth lens element and a seventh lens element. An image-side surface of the fifth lens element is convex in a paraxial region thereof. An image-side surface of the sixth lens element is concave in a paraxial region thereof. The seventh lens element has negative refractive power.

25 Claims, 32 Drawing Sheets

(56) References Cited

U.S. PATENT DOCUMENTS

| | | |
|---|---|---|
| 2016/0124191 A1 | 5/2016 | Hashimoto |
| 2016/0231533 A1 | 8/2016 | Mercado |
| 2016/0241756 A1 | 8/2016 | Chen |
| 2016/0282587 A1 | 9/2016 | Hashimoto |
| 2016/0320593 A1 | 11/2016 | Baik |
| 2016/0320594 A1 | 11/2016 | Baik |
| 2017/0082834 A1 | 3/2017 | Tang et al. |
| 2017/0082835 A1 | 3/2017 | Tang et al. |
| 2017/0090157 A1 | 3/2017 | Tang et al. |
| 2017/0090158 A1 | 3/2017 | Tang et al. |
| 2017/0131520 A1 | 5/2017 | Tang et al. |
| 2017/0131521 A1 | 5/2017 | Tang et al. |
| 2017/0139185 A1 | 5/2017 | Tang et al. |
| 2017/0139186 A1 | 5/2017 | Tang et al. |
| 2017/0168267 A1 | 6/2017 | Tang et al. |
| 2017/0168268 A1 | 6/2017 | Tang et al. |
| 2017/0219798 A1 | 8/2017 | Park |
| 2017/0248771 A1 | 8/2017 | Tang et al. |
| 2017/0248772 A1 | 8/2017 | Tang et al. |
| 2017/0248773 A1 | 8/2017 | Tang et al. |
| 2017/0248774 A1 | 8/2017 | Tang et al. |
| 2017/0254981 A1 | 9/2017 | Lai et al. |
| 2017/0254982 A1 | 9/2017 | Lai et al. |
| 2017/0254983 A1 | 9/2017 | Lai et al. |
| 2017/0254984 A1 | 9/2017 | Lai et al. |
| 2017/0254985 A1 | 9/2017 | Lai et al. |
| 2017/0254986 A1 | 9/2017 | Lai et al. |
| 2017/0254987 A1 | 9/2017 | Lai et al. |
| 2017/0254988 A1 | 9/2017 | Lai et al. |
| 2017/0285304 A1 | 10/2017 | Lai et al. |
| 2017/0285305 A1 | 10/2017 | Lai et al. |
| 2017/0329106 A1 | 11/2017 | Lai et al. |
| 2017/0329107 A1 | 11/2017 | Lai et al. |
| 2017/0336605 A1 | 11/2017 | Lai et al. |
| 2017/0336606 A1 | 11/2017 | Lai et al. |
| 2017/0357081 A1 | 12/2017 | Dai et al. |
| 2018/0011296 A1 | 1/2018 | Lai et al. |
| 2018/0011297 A1 | 1/2018 | Lai et al. |
| 2018/0164544 A1 | 6/2018 | Kwak et al. |
| 2018/0188482 A1 | 7/2018 | Jhang et al. |
| 2018/0188485 A1 | 7/2018 | Fan et al. |
| 2018/0196225 A1 | 7/2018 | Chang et al. |
| 2018/0196226 A1 | 7/2018 | Chang et al. |
| 2018/0196233 A1 | 7/2018 | Chang et al. |
| 2018/0196234 A1 | 7/2018 | Chang et al. |
| 2018/0196235 A1 | 7/2018 | Chang et al. |
| 2018/0196239 A1 | 7/2018 | Chang et al. |
| 2018/0231748 A1 | 8/2018 | Chang et al. |

FOREIGN PATENT DOCUMENTS

| | | |
|---|---|---|
| CN | 205091499 U | 3/2016 |
| CN | 106896477 A | 6/2017 |
| CN | 106896478 A | 6/2017 |
| JP | 58-075107 A | 5/1983 |
| JP | 200081569 A | 3/2000 |
| JP | 2015-072402 A | 4/2015 |
| JP | 2015-072404 A | 4/2015 |
| JP | 2015-072405 A | 4/2015 |
| JP | 2016-085431 A | 5/2016 |
| JP | 201671115 A | 5/2016 |
| TW | I545366 B | 8/2016 |
| TW | 201641987 A | 12/2016 |
| TW | 201721214 A | 6/2017 |
| TW | M544000 U | 6/2017 |
| WO | 2016-109938 A1 | 7/2016 |

IMAGE CAPTURING OPTICAL SYSTEM, IMAGING APPARATUS AND ELECTRONIC DEVICE

RELATED APPLICATIONS

This application is a continuation of U.S. application Ser. No. 16/384,036, filed Apr. 15, 2019, which is a continuation of U.S. application Ser. No. 15/691,928, filed Aug. 31, 2017, U.S. Pat. No. 10,310,227 Issued on Jun. 4, 2019, which claims priority to Taiwan Application Serial Number 106105479, filed Feb. 18, 2017, which are herein incorporated by reference.

BACKGROUND

Technical Field

The present disclosure relates to an image capturing optical system and an imaging apparatus. More particularly, the present disclosure relates to an image capturing optical system and an imaging apparatus with a compact size applicable to electronic devices.

Description of Related Art

With the wider application of photographing modules, installing photographing modules in various smart electronic devices, portables, mobile devices, recognition devices, entertainment systems, sporting devices and smart home assisting systems is becoming a major trend in developments for future technology, especially portables with high image quality by popular demand. In order to obtain more extensive experiences in utilizations, smart devices with one, two or more than three lens assemblies are becoming the market mainstream, and various photographing modules with different features are developed in response to different demands.

In order to obtain high resolution, the lens design of conventional compact lens assemblies often has a limited range of the light entry into the lens assemblies, so that the image would be too dark to identify in night or low light indoor settings due to overly short exposure time, or the image would be blurred due to overly long exposure time as well as lens shakes. Most photographing lens assemblies with higher amount of incident light on the market are for digital single-lens reflex cameras (DSLR), which have a higher price tag, excessive size and are difficult to carry, so that conventional optical systems cannot satisfy the current trend of the technological developments.

SUMMARY

According to one aspect of the present disclosure, an image capturing optical system includes seven lens elements, the seven lens elements being, in order from an object side to an image side, a first lens element, a second lens element, a third lens element, a fourth lens element, a fifth lens element, a sixth lens element and a seventh lens element. Each of the seven lens elements has an object-side surface towards the object side and an mage-side surface towards the image side. An image-side surface of the fifth lens element is convex in a paraxial region thereof. An image-side surface of the sixth lens element is concave in a paraxial region thereof. The seventh lens element has negative refractive power. Each of at least three of the first lens element, the second lens element, the third lens element, the fourth lens element, the fifth lens element, the sixth lens element and the seventh lens element has at least one surface being aspheric, and at least one surface of at least one of the first lens element, the second lens element, the third lens element, the fourth lens element, the fifth lens element, the sixth lens element and the seventh lens element includes at least one inflection point. When an axial distance between an object-side surface of the first lens element and an image surface is TL, an entrance pupil diameter of the image capturing optical system is EPD, a focal length of the first lens element is f1, a focal length of the third lens element is f3, a curvature radius of an object-side surface of the third lens element is R5, a curvature radius of an image-side surface of the third lens element is R6, a curvature radius of an object-side surface of the seventh lens element is R13, and a curvature radius of an image-side surface of the seventh lens element is R14, the following conditions are satisfied:

$1.05 < TL/EPD < 2.38;$ $-1.50 < f3/f1 < 1.55;$ $-0.70 < R14/R13 < 1.40;$ and $|R5/R6| < 4.50.$ According to one aspect of the present disclosure, an image capturing optical system includes seven lens elements, the seven lens elements being, in order from an object side to an image side, a first lens element, a second lens element, a third lens element, a fourth lens element, a fifth lens element, a sixth lens element and a seventh lens element. Each of the seven lens elements has an object-side surface towards the object side and an image-side surface towards the image side. The second lens element has negative refractive power. The fifth lens element has positive refractive power. An image-side surface of the sixth lens element is concave in a paraxial region thereof. The seventh lens element with negative refractive power has an image-side surface being concave n a paraxial region thereof. Each of at least three of the first lens element, the second lens element, the third lens element, the fourth lens element, the fifth lens element, the sixth lens element and the seventh lens element has at least one surface being aspheric, and at least one surface of at least one of the first lens element, the second lens element, the third lens element, the fourth lens element, the fifth lens element, the sixth lens element and the seventh lens element includes at least one inflection point. When an axial distance between an object-side surface of the first lens element and an image surface is TL, an entrance pupil diameter of the image capturing optical system is EPD, a focal length of the first lens element is f1, and a focal length of the third lens element is f3, the following conditions are satisfied:

$1.05 < TL/EPD < 2.38;$ and $-7.0 < f3/f1 < 1.56.$

According to another aspect of the present disclosure, an imaging apparatus includes the image capturing optical system of the aforementioned aspect, a driving apparatus and an image sensor, wherein the driving apparatus is connected to the image capturing optical system, the image sensor is disposed on an image surface of the image capturing optical system.

According to another aspect of the present disclosure, an electronic device includes the imaging apparatus of the aforementioned aspect.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
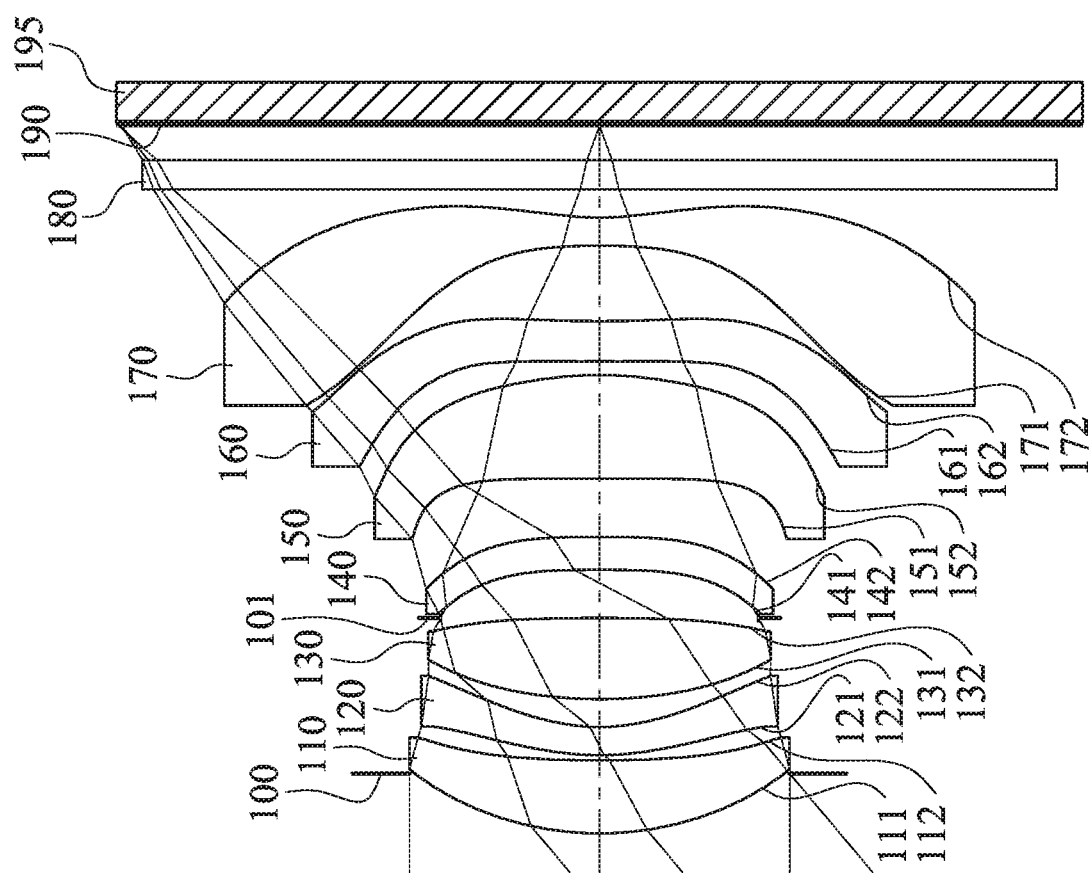
FIG. 1 is a schematic view of an imaging apparatus according to the 1st embodiment of the present disclosure.

An Image capturing optical system includes seven lens elements, the seven lens elements being, in order from an object side to an image side, a first lens element, a second lens element, a third lens element, a fourth lens element, a fifth lens element, a sixth lens element and a seventh lens element, wherein each of the seven lens elements has an object-side surface towards the object side and an image-side surface towards the image side.

One surface of the first lens element can be concave in a paraxial region thereof, and the other surface of the first lens element can be convex in a paraxial region thereof; that is, the first lens element can be meniscus in a paraxial region thereof. Therefore, it is favorable for the light convergence in tangential and sagittal directions by controlling the shape and strength of the refractive power of the first lens element, so that the astigmatism of the image capturing optical system can be corrected.

The second lens element can have negative refractive power, so that aberrations generated from the first lens element can be balanced, and chromatic aberration of the image capturing optical system can be corrected, so as to avoid the image overlapping caused by different image locations of different color lights captured by the electronic device.

The third lens element can have positive refractive power, so that it Is favorable for providing the light converging ability on the object side of the image capturing optical system so as to reduce the total track length and stay compact.

The fifth lens element can have positive refractive power, so that it is favorable for providing the converging ability on the image side of the image capturing optical system so as to allow enlarged field of view for expanding utilizations. The fifth lens element can have an image-side surface being convex in a paraxial region thereof, so that the symmetry of the image capturing optical system can be enhanced for avoiding excessive aberrations.

The sixth lens element has an image-side surface being concave in a paraxial region thereof. Therefore, it is favorable for controlling the back focal length along with the seventh lens element, so to avoid the size of the image capturing optical system being too large and hard to reduce.

The seventh lens element with negative refractive power can have an image-side surface being concave in a paraxial region thereof, so that the back focal length of the image capturing optical system can be controlled effectively so as to allow installation in a compact electronic device. Furthermore, the image-side surface of the seventh lens element can include at least one convex shape, so that it is favorable for correcting the Petzval field, moderating distortion, avoiding vignetting in an off-axial region of the image and correcting off-axial aberrations.

Each of at least three of the first lens element, the second lens element, the third lens element, the fourth lens element, the fifth lens element, the sixth lens element and the seventh lens element has at least one surface being aspheric. Therefore, it is favorable for the configuration of the lens elements of the entire image capturing optical system so as to satisfy the demands of better balance between aberrations and shorter total track length.

At least one surface of at least one of the first lens element, the second lens element, the third lens element, the fourth lens element, the fifth lens element, the sixth lens element and the seventh lens element includes at least one inflection point. Therefore, it is favorable for correcting off-axial aberrations and reducing the total track length so as to satisfy the demand for compact devices.

When an axial distance between an object-side surface of the first lens element and an image surface is TL, and an entrance pupil diameter of the image capturing optical system is EPD, the following condition is satisfied: $1.05 < TL/EPD < 2.38$. Therefore, it is favorable for controlling the ratio of the incident light range and the total track length of the image capturing optical system so as to allow sufficient light on the image sensor while obtaining high image brightness and a compact optical system. Preferably, the following condition can be satisfied: $1.10 < TL/EPD < 2.20$. More preferably, the following condition can be satisfied: $1.15 < TL/EPD < 2.0$. Further, the following condition can be satisfied: $1.20 < TL/EPD < 1.90$.

When a focal length of the first lens element is f1, and a focal length of the third lens element is f3, the following condition is satisfied: $-7.0 < f3/f1 < 1.55$. Therefore, it is favorable for correcting the refractive powers of the first lens element and the third lens element so as to enhance the system controlling ability of the third lens element for a wider adaptation in different applications. Preferably, the following condition can be satisfied: $-1.50 < f3/f1 < 1.55$. More preferably, the following condition can be satisfied: $-0.80 < f3/f1 < 1.55$. Further, the following condition can be satisfied: $0 < f3/f1 < 1.45$. Moreover, the following condition can be satisfied: $0.50 < f3/f1 < 1.35$.

When a curvature radius of an object-side surface of the seventh lens element is R13, and a curvature radius of the image-side surface of the seventh lens element is R14, the following condition is satisfied: $-0.70 < R14/R13 < 1.40$. Therefore, it is favorable for obtaining sufficient curvature of the image-side surface of the seventh lens element so as to obtain the compact size of the Image capturing optical system by controlling the back focal length thereof. Preferably, the following condition can be satisfied: $-0.50 < R14/R13 < 1.0$.

When a curvature radius of an object-side surface of the third lens element is R5, and a curvature radius of an image-side surface of the third lens element is R6, the following condition is satisfied: $|R5/R6| < 4.50$. Therefore, it is favorable for enhancing the controlling ability of the object-side surface of the third lens element and the ability of aberration correction of the image-side surface of the third lens element so as to obtain better image quality. Preferably, the following condition can be satisfied: $|R5/R6| < 2.50$.

When a focal length of the image capturing optical system is f, and the entrance pupil diameter of the image capturing optical system is EPD, the following condition is satisfied: $0.75 < f/EPD < 1.65$. Therefore, it is favorable for improving the light absorption of the image capturing optical system so as to obtain a clearer captured image. Preferably, the following condition can be satisfied: $0.85 < f/EPD < 1.55$. More preferably, the following condition can be satisfied: $0.90 < f/EPD < 1.50$. Further, the following condition can be satisfied: $0.95 < f/EPD < 1.45$. Moreover, the following condition can be satisfied: $0.95 < f/EPD < 1.35$. Furthermore, the following condition can be satisfied: $0.95 < f/EPD < 1.30$. Furthermore, the following condition can be satisfied: $0.95 < f/EPD < 1.25$.

When a curvature radius of the object-side surface of the first lens element is R1, and the curvature radius of the image-side surface of the third lens element is R6, the following condition is satisfied: $R1/R6 < 0.25$. Therefore, it is favorable for enhancing the surface curvature strength of the object-side surface of the first lens element and moderating the curvature of the image-side surface of the third lens element so as to improve aberration corrections and reduce the generation of the stray light. Preferably, the following condition can be satisfied: $-8.0 < R1/R6 < 0.25$. More preferably, the following condition can be satisfied: $-0.50 < R1/R6 < 0.25$.

When the axial distance between the object-side surface of the first lens element and the image surface is TL, a focal length of the image capturing optical system is f, the entrance pupil diameter of the image capturing optical system is EPD, and a maximum image height of the image capturing optical system is ImgH, the following condition is satisfied: $(TL \times f)/(EPD \times ImgH) < 2.50$. Therefore, it is favorable for effectively balancing optical properties of the image capturing optical system so as to obtain compactness and a sufficient light absorbing area, thus the image can be brighter and dearer. Preferably, the following condition can be satisfied: $(TL \times f)/(EPD \times ImgH) < 2.35$.

Each of at least two of the first lens element, the second lens element, the third lens element, the fourth lens element, the fifth lens element, the sixth lens element and the seventh lens element has an Abbe number which is smaller than 25.0. Therefore, chromatic aberration of the image capturing optical system can be corrected, and the material characteristics of the lens elements can be controlled effectively, so that the density difference between each lens element and air can be increased so as to enhance the refractive power of the lens element. Thus, the effect of the light deflection can be maintained in smaller space with more moderate curvature of lens elements so as to reduce the total track length.

When the focal length of the image capturing optical system is f, and a focal length of the second lens element is f2, the following condition is satisfied: $0.40 < |f/f2| < 1.20$. Therefore, it is favorable for configuring the strength of the refractive power of the second lens element so as to avoid insufficient light path control ability caused by refractive power of the second lens element being too small or the stray light from excessive refractive power.

When a maximum of chief ray angles of the image capturing optical system is CRAmax, the following condition is satisfied: $35.0 \text{ degrees} < CRAmax < 50.0 \text{ degrees}$. Therefore, it is favorable for increasing the image brightness by enlarging light absorbing areas of the image in limited space.

When a vertical distance between a non-axial critical point on the image-side surface of the sixth lens element and an optical axis is Yc62, and a vertical distance between a non-axial critical point on the image-side surface of the seventh lens element and the optical axis is Yc72, the following condition is satisfied: 0.50<Yc72/Yc62<1.85. Therefore, it is favorable for improving aberration corrections in the off-axial region of the image capturing optical system so as to avoid the deformation or insufficient brightness of the off-axial image.

When the curvature radius of the object-side surface of the first lens element is R1, and a curvature radius of an image-side surface of the second lens element is R4, the following condition is satisfied: −1.50<R4/R1<3.0. Therefore, it is favorable for controlling the surface shape of the lens elements on the object side of the image capturing optical system, so that the combined configuration of the first lens element and the second lens element can be enhanced which is complementary, thus aberrations can be corrected and the image quality can be improved.

When a curvature radius of an object-side surface of the second lens element is R3, and an axial distance between the object-side surface of the first lens element and the image-side surface of the seventh lens element is TD, the following condition is satisfied: −0.70<R3/TD<0.80. Therefore, it is favorable for arranging the light path of the image capturing optical system by improving the shape variation of the object-side surface of the second lens element.

When an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and an axial distance between the sixth lens element and the seventh lens element is T67, the following condition is satisfied: 7.50<(T23+T34+T45+T67)/(T12+T56)<45.0. Therefore, it is favorable for effectively balancing the space arrangement so as to obtain preferable space utilization efficiency.

The image capturing optical system can further include an aperture stop located on an object side of the second lens element, wherein when an axial distance between the aperture stop and the image-side surface of the seventh lens element is SD, and the axial distance between the object-side surface of the first lens element and the image-side surface of the seventh lens element is TD, the following condition is satisfied: 0.80<SD/TD<0.98. Therefore, it is favorable for balancing the field of view and the total track length by controlling the position of the aperture stop so as to obtain compactness of the electronic device and improved utility.

When the curvature radius of the image-side surface of the seventh lens element is R14, and the entrance pupil diameter of the image capturing optical system is EPD, the following condition is satisfied: 0.10<R14/EPD<1.0. Therefore, it is favorable for reducing the total track length of the image capturing optical system by effectively controlling the back focal length thereof and avoiding vignetting by obtaining sufficient light in to the image capturing optical system so as to enhance image quality.

When the axial distance between the object-side surface of the first lens element and the image surface is TL, the following condition is satisfied: TL<7.5 mm. Therefore, it is favorable for the compactness of the image capturing optical system by effectively controlling the total track length thereof.

When a vertical distance between a non-axial critical point on the image-side surface of the seventh lens element and the optical axis is Yc72, and the focal length of the image capturing optical system is f, the following condition is satisfied: 0.10<Yc72/f<0.85. Therefore, it is favorable for controlling the angle of the off-axial light, correcting off-axial aberrations, and maintaining sufficient image height and image capturing range.

When the focal length of the first lens element is f1, and a focal length of the fourth lens element is f4, the following condition is satisfied: −0.30<f1/f4<0.30. Therefore, it is favorable for controlling refractive power of the first lens element in the image capturing optical system and optimizing aberration corrections of the fourth lens element so as to reduce the total track length and enhance the image quality.

When the axial distance between the second lens element and the third lens element is T23, and a central thickness of the second lens element is CT2, the following condition is satisfied: 0.40<T23/CT2<1.60. Therefore, the spacing between the second lens element and the third lens element is favorable for lens assembling, and it is also favorable for avoiding the second lens element being too thin, which may affect lens assembly strength and yield rate of the product, and for avoiding the second lens element being too thick, which may affect the molding uniformity of the lens element.

When the axial distance between the sixth lens element and the seventh lens element is T67, and a central thickness of the sixth lens element is CT6, the following condition is satisfied: 0.70<T67/CT6<5.50. Therefore, it is favorable for balancing the thickness of the sixth lens element and obtaining sufficient space between the sixth lens element and the seventh lens element which is for moderating the light path, so that excessive aberrations can be avoided with enhanced stability.

When the axial distance between the object-side surface of the first lens element and the image surface is TL, and a maximum image height of the image capturing optical system is ImgH, the following condition is satisfied: TL/ImgH<2.0. Therefore, it is favorable for obtaining the compactness and sufficient light absorbing range so as to enhance the image brightness and the image quality.

When the half of a maximum field of view of the image capturing optical system is HFOV, the following condition is satisfied: 0.70<tan(HFOV)<1.20. Therefore, it is favorable for controlling the image capturing range of the image capturing optical system so as to satisfy wider application demands.

Moreover, the image capturing optical system of the present disclosure can include the aforementioned seven lens elements while optionally including other elements, such as cover glasses, filters, fixing elements, light blocking sheets, image sensors, etc., and will not be limited thereto.

Each of the aforementioned features of the image capturing optical system can be utilized in numerous combinations, so as to achieve the corresponding effects.

According to the image capturing optical system of the present disclosure, the lens elements thereof can be made of glass or plastic materials. When the lens elements are made of plastic materials, manufacturing costs can be effectively reduced. When the lens elements are made of glass materials, the distribution of the refractive power of the image capturing optical system may be more flexible to design. Furthermore, surfaces of each lens element can be arranged to be aspheric, since the aspheric surface of the lens element is easy to form a shape other than a spherical surface so as to have more controllable variables for eliminating aberrations thereof, and to further decrease the required amount of lens elements in the image capturing lens system. Therefore, the total track length of the image capturing optical system can also be reduced.

According to the image capturing optical system of the present disclosure, each of an object-side surface and an image-side surface has a paraxial region and an off-axial region. The paraxial region refers to the region of the surface where light rays travel close to an optical axis, and the off-axial region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. According to the image capturing optical system of the present disclosure, the refractive power or the focal length of a lens element being positive or negative may refer to the refractive power or the focal length in a paraxial region of the lens element.

According to the image capturing optical system of the present disclosure, the image capturing optical system can include at least one stop, such as an aperture stop, a glare stop or a field stop. Said glare stop or said field stop is for eliminating the stray light and thereby improving the image resolution thereof.

According to the image capturing optical system of the present disclosure, the image surface of the image capturing optical system, based on the corresponding image sensor, can be flat or curved. In particular, the image surface can be a concave curved surface facing towards the object side.

According to the image capturing optical system of the present disclosure, an aperture stop can be configured as a front stop or a middle stop. A front stop disposed between an object and the first lens element can provide a longer distance between an exit pupil of the image capturing optical system and the image surface, and thereby obtains a telecentric effect and improves the image-sensing efficiency of the image sensor, such as CCD or CMOS. A middle stop disposed between the first lens element and the image surface is favorable for enlarging the field of view of the image capturing optical system and thereby provides a wider field of view for the same.

According to the image capturing optical system of the present disclosure, a critical point is a non-axial point of the lens surface where its tangent is perpendicular to the optical axis, wherein a convex critical point is a critical point located on a convex shape of the lens surface, and the shape of the critical point (convex or concave) is determined by the positive or negative sign of the curvature at the critical point.

According to the image capturing optical system of the present disclosure, the image capturing lens system can be applied to 3D (three-dimensional) Image capturing applications, in products such as digital cameras, mobile devices, digital tablets, smart TVs, surveillance systems, motion sensing input devices, driving recording systems, rearview camera systems, and wearable devices.

According to the present disclosure, an imaging apparatus is provided. The imaging apparatus includes the aforementioned image capturing optical system, a driving apparatus and an image sensor, wherein the driving apparatus is connected to the image capturing optical system, and the image sensor is disposed on the image side of the aforementioned image capturing optical system, that is, the image sensor can be disposed on or near the image surface of the aforementioned image capturing optical system. It is favorable for effectively reducing the back focal length of the image capturing optical system by the surface shapes of the sixth lens element and the seventh lens element, and the refractive power of the seventh lens element. Preferably, the imaging apparatus can further include a barrel member, a holder member or a combination thereof.

According to the present disclosure, an electronic device is provided, which includes the aforementioned image capturing apparatus. Preferably, the electronic device can further include but not limited to a control unit, a display, a storage unit, a random access memory unit (RAM) or a combination thereof.

According to the above description of the present disclosure, the following 1st-16th specific embodiments are provided for further explanation.

1st Embodiment

Figure 2:
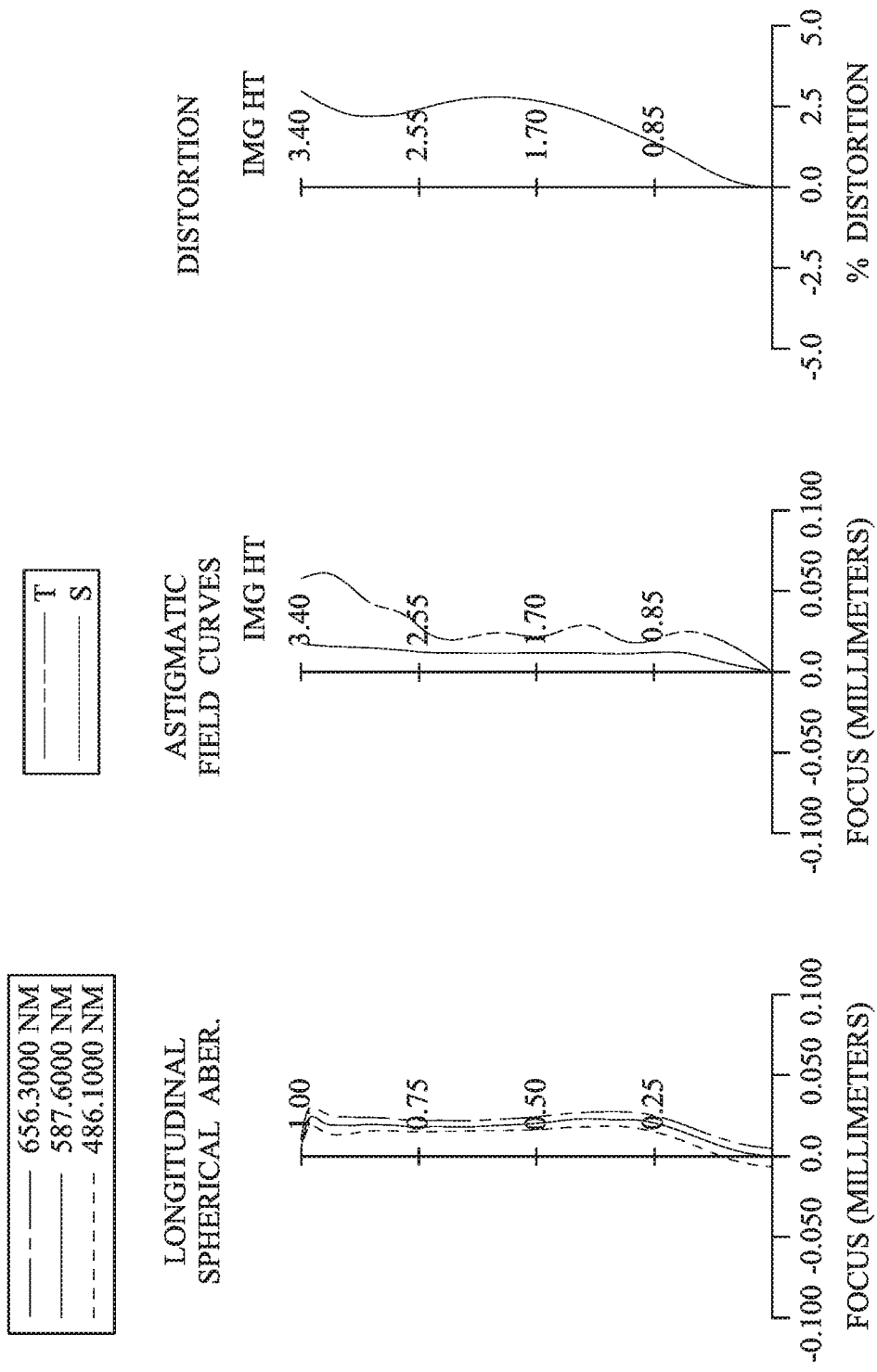
FIG. 2 shows spherical aberration curves, astigmatic field curves and a distortion curve of the imaging apparatus according to the 1st embodiment.

FIG. 1 is a schematic view of an imaging apparatus according to the 1st embodiment of the present disclosure. FIG. 2 shows spherical aberration curves, astigmatic field curves and a distortion curve of the imaging apparatus according to the 1st embodiment. In FIG. 1, the imaging apparatus includes an image capturing optical system (its reference numeral is omitted) and an image sensor 195. The image capturing optical system includes, in order from an object side to an image side, an aperture stop 100, a first lens element 110, a second lens element 120, a third lens element 130, a stop 101, a fourth lens element 140, a fifth lens element 150, a sixth lens element 160, a seventh lens element 170, a filter 180 and an image surface 190, wherein the image sensor 195 is disposed on the image surface 190 of the image capturing optical system. The image capturing optical system includes seven lens elements (110, 120, 130, 140, 150, 160 and 170) without additional one or more lens elements inserted between the first lens element 110 and the seventh lens element 170, and each of the seven lens elements has an object-side surface towards the object side and an image-side surface towards the image side.

The first lens element 110 with positive refractive power has an object-side surface 111 being convex in a paraxial region thereof and an image-side surface 112 being concave in a paraxial region thereof. The first lens element 110 is made of a plastic material, and has the object-side surface 111 and the image-side surface 112 being both aspheric. Furthermore, the image-side surface 112 of the first lens element 110 includes at least one inflection point.

The second lens element 120 with negative refractive power has an object-side surface 121 being convex in a paraxial region thereof and an image-side surface 122 being concave in a paraxial region thereof. The second lens element 120 is made of plastic material, and has the object-side surface 121 and the image-side surface 122 being both aspheric. Furthermore, each of the object-side surface 121 and the image-side surface 122 of the second lens element 120 includes at least one inflection point.

The third lens element 130 with positive refractive power has an object-side surface 131 being convex in a paraxial region thereof and an image-side surface 132 being convex in a paraxial region thereof. The third lens element 130 is made of plastic material, and has the object-side surface 131 and the image-side surface 132 being both aspheric.

The fourth lens element 140 with negative refractive power has an object-side surface 141 being concave in a paraxial region thereof and an image-side surface 142 being convex in a paraxial region thereof. The fourth lens element 140 is made of plastic material, and has the object-side surface 141 and the image-side surface 142 being both aspheric.

The fifth lens element 150 with positive refractive power has an object-side surface 151 being convex in a paraxial region thereof and an image-side surface 152 being convex in a paraxial region thereof. The fifth lens element 150 is made of plastic material, and has the object-side surface 151 and the image-side surface 152 being both aspheric. Furthermore, each of the object-side surface 151 and the image-side surface 152 of the fifth lens element 150 includes at least one inflection point.

The sixth lens element 160 with negative refractive power has an object-side surface 161 being concave in a paraxial region thereof and an image-side surface 162 being concave in a paraxial region thereof. The sixth lens element 160 is made of plastic material, and has the object-side surface 161 and the image-side surface 162 being both aspheric. Furthermore, each of the object-side surface 161 and the image-side surface 162 of the sixth lens element 160 includes at least one inflection point.

The seventh lens element 170 with negative refractive power has an object-side surface 171 being concave in a paraxial region thereof and an image-side surface 172 being concave in a paraxial region thereof. The seventh lens element 170 is made of plastic material, and has the object-aside surface 171 and the image-side surface 172 being both aspheric. Furthermore, each of the object-side surface 171 and the image-side surface 172 of the seventh lens element 170 includes at least one inflection point.

The filter 180 is made of a glass material and located between the seventh lens element 170 and the image surface 190, and will not affect the focal length of the image capturing optical system.

The equation of the aspheric surface profiles of the aforementioned lens elements of the 1st embodiment is expressed as follows:

$$X(Y) = (Y^2/R)/(1 + \mathrm{sqrt}(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the image capturing optical system according to the 1st embodiment, when a focal length of the image capturing optical system is f, an f-number of the image capturing optical system is Fno, and half of a maximum field of view of the image capturing optical system is HFOV, these parameters have the following values: f=3.91 mm; Fno=1.45; and HFOV=40.1 degrees.

In the image capturing optical system according to the 1st embodiment, when an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, an axial distance between the fifth lens element 150 and the sixth lens element 160 is T56, an axial distance between the sixth lens element 160 and the seventh lens element 170 is T67, a central thickness of the second lens element 120 is CT2, and a central thickness of the sixth lens element 160 is CT6, the following conditions are satisfied: T23/CT2=0.98; T67/CT6=1.87; and (T23+T34+T45+T67)/(T12+T56)=11.14.

In the image capturing optical system according to the 1st embodiment, when a curvature radius of the object-side surface 111 of the first lens element 110 is R1, a curvature radius of the image-side surface 122 of the second lens element 120 is R4, a curvature radius of the object-side surface 131 of the third lens element 130 is R5, a curvature radius of the image-side surface 132 of the third lens element 130 is R6, a curvature radius of the object-side surface 171 of the seventh lens element 170 is R13, a curvature radius of the image-side surface 172 of the seventh lens element 170 is R14, and an entrance pupil diameter of the image capturing optical system is EPD, the following conditions are satisfied: R1/R6=−0.11; R4/R1=0.62; |R5/R6|=0.16; R14/R13=−0.32; and R14/EPD=0.77.

In the image capturing optical system according to the 1st embodiment, when a curvature radius of the object-side surface 121 of the second lens element 120 is R3, and an axial distance between the object-side surface 111 of the first lens element 110 and the image-side surface 172 of the seventh lens element 170 is TD, the following condition is satisfied: R3/TD=0.47.

In the image capturing optical system according to the 1st embodiment, when the focal length of the image capturing optical system is f, a focal length of the first lens element 110 is f1, a focal length of the second lens element 120 is f2, a focal length of the third lens element 130 is f3, and a focal length of the fourth lens element 140 is f4, the following conditions are satisfied: |f/f2|=0.49; f1/f4=−0.01; and f3/f1=0.95.

In the image capturing optical system according to the 1st embodiment, when half of a maximum field of view of the image capturing optical system is HFOV, the following condition is satisfied: tan(HFOV)=0.84.

In the image capturing optical system according to the 1st embodiment, when the focal length of the image capturing optical system is f, the entrance pupil diameter of the image capturing optical system is EPD, an axial distance between the object-side surface 111 of the first lens element 110 and the image surface 190 is TL, a maximum image height of the image capturing optical system is ImgH (half of a diagonal length of an effective photosensitive area of the image sensor 195), the following conditions are satisfied: f/EPD=1.45; TL/EPD=1.87; TL/ImgH=1.48; and TL=5.04 mm.

In the image capturing optical system according to the 1st embodiment, when an axial distance between the aperture stop 100 and the image-side surface 172 of the seventh lens element 170 is SD, and an axial distance between the object-side surface 111 of the first lens element 110 and the image-side surface 172 of the seventh lens element 170 is TD, the following condition is satisfied: SD/TD=0.90.

In the image capturing optical system according to the 1st embodiment, when a maximum of chief ray angles of the image capturing optical system is CRAmax (that is, a maximum incident angle of a chief ray into the image surface 190), the following condition is satisfied: CRAmax=37.39 degrees.

In the image capturing optical system according to the 1st embodiment, when the axial distance between the object-side surface 111 of the first lens element 110 and the image surface 190 is TL, the focal length of the image capturing optical system is f, the entrance pupil diameter of the image capturing optical system is EPD, and the maximum image height of the image capturing optical system is ImgH, the following condition is satisfied: (TL×f)(EPD×ImgH)=2.15.

Figure 25:
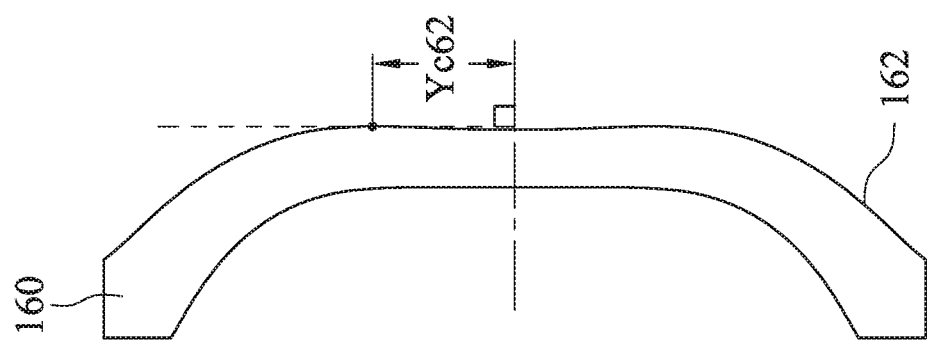
FIG. 25 is a schematic view of a parameter Yc62 of the image capturing optical system of FIG. 1.
Figure 26:
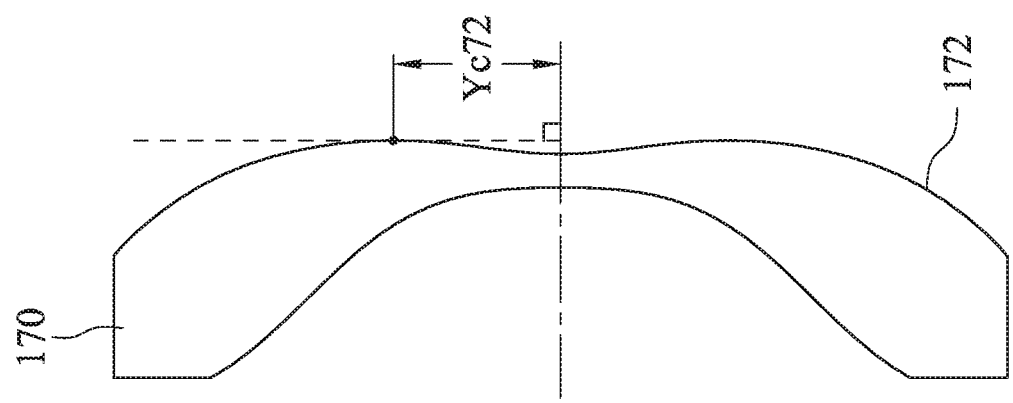
FIG. 26 is a schematic view of a parameter Yc72 of the image capturing optical system of FIG. 1.

FIG. 25 is a schematic view of a parameter Yc62 of the image capturing optical system of FIG. 1. FIG. 26 is a schematic view of a parameter Yc72 of the image capturing optical system of FIG. 1. In FIG. 25 and FIG. 26, when a vertical distance between a non-axial critical point on the image-side surface 162 of the sixth lens element 160 and an optical axis is Yc62, a vertical distance between a non-axial critical point on the image-side surface 172 of the seventh lens element 170 and the optical axis is Yc72, the focal length of the image capturing optical system is f, and the following conditions are satisfied: Yc72/Yc62=1.41; and Yc72/f=0.25.

The detailed optical data of the 1st embodiment are shown in Table 1 and the aspheric surface data are shown in Table 2 below.

TABLE 1

1st Embodiment
f = 3.91 mm, Fno = 1.45, HFOV = 40.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.425 | | | | |
| 2 | Lens 1 | 2.292 | ASP | 0.518 | Plastic | 1.545 | 56.0 | 5.52 |
| 3 | | 8.900 | ASP | 0.038 | | | | |
| 4 | Lens 2 | 2.043 | ASP | 0.200 | Plastic | 1.660 | 20.4 | −8.03 |
| 5 | | 1.417 | ASP | 0.197 | | | | |
| 6 | Lens 3 | 3.273 | ASP | 0.577 | Plastic | 1.544 | 55.9 | 5.25 |
| 7 | | −21.010 | ASP | 0.000 | | | | |
| 8 | Stop | Plano | | 0.342 | | | | |
| 9 | Lens 4 | −11.674 | ASP | 0.234 | Plastic | 1.639 | 23.5 | −400.68 |
| 10 | | −12.328 | ASP | 0.411 | | | | |
| 11 | Lens 5 | 79.917 | ASP | 0.738 | Plastic | 1.544 | 55.9 | 4.44 |
| 12 | | −2.481 | ASP | 0.096 | | | | |
| 13 | Lens 6 | −931.104 | ASP | 0.286 | Plastic | 1.660 | 20.4 | −14.43 |
| 14 | | 9.622 | ASP | 0.535 | | | | |
| 15 | Lens 7 | −6.551 | ASP | 0.200 | Plastic | 1.544 | 55.9 | −2.89 |
| 16 | | 2.087 | ASP | 0.200 | | | | |
| 17 | Filter | Plano | | 0.210 | Glass | 1.517 | 64.2 | — |
| 18 | | Plano | | 0.257 | | | | |
| 19 | Image | Plano | | — | | | | |

Reference wavelength is 587.6 nm (d-line).

Effective radius of Stop on Surface 8 is 1.130 mm.

TABLE 2

Aspheric Coefficients

| Surface # | 2 | 3 | 4 | 5 | 6 | 7 | 9 |
|---|---|---|---|---|---|---|---|
| k = | −3.5854E−01 | −5.5110E+00 | −4.0650E−01 | −6.0886E−01 | −6.6255E+00 | −5.7411E+01 | −6.0793E+00 |
| A4 = | 5.1575E−03 | 2.1508E−02 | −1.2988E−01 | −1.5370E−01 | 2.7520E−02 | −3.6842E−02 | −1.7133E−01 |
| A6 = | 6.4871E−03 | 3.6297E−02 | 1.4636E−01 | 1.5165E−01 | 3.1630E−02 | −3.8725E−03 | 4.0713E−02 |
| A8 = | −1.8683E−02 | −1.0640E−01 | −2.5864E−01 | −2.2093E−01 | −6.1695E−02 | 2.6461E−02 | −5.4218E−02 |
| A10 = | 2.5124E−02 | 1.4610E−01 | 3.0583E−01 | 2.4133E−01 | 8.6184E−02 | −4.5138E−02 | 2.4187E−02 |
| A12 = | −1.7631E−02 | −1.0465E−01 | −2.1250E−01 | −1.6513E−01 | −6.8464E−02 | 3.8545E−02 | 3.5417E−02 |
| A14 = | 7.2913E−03 | 4.1241E−02 | 7.7923E−02 | 5.7886E−02 | 2.8728E−02 | −1.4377E−02 | −4.2770E−02 |
| A16 = | −1.3189E−03 | −7.4845E−03 | −1.2090E−02 | −7.6230E−03 | −5.0267E−03 | 1.3712E−03 | 1.2647E−02 |

| Surface # | 10 | 11 | 12 | 13 | 14 | 15 | 16 |
|---|---|---|---|---|---|---|---|
| k = | 6.8287E−16 | −4.6232E+01 | −1.0249E+01 | −3.6614E+01 | −5.5111E+00 | −8.9973E+01 | −1.9377E+01 |
| A4 = | −1.5923E−01 | −5.4638E−02 | 3.6768E−02 | 3.2198E−02 | −1.3264E−02 | −3.1622E−01 | −9.7877E−02 |
| A6 = | 3.0777E−02 | 2.2268E−01 | −9.9855E−02 | −1.3552E−01 | −5.5699E−02 | 2.8626E−01 | 4.4170E−02 |
| A8 = | −3.9133E−02 | −9.4218E−01 | 1.0511E−01 | 6.1593E−02 | −6.6244E−03 | −2.5580E−01 | −1.3858E−02 |
| A10 = | 2.9677E−02 | 2.0805E+00 | −1.8564E−01 | −3.9506E−02 | 3.3592E−02 | 1.6749E−01 | 3.1863E−03 |
| A12 = | 1.1181E−02 | −2.9275E+00 | 2.3025E−01 | 4.6467E−02 | −1.8867E−02 | −7.0867E−02 | −5.7622E−04 |
| A14 = | −2.5737E−02 | 2.6262E+00 | −1.6963E−01 | −2.9860E−02 | 4.9872E−03 | 1.8942E−02 | 7.6899E−05 |
| A16 = | 1.1199E−02 | −1.4550E+00 | 7.3047E−02 | 9.3440E−03 | −6.9497E−04 | −3.0816E−03 | −6.7410E−06 |
| A18 = | −1.3546E−03 | 4.5350E−01 | −1.7228E−02 | −1.3890E−03 | 4.8771E−05 | 2.7755E−04 | 3.4469E−07 |
| A20 = | | −6.1259E−02 | 1.7214E−03 | 7.8685E−05 | −1.3448E−06 | −1.0581E−05 | −8.2312E−09 |

In Table 1, the curvature radius, the thickness and the focal length are shown in millimeters (mm). Surface numbers 0-19 represent the surfaces sequentially arranged from the object side to the image side along the optical axis. In Table 2, k represents the conic coefficient of the equation of the aspheric surface profiles. A4-A20 represent the aspheric coefficients ranging from the 4th order to the 20th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

Furthermore, according to the 1st embodiment, each of at least two of the first lens element 110, the second lens element 120, the third lens element 130, the fourth lens element 140, the fifth lens element 150, the sixth lens element 160 and the seventh lens element 170 has an Abbe number smaller than 25.0; In detail, the Abbe numbers of the second lens element 120, the fourth lens element 140 and the sixth lens element 160 are smaller than 25.0.

According to the 1st embodiment, a number of inflection points on each of object-side surfaces and image-side surfaces of the first lens element 110, the second lens element 120, the third lens element 130, the fourth lens element 140, the fifth lens element 150, the sixth lens element 160 and the seventh lens element 170 is listed as follows.

| 1st Embodiment - Numbers of inflection points | | | | | | | |
|---|---|---|---|---|---|---|---|
| | 110 | 120 | 130 | 140 | 150 | 160 | 170 |
| Object-side surface | 0 | 1 | 0 | 0 | 1 | 3 | 1 |
| Image-side surface | 1 | 1 | 0 | 0 | 1 | 2 | 1 |

2nd Embodiment

Figure 3:
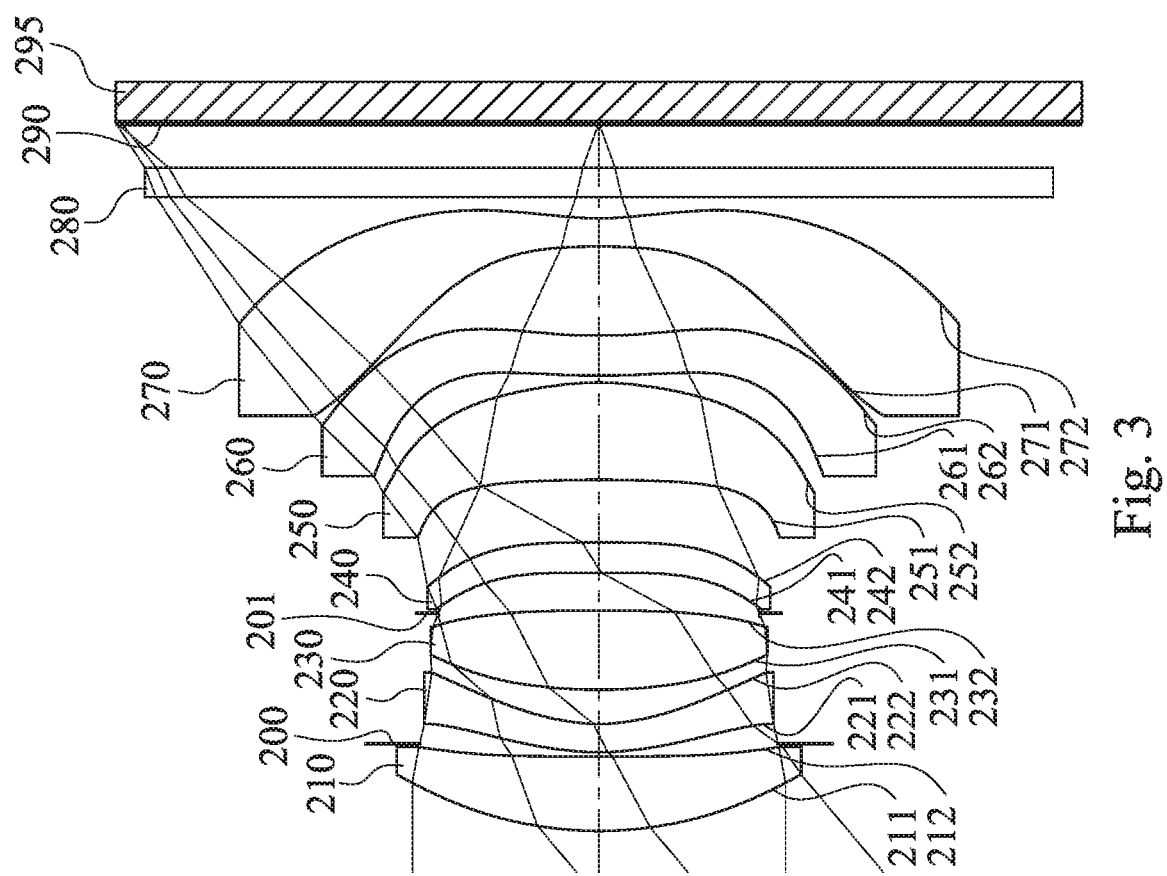
FIG. 3 is a schematic view of an imaging apparatus according to the 2nd embodiment of the present disclosure.
Figure 4:
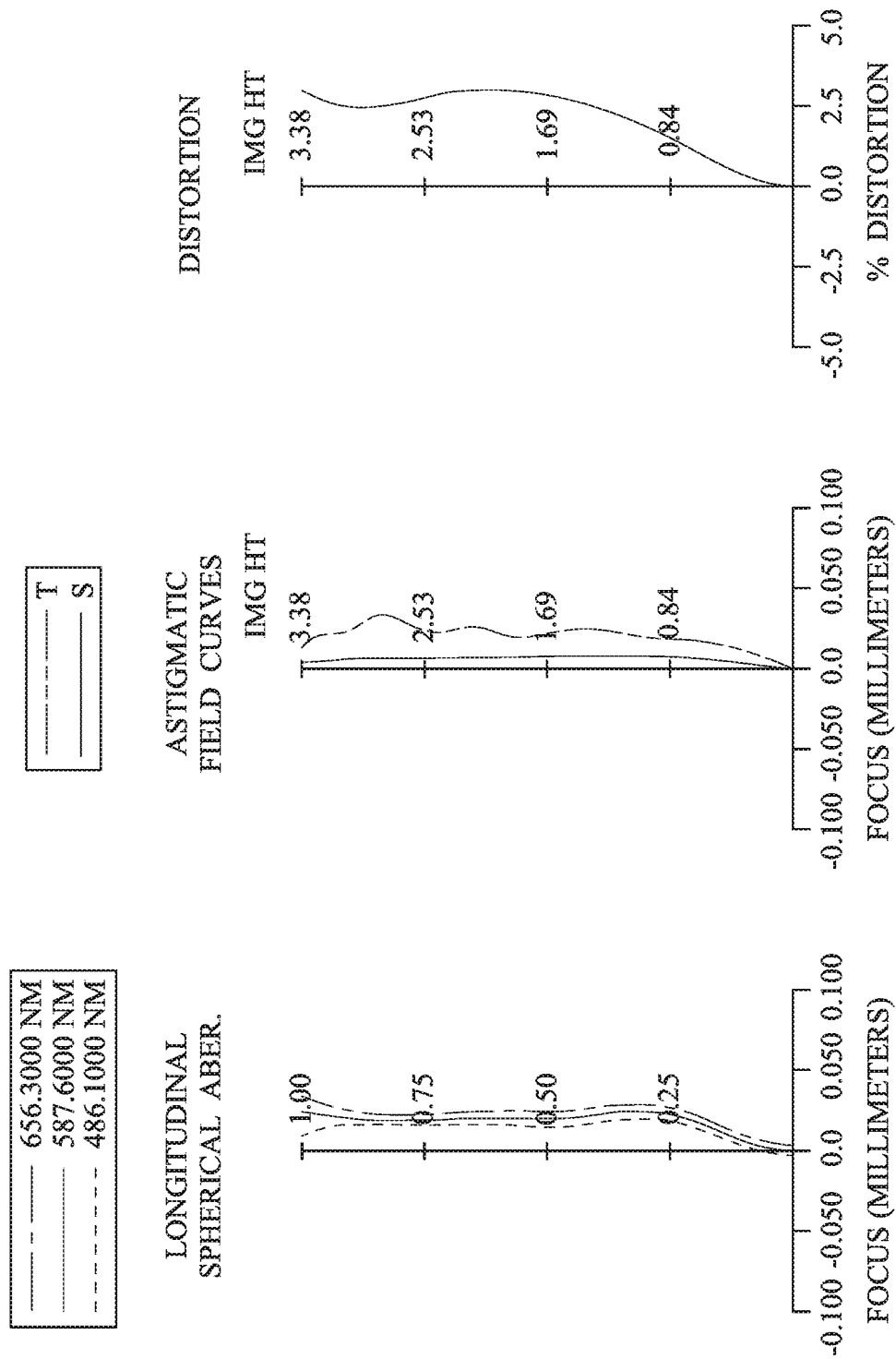
FIG. 4 shows spherical aberration curves, astigmatic field curves and a distortion curve of the imaging apparatus according to the 2nd embodiment.

FIG. 3 is a schematic view of an imaging apparatus according to the 2nd embodiment of the present disclosure. FIG. 4 shows spherical aberration curves, astigmatic field curves and a distortion curve of the imaging apparatus according to the 2nd embodiment. In FIG. 3, the imaging apparatus includes an image capturing optical system (its reference numeral is omitted) and an image sensor 295. The image capturing optical system includes, in order from an object side to an image side, a first lens element 210, an aperture stop 200, a second lens element 220, a third lens element 230, a stop 201, a fourth lens element 240, a fifth lens element 250, a sixth lens element 260, a seventh lens element 270, a filter 280 and an image surface 290, wherein the image sensor 295 is disposed on the image surface 290 of the image capturing optical system.

The Image capturing optical system includes seven lens elements (210, 220, 230, 240, 250, 260 and 270) without additional one or more lens elements inserted between the first lens element 210 and the seventh lens element 270, and each of the seven lens elements has an object-side surface towards the object side and an image-side surface towards the image side.

The first lens element 210 with positive refractive power has an object-side surface 211 being convex in a paraxial region thereof and an image-side surface 212 being convex in a paraxial region thereof. The first lens element 210 is made of a plastic material, and has the object-side surface 211 and the image-side surface 212 being both aspheric. Furthermore, each of the object-side surface 211 and the image-side surface 212 of the first lens element 210 includes at least one inflection point.

The second lens element 220 with negative refractive power has an object-side surface 221 being convex in a paraxial region thereof and an image-side surface 222 being concave in a paraxial region thereof. The second lens element 220 is made of plastic material, and has the object-side surface 221 and the image-side surface 222 being both aspheric. Furthermore, the object-side surface 221 of the second lens element 220 includes at least one inflection point.

The third lens element 230 with positive refractive power has an object-side surface 231 being convex in a paraxial region thereof and an image-side surface 232 being convex in a paraxial region thereof. The third lens element 230 is made of plastic material, and has the object-side surface 231 and the image-side surface 232 being both aspheric. Furthermore, the object-side surface 231 of the third lens element 230 includes at least one inflection point.

The fourth lens element 240 with positive refractive power has an object-side surface 241 being concave in a paraxial region thereof and an image-side surface 242 being convex in a paraxial region thereof. The fourth lens element 240 is made of plastic material, and has the object-side surface 241 and the image-side surface 242 being both aspheric.

The fifth lens element 250 with positive refractive power has an object-side surface 251 being concave in a paraxial region thereof and an image-side surface 252 being convex in a paraxial region thereof. The fifth lens element 250 is made of plastic material, and has the object-side surface 251 and the image-side surface 252 being both aspheric. Furthermore, the image-side surface 252 of the fifth lens element 250 includes at least one inflection point.

The sixth lens element 260 with negative refractive power has an object-side surface 261 being convex in a paraxial region thereof and an image-side surface 262 being concave in a paraxial region thereof. The sixth lens element 260 is made of plastic material, and has the object-side surface 261 and the image-side surface 262 being both aspheric. Furthermore, each of the object-side surface 261 and the image-side surface 262 of the sixth lens element 260 includes at least one inflection point.

The seventh lens element 270 with negative refractive power has an object-side surface 271 being concave in a paraxial region thereof and an image-side surface 272 being concave in a paraxial region thereof. The seventh lens element 270 is made of plastic material, and has the object-side surface 271 and the image-side surface 272 being both aspheric. Furthermore, each of the object-side surface 271 and the image-side surface 272 of the seventh lens element 270 includes at least one inflection point.

The filter 280 is made of a glass material and located between the seventh lens element 270 and the image surface 290, and will not affect the focal length of the image capturing optical system.

The detailed optical data of the 2nd embodiment are shown in Table 3 and the aspheric surface data are shown in Table 4 below.

TABLE 3

2nd Embodiment
f = 3.88 mm, Fno = 1.47, HFOV = 40.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.663 | ASP | 0.529 | Plastic | 1.545 | 56.0 | 4.71 |
| 2 | | −66.131 | ASP | 0.090 | | | | |
| 3 | Ape. Stop | Plano | | −0.060 | | | | |
| 4 | Lens 2 | 2.084 | ASP | 0.200 | Plastic | 1.660 | 20.4 | −6.91 |
| 5 | | 1.376 | ASP | 0.242 | | | | |
| 6 | Lens 3 | 3.869 | ASP | 0.563 | Plastic | 1.544 | 55.9 | 5.77 |
| 7 | | −15.764 | ASP | −0.020 | | | | |
| 8 | Stop | Plano | | 0.288 | | | | |
| 9 | Lens 4 | −49.354 | ASP | 0.214 | Plastic | 1.639 | 23.5 | 54.16 |
| 10 | | −20.370 | ASP | 0.443 | | | | |
| 11 | Lens 5 | −10.833 | ASP | 0.689 | Plastic | 1.544 | 55.9 | 4.41 |
| 12 | | −2.006 | ASP | 0.050 | | | | |
| 13 | Lens 6 | 9.514 | ASP | 0.282 | Plastic | 1.660 | 20.4 | −10.05 |
| 14 | | 3.862 | ASP | 0.631 | | | | |
| 15 | Lens 7 | −5.939 | ASP | 0.200 | Plastic | 1.544 | 55.9 | −3.00 |
| 16 | | 2.278 | ASP | 0.150 | | | | |
| 17 | Filter | Plano | | 0.210 | Glass | 1.517 | 64.2 | — |
| 18 | | Plano | | 0.313 | | | | |
| 19 | Image | Plano | | — | | | | |

Reference wavelength is 587.6 nm (d-line).
Effective radius of Stop on Surface 8 is 1.140 mm.

TABLE 4

Aspheric Coefficients

| Surface # | 1 | 2 | 4 | 5 | 6 | 7 | 9 |
|---|---|---|---|---|---|---|---|
| k = | −9.6159E−01 | −5.5110E+00 | −4.0000E−01 | −6.2328E−01 | −6.5882E+00 | −5.7411E+01 | −6.0793E+00 |
| A4 = | 1.8340E−03 | 7.7153E−02 | −9.1919E−02 | −1.6251E−01 | 2.9884E−02 | −4.0991E−02 | −1.6246E−01 |
| A6 = | 8.8693E−03 | −1.1440E−01 | 2.3727E−02 | 1.4421E−01 | 5.3652E−02 | −2.0782E−02 | 2.2903E−02 |
| A8 = | −2.8170E−02 | 1.6655E−01 | 6.8011E−03 | −1.4706E−01 | −1.2983E−01 | 9.0965E−02 | −6.9392E−02 |
| A10 = | 4.0939E−02 | −1.6166E−01 | −4.0637E−02 | 8.8538E−02 | 2.2033E−01 | −1.5651E−01 | 1.1604E−01 |
| A12 = | −3.0138E−02 | 9.8451E−02 | 3.6691E−02 | −2.8292E−02 | −2.1914E−01 | 1.4645E−01 | −7.4473E−02 |
| A14 = | 1.1666E−02 | −3.3405E−02 | −1.5085E−02 | 1.8700E−03 | 1.1466E−01 | −7.0915E−02 | 1.4366E−02 |
| A16 = | −1.9079E−03 | 4.5478E−03 | 2.3794E−03 | 1.2944E−03 | −2.5099E−02 | 1.3196E−02 | 2.4529E−03 |

| Surface # | 10 | 11 | 12 | 13 | 14 | 15 | 16 |
|---|---|---|---|---|---|---|---|
| k = | 8.2604E−30 | −4.6232E+01 | −1.0316E+01 | −3.6614E+01 | −5.5111E+00 | −8.9973E+01 | −1.9377E+01 |
| A4 = | −1.3828E−01 | −1.4429E−02 | 1.6315E−01 | 1.6430E−01 | −3.7474E−02 | −3.5966E−01 | −1.5053E−01 |
| A6 = | −1.4042E−02 | 7.6852E−02 | −7.3583E−01 | −7.6726E−01 | −1.1991E−01 | 2.9494E−01 | 9.9434E−02 |
| A8 = | 1.6066E−02 | −4.9690E−01 | 1.5715E+00 | 1.3774E+00 | 1.1759E−01 | −2.3382E−01 | −5.3908E−02 |
| A10 = | −3.5655E−02 | 1.0983E+00 | −2.2872E+00 | −1.7436E+00 | −5.7717E−02 | 1.3599E−01 | 2.2071E−02 |
| A12 = | 9.5200E−02 | −1.5180E+00 | 2.2249E+00 | 1.5305E+00 | 1.0877E−02 | −4.7345E−02 | −6.2353E−03 |
| A14 = | −1.0104E−01 | 1.3360E+00 | −1.4257E+00 | −9.0246E−01 | 3.3624E−03 | 8.8603E−03 | 1.1422E−03 |
| A16 = | 4.7440E−02 | −7.3429E−01 | 5.7559E−01 | 3.3789E−01 | −2.3242E−03 | −6.5127E−04 | −1.2893E−04 |
| A18 = | −8.1877E−03 | 2.3172E−01 | −1.3231E−01 | −7.2100E−02 | 4.7756E−04 | −2.8236E−05 | 8.1634E−06 |
| A20 = | | −3.2936E−02 | 1.3154E−02 | 6.6327E−03 | −3.4650E−05 | 5.0525E−06 | −2.2243E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.88 | f1/f4 | 0.09 |
| Fno | 1.47 | f3/f1 | 1.22 |
| HFOV [deg.] | 40.1 | tan(HFOV) | 0.84 |

-continued

| 2nd Embodiment | | | |
|---|---|---|---|
| T23/CT2 | 1.21 | f/EPD | 1.47 |
| T67/CT6 | 2.24 | TL/EPD | 1.90 |
| (T23 + T34 + T45 + T67)/(T12 + T56) | 19.81 | TL/ImgH | 1.48 |
| R1/R6 | −0.17 | TL [mm] | 5.01 |
| R4/R1 | 0.52 | SD/TD | 0.86 |
| |R5/R6| | 0.25 | CRAmax [deg.] | 38.23 |
| R14/R13 | −0.38 | (TL × f)/(EPD × ImgH) | 2.18 |
| R14/EPD | 0.86 | Yc72/Yc62 | 1.02 |
| R3/TD | 0.48 | Yc72/f | 0.22 |
| |f/f2| | 0.56 | | |

Furthermore, according to the 2nd embodiment, each of at least two of the first lens element 210, the second lens element 220, the third lens element 230, the fourth lens element 240, the fifth lens element 250, the sixth lens element 260 and the seventh lens element 270 has an Abbe number which is smaller than 25.0; in detail, the Abbe numbers of the second lens element 220, the fourth lens element 240 and the sixth lens element 260 are smaller than 26.0.

According to the 2nd embodiment, a number of inflection points on each of object-side surfaces and image-side surfaces of the first lens element 210, the second lens element 220, the third lens element 230, the fourth lens element 240, the fifth lens element 250, the sixth lens element 260 and the seventh lens element 270 is listed as follows.

| 2nd Embodiment - Numbers of inflection points | | | | | | | |
|---|---|---|---|---|---|---|---|
| | 210 | 220 | 230 | 240 | 250 | 260 | 270 |
| Object-side surface | 1 | 1 | 1 | 0 | 0 | 2 | 1 |
| Image-side surface | 2 | 0 | 0 | 0 | 1 | 2 | 1 |

Figure 5:
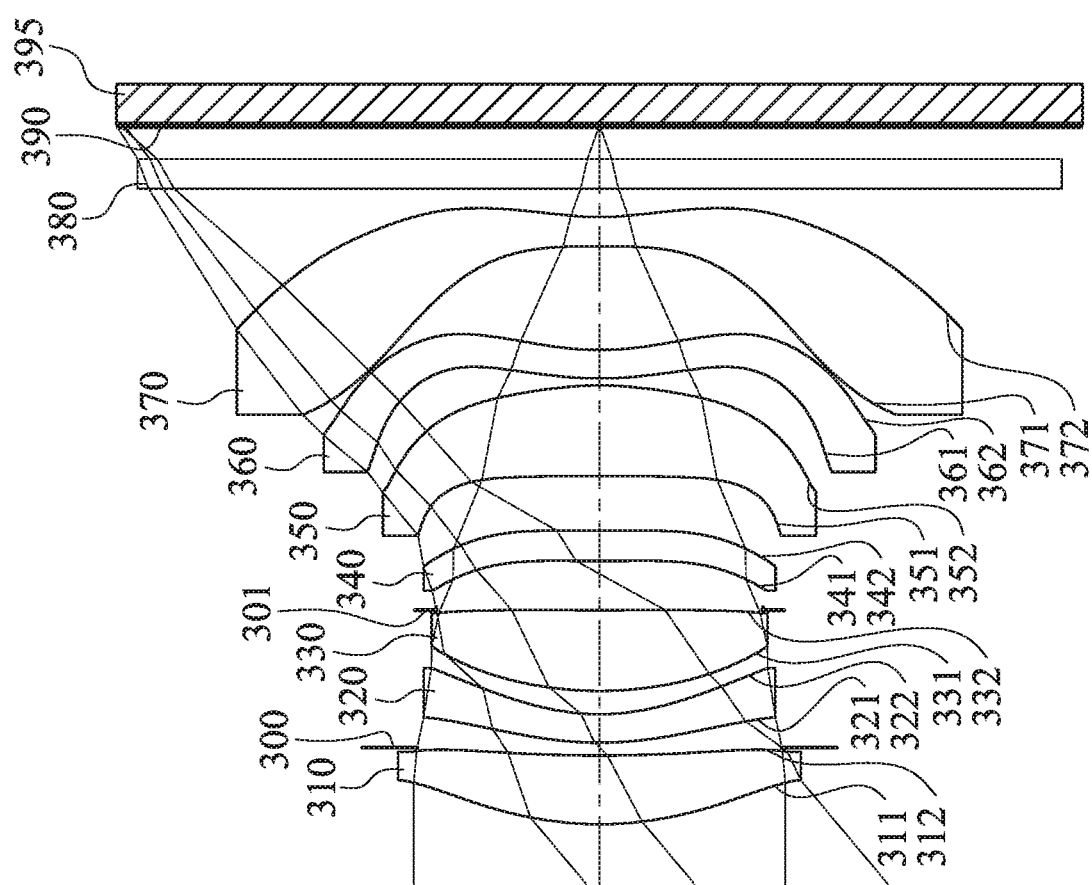
FIG. 5 is a schematic view of an imaging apparatus according to the 3rd embodiment of the present disclosure.
Figure 6:
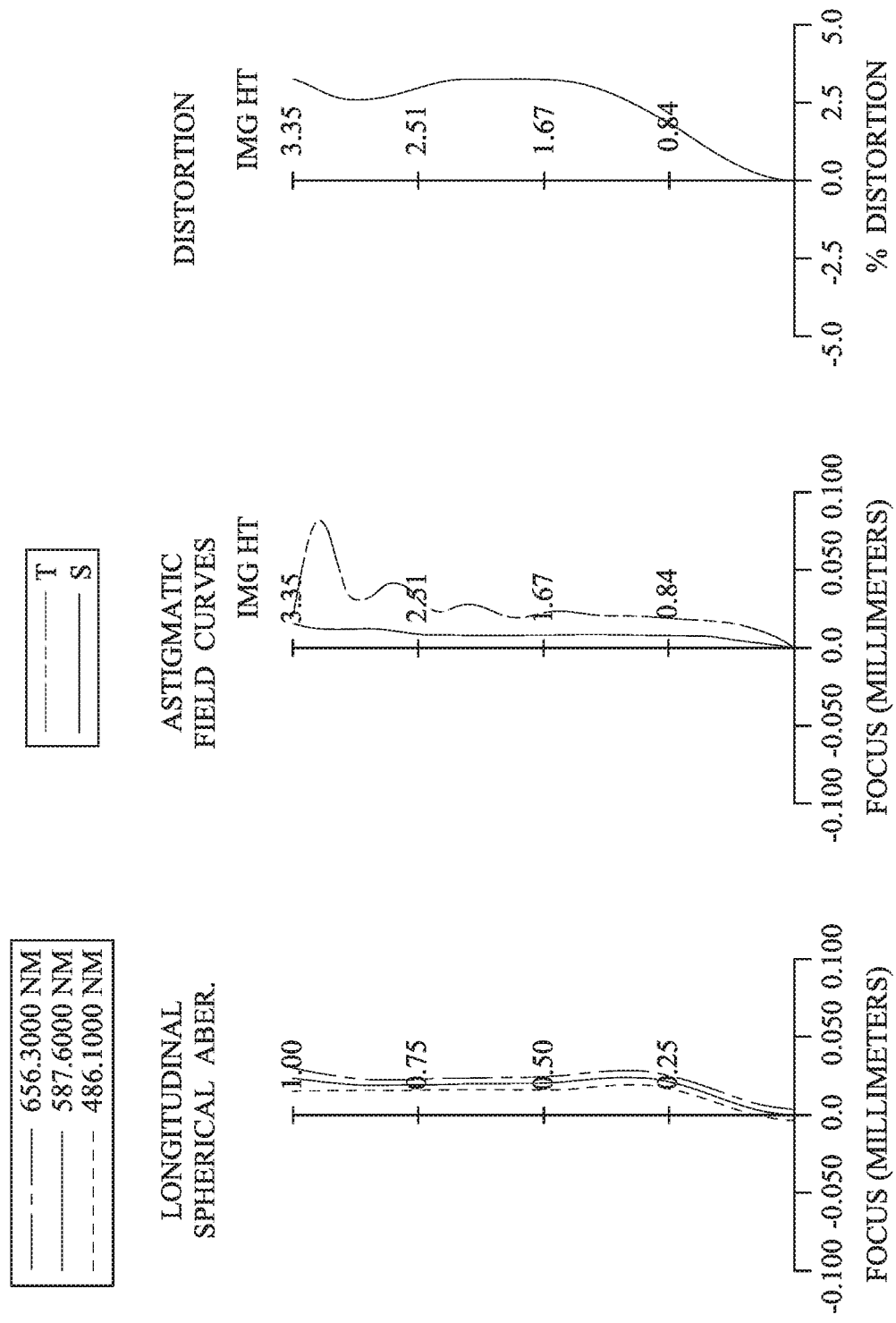
FIG. 6 shows spherical aberration curves, astigmatic field curves and a distortion curve of the imaging apparatus according to the 3rd embodiment.

FIG. 5 is a schematic view of an imaging apparatus according to the 3rd embodiment of the present disclosure. FIG. 6 shows spherical aberration curves, astigmatic field curves and a distortion curve of the imaging apparatus according to the 3rd embodiment. In FIG. 6, the imaging apparatus includes an image capturing optical system (its reference numeral is omitted) and an image sensor 395. The image capturing optical system includes, in order from an object side to an image side, a first lens element 310, an aperture stop 300, a second lens element 320, a third lens element 330, a stop 301, a fourth lens element 340, a fifth lens element 350, a sixth lens element 360, a seventh lens element 370, a filter 380 and an image surface 390, wherein the image sensor 395 is disposed on the image surface 390 of the image capturing optical system.

The image capturing optical system includes seven lens elements (310, 320, 330, 340, 350, 380 and 370) without additional one or more lens elements inserted between the first lens element 310 and the seventh lens element 370, and each of the seven lens elements has an object-side surface towards the object side and an image-side surface towards the image side.

The first lens element 310 with positive refractive power has an object-side surface 311 being convex in a paraxial region thereof and an image-side surface 312 being concave in a paraxial region thereof. The first lens element 310 is made of a plastic material, and has the object-side surface 311 and the image-side surface 312 being both aspheric. Furthermore, each of the object-side surface 311 and the image-side surface 312 of the first lens element 310 includes at least one inflection point.

The second lens element 320 with negative refractive power has an object-side surface 321 being convex in a paraxial region thereof and an image-side surface 322 being concave in a paraxial region thereof. The second lens element 320 is made of plastic material, and has the object-side surface 321 and the image-side surface 322 being both aspheric. Furthermore, each of the object-side surface 321 and the image-side surface 322 of the second lens element 320 includes at least one inflection point.

The third lens element 330 with positive refractive power has an object-side surface 331 being convex in a paraxial region thereof and an image-side surface 332 being concave in a paraxial region thereof. The third lens element 330 is made of plastic material, and has the object-side surface 331 and the image-side surface 332 being both aspheric. Furthermore, the image-side surface 332 of the third lens element 330 includes at least one inflection point.

The fourth lens element 340 with positive refractive power has an object-side surface 341 being convex in a paraxial region thereof and an image-side surface 342 being concave in a paraxial region thereof. The fourth lens element 340 is made of plastic material, and has the object-side surface 341 and the image-side surface 342 being both aspheric. Furthermore, each of the object-side surface 341 and the image-side surface 342 of the fourth lens element 340 includes at least one inflection point.

The fifth lens element 350 with positive refractive power has an object-side surface 351 being concave in a paraxial region thereof and an image-side surface 352 being convex in a paraxial region thereof. The fifth lens element 350 is made of plastic material, and has the object-side surface 351 and the image-side surface 352 being both aspheric. Furthermore, the image-side surface 352 of the fifth lens element 350 includes at least one inflection point.

The sixth lens element 360 with negative refractive power has an object-side surface 361 being convex in a paraxial region thereof and an image-side surface 362 being concave in a paraxial region thereof. The sixth lens element 360 is made of plastic material, and has the object-side surface 381 and the image-side surface 382 being both aspheric. Furthermore, each of the object-side surface 361 and the image-side surface 362 of the sixth lens element 360 includes at least one inflection point.

The seventh lens element 370 with negative refractive power has an object-side surface 371 being concave in a paraxial region thereof and an image-side surface 372 being concave in a paraxial region thereof. The seventh lens element 370 is made of plastic material, and has the object-side surface 371 and the image-side surface 372 being both aspheric. Furthermore, each of the object-side surface 371 and the image-side surface 372 of the seventh lens element 370 includes at least one inflection point.

The filter 380 is made of a glass material and located between the seventh lens element 370 and the image surface 390, and will not affect the focal length of the image capturing optical system.

The detailed optical data of the 3rd embodiment are shown in Table 5 and the aspheric surface data are shown in Table 6 below.

TABLE 5

3rd Embodiment
f = 3.85 mm, Fno = 1.47, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.466 | ASP | 0.485 | Plastic | 1.545 | 56.0 | 5.63 |
| 2 | | 11.739 | ASP | 0.055 | | | | |
| 3 | Ape. Stop | Plano | | 0.035 | | | | |

TABLE 5-continued

3rd Embodiment
f = 3.85 mm, Fno = 1.47, HFOV = 40.0 deg.

| Surface # | | Curvature Radius | | Thickness | Material | Index | Abbe # | Focal Length |
|---|---|---|---|---|---|---|---|---|
| 4 | Lens 2 | 2.463 | ASP | 0.200 | Plastic | 1.660 | 20.4 | −7.19 |
| 5 | | 1.569 | ASP | 0.165 | | | | |
| 6 | Lens 3 | 2.585 | ASP | 0.570 | Plastic | 1.544 | 55.9 | 5.16 |
| 7 | | 30.477 | ASP | 0.000 | | | | |
| 8 | Stop | Plano | | 0.348 | | | | |
| 9 | Lens 4 | 19.215 | ASP | 0.213 | Plastic | 1.639 | 23.5 | 165.73 |
| 10 | | 23.376 | ASP | 0.387 | | | | |
| 11 | Lens 5 | −22.622 | ASP | 0.639 | Plastic | 1.544 | 55.9 | 4.36 |
| 12 | | −2.167 | ASP | 0.050 | | | | |
| 13 | Lens 6 | 3.212 | ASP | 0.200 | Plastic | 1.660 | 20.4 | −10.66 |
| 14 | | 2.150 | ASP | 0.731 | | | | |
| 15 | Lens 7 | −15.396 | ASP | 0.205 | Plastic | 1.544 | 55.9 | −3.24 |
| 16 | | 1.996 | ASP | 0.200 | | | | |
| 17 | Filter | Plano | | 0.210 | Glass | 1.517 | 64.2 | — |
| 18 | | Plano | | 0.236 | | | | |
| 19 | Image | Plano | | — | | | | |

Reference wavelength is 587.6 nm (d-line)
Effective radius of Stop on Surface 8 is 1.150 mm.

TABLE 6

Aspheric Coefficients

| Surface # | 1 | 2 | 4 | 5 | 6 | 7 | 9 |
|---|---|---|---|---|---|---|---|
| k = | −2.1299E+00 | −5.5110E+00 | −4.0000E−01 | −6.0000E−01 | −5.8380E+00 | −5.7411E+01 | −6.0793E+00 |
| A4 = | 5.4344E−03 | 2.3927E−02 | −7.7535E−02 | −1.2341E−01 | 2.8566E−02 | −3.1449E−02 | −1.5608E−01 |
| A6 = | 6.1128E−03 | −4.3516E−02 | 5.7989E−02 | 1.2897E−01 | 5.5760E−02 | −4.8100E−03 | 2.2789E−02 |
| A8 = | −3.0929E−02 | 9.2719E−03 | −1.4777E−01 | −2.3812E−01 | −1.3179E−01 | 4.6571E−02 | −4.2540E−02 |
| A10 = | 3.2673E−02 | 2.4263E−02 | 2.2598E−01 | 3.2952E−01 | 1.9867E−01 | −8.7226E−02 | 3.9499E−02 |
| A12 = | −1.9719E−02 | −2.6670E−02 | −1.8513E−01 | −2.7793E−01 | −1.6962E−01 | 8.6513E−02 | 1.5062E−02 |
| A14 = | 6.3181E−03 | 1.0658E−02 | 7.6346E−02 | 1.2367E−01 | 7.6681E−02 | −4.2651E−02 | −2.8113E−02 |
| A16 = | −9.0269E−04 | −1.6122E−03 | −1.2605E−02 | −2.2311E−02 | −1.4424E−02 | 7.9044E−03 | 8.6023E−03 |

| Surface # | 10 | 11 | 12 | 13 | 14 | 15 | 16 |
|---|---|---|---|---|---|---|---|
| k = | −2.0529E−12 | −4.6232E+01 | −1.0316E+01 | −3.6614E+01 | −5.5111E+00 | −8.9973E+01 | −1.9377E+01 |
| A4 = | −1.3799E−01 | −6.3955E−03 | 2.0224E−01 | 2.5065E−01 | −4.8249E−02 | −4.0660E−01 | −1.5006E−01 |
| A6 = | −9.3425E−03 | 1.0541E−01 | −7.2957E−01 | −8.1289E−01 | −2.3317E−02 | 4.1443E−01 | 1.0136E−01 |
| A8 = | 1.7057E−02 | −5.9101E−01 | 1.4956E+00 | 1.3205E+00 | −1.0534E−01 | −4.3158E−01 | −6.4703E−02 |
| A10 = | −6.0815E−02 | 1.2384E+00 | −2.1872E+00 | −1.6015E+00 | 2.1694E−01 | 3.1081E−01 | 2.8867E−02 |
| A12 = | 1.3627E−01 | −1.6894E+00 | 2.1560E+00 | 1.3859E+00 | −1.9799E−01 | −1.3927E−01 | −7.7727E−03 |
| A14 = | −1.2328E−01 | 1.5129E+00 | −1.4073E+00 | −8.2054E−01 | 1.0104E−01 | 3.9067E−02 | 1.1819E−03 |
| A16 = | 5.1666E−02 | −8.6815E−01 | 5.8133E−01 | 3.1090E−01 | −2.9316E−02 | −6.7218E−03 | −8.9858E−05 |
| A18 = | −8.4412E−03 | 2.9226E−01 | −1.3707E−01 | −6.6944E−02 | 4.4960E−03 | 6.5045E−04 | 2.0444E−06 |
| A20 = | | −4.4842E−02 | 1.3984E−02 | 6.1546E−03 | −2.8227E−04 | −2.7146E−05 | 6.3719E−08 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 3.85 | f1/f4 | 0.03 |
| Fno | 1.47 | f3/f1 | 0.92 |
| HFOV [deg.] | 40.0 | tan(HFOV) | 0.84 |
| T23/CT2 | 0.82 | f/EPD | 1.47 |
| T67/CT6 | 3.66 | TL/EPD | 1.88 |
| (T23 + T34 + T45 + T67)/(T12 + T56) | 11.61 | TL/ImgH | 1.47 |
| R1/R6 | 0.08 | TL [mm] | 4.93 |
| R4/R1 | 0.64 | SD/TD | 0.87 |
| |R5/R6| | 0.08 | CRAmax [deg.] | 37.38 |
| R14/R13 | −0.13 | (TL × f)/(EPD × ImgH) | 2.16 |
| R14/EPD | 0.76 | Yc72/Yc62 | 0.87 |
| R3/TD | 0.57 | Yc72/f | 0.22 |
| |f/f2| | 0.54 | | |

Furthermore, according to t 3 embodiment, each of at least two of the first lens element 310, the second lens element 320, the third lens element 330, the fourth lens element 340, the fifth lens element 350, the sixth lens element 360 and the seventh lens element 370 has an Abbe number which is smaller than 25.0; in detail, the Abbe numbers of the second lens element 320, the fourth lens element 340 and the sixth lens element 380 are smaller than 25.0.

According to the 3rd embodiment, a number of inflection points on each of object-side surfaces and image-side surfaces of the first lens element 310, the second lens element 320, the third lens element 330, the fourth lens element 340, the fifth lens element 350, the sixth lens element 360 and the seventh lens element 370 is listed as follows.

| 3rd Embodiment - Numbers of inflection points | | | | | | | |
|---|---|---|---|---|---|---|---|
| | 310 | 320 | 330 | 340 | 350 | 360 | 370 |
| Object-side surface | 1 | 1 | 0 | 1 | 0 | 2 | 2 |
| Image-side surface | 1 | 1 | 1 | 1 | 1 | 3 | 2 |

4th Embodiment

Figure 7:
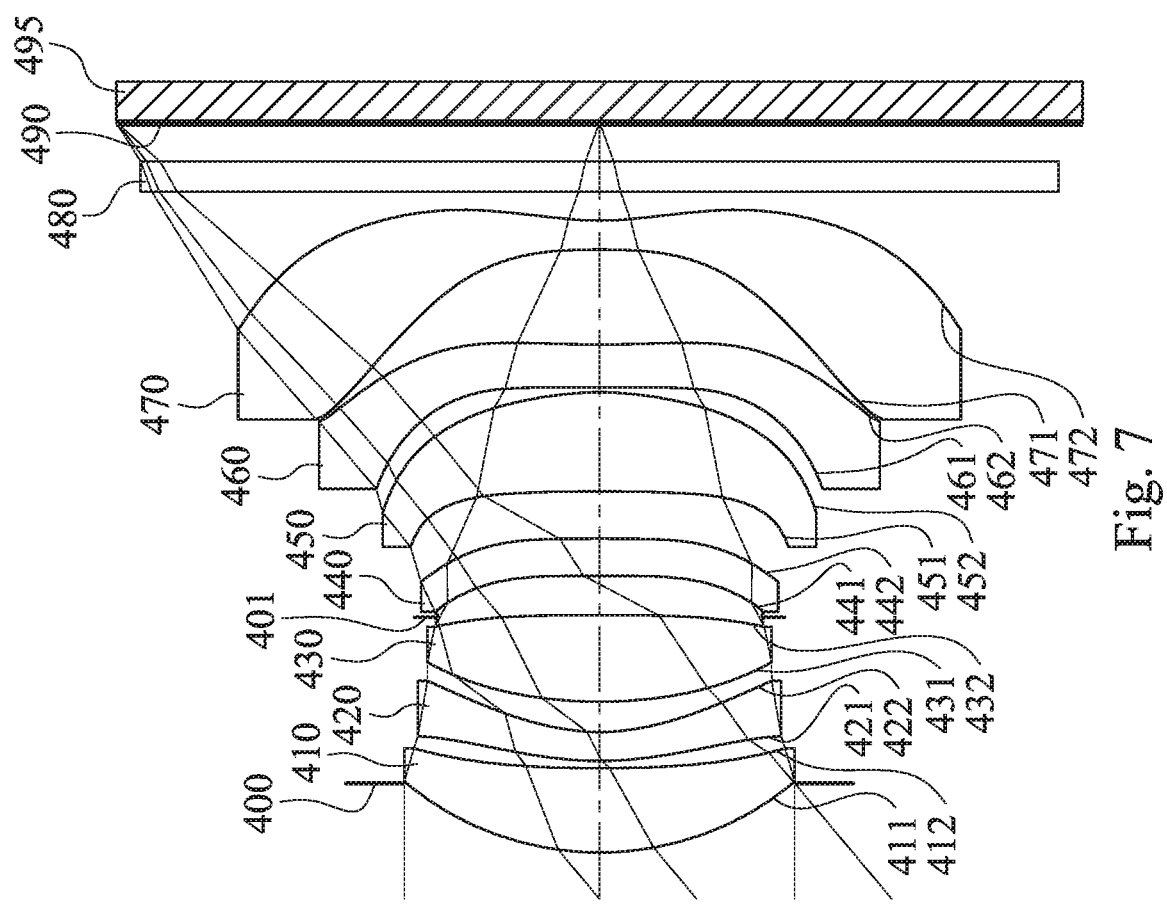
FIG. 7 is a schematic view of an imaging apparatus according to the 4th embodiment of the present disclosure.
Figure 8:
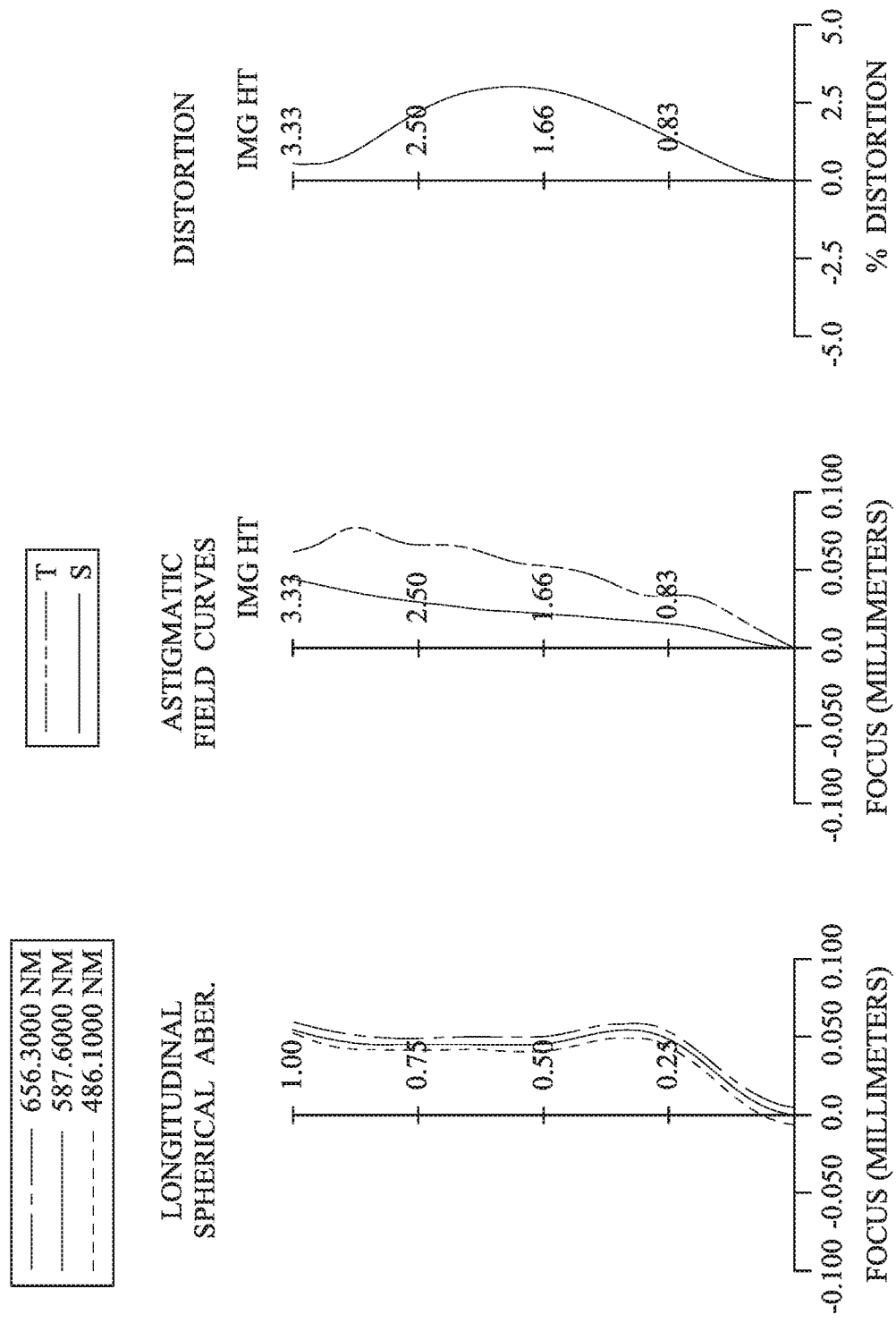
FIG. 8 shows spherical aberration curves, astigmatic field curves and a distortion curve of the imaging apparatus according to the 4th embodiment.

FIG. 7 is a schematic view of an imaging apparatus according to the 4th embodiment of the present disclosure. FIG. 8 shows spherical aberration curves, astigmatic field curves and a distortion curve of the imaging apparatus according to the 4th embodiment. In FIG. 7, the imaging apparatus includes an image capturing optical system (its reference numeral is omitted) and an image sensor 495. The image capturing optical system includes, in order from an object side to an image side, an aperture stop 400, a first lens element 410, a second lens element 420, a third lens element 430, a stop 401, a fourth lens element 440, a fifth lens element 450, a sixth lens element 460, a seventh lens element 470, a filter 480 and an image surface 490, wherein the image sensor 495 is disposed on the image surface 490 of the image capturing optical system.

The image capturing optical system includes seven lens elements (410, 420, 430, 440, 450, 460 and 470) without additional one or more lens elements inserted between the first lens element 410 and the seventh lens element 470, and each of the seven lens elements has an object-side surface towards the object side and an image-side surface towards the image side.

The first lens element 410 with positive refractive power has an object-side surface 411 being convex in a paraxial region thereof and an image-side surface 412 being concave in a paraxial region thereof. The first lens element 410 is made of a plastic material, and has the object-side surface 411 and the image-side surface 412 being both aspheric. Furthermore, the image-side surface 412 of the first lens element 410 includes at least one inflection point.

The second lens element 420 with negative refractive power has an object-side surface 421 being convex in a paraxial region thereof and an image-side surface 422 being concave in a paraxial region thereof. The second lens element 420 is made of plastic material, and has the object-side surface 421 and the image-side surface 422 being both aspheric. Furthermore, each of the object-side surface 421 and the image-side surface 422 of the second lens element 420 includes at least one inflection point.

The third lens element 430 with positive refractive power has an object-side surface 431 being convex in a paraxial region thereof and an image-side surface 432 being convex in a paraxial region thereof. The third lens element 430 is made of plastic material, and has the object-side surface 431 and the image-side surface 432 being both aspheric.

The fourth lens element 440 with positive refractive power has an object-side surface 441 being concave in a paraxial region thereof and an image-side surface 442 being convex in a paraxial region thereof. The fourth lens element 440 is made of plastic material, and has the object-side surface 441 and the image-side surface 442 being both aspheric.

The fifth lens element 450 with positive refractive power has an object-side surface 451 being concave in a paraxial region thereof and an image-side surface 452 being convex in a paraxial region thereof. The fifth lens element 450 is made of plastic material, and has the object-side surface 451 and the image-side surface 452 being both aspheric.

The sixth lens element 460 with negative refractive power has an object-side surface 461 being concave in a paraxial region thereof and an image-side surface 482 being concave in a paraxial region thereof. The sixth lens element 460 is made of plastic material, and has the object-side surface 461 and the image-side surface 462 being both aspheric. Furthermore, the image-side surface 462 of the sixth lens element 460 includes at least one inflection point.

The seventh lens element 470 with negative refractive power has an object-side surface 471 being concave in a paraxial region thereof and an image-side surface 472 being concave in a paraxial region thereof. The seventh lens element 470 is made of plastic material, and has the object-side surface 471 and the image-side surface 472 being both aspheric. Furthermore, each of the object-side surface 471 and the image-side surface 472 of the seventh lens element 470 includes at least one inflection point.

The filter 480 is made of a glass material and located between the seventh lens element 470 and the image surface 490, and will not affect the focal length of the image capturing optical system.

The detailed optical data of the 4th embodiment are shown in Table 7 and the aspheric surface data are shown in Table 8 below.

TABLE 7

4th Embodiment
f = 3.91 mm, Fno = 1.45, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.480 | | | | |
| 2 | Lens 1 | 2.112 | ASP | 0.583 | Plastic | 1.534 | 55.9 | 4.89 |
| 3 | | 10.002 | ASP | 0.050 | | | | |
| 4 | Lens 2 | 2.287 | ASP | 0.200 | Plastic | 1.671 | 19.3 | −6.56 |
| 5 | | 1.452 | ASP | 0.210 | | | | |
| 6 | Lens 3 | 3.157 | ASP | 0.599 | Plastic | 1.559 | 40.4 | 5.19 |
| 7 | | −32.834 | ASP | −0.015 | | | | |

TABLE 7-continued

4th Embodiment
f = 3.91 mm, Fno = 1.45, HFOV = 40.0 deg.

| Surface # | | Curvature Radius | | Thickness | Material | Index | Abbe # | Focal Length |
|---|---|---|---|---|---|---|---|---|
| 8 | Stop | Plano | | 0.286 | | | | |
| 9 | Lens 4 | −122.839 | ASP | 0.257 | Plastic | 1.634 | 23.8 | 134.70 |
| 10 | | −50.417 | ASP | 0.327 | | | | |
| 11 | Lens 5 | −16.808 | ASP | 0.685 | Plastic | 1.534 | 55.9 | 4.43 |
| 12 | | −2.101 | ASP | 0.035 | | | | |
| 13 | Lens 6 | −33.626 | ASP | 0.296 | Plastic | 1.660 | 20.4 | −12.69 |
| 14 | | 11.190 | ASP | 0.656 | | | | |
| 15 | Lens 7 | −6.110 | ASP | 0.200 | Plastic | 1.534 | 55.9 | −2.87 |
| 16 | | 2.067 | ASP | 0.200 | | | | |
| 17 | Filter | Plano | | 0.210 | Glass | 1.517 | 64.2 | — |
| 18 | | Plano | | 0.265 | | | | |
| 19 | Image | Plano | | — | | | | |

Reference wavelength is 587.6 nm (d-line).
Effective radius of Stop on Surface 8 is 1.126 mm.

TABLE 8

Aspheric Coefficients

| Surface # | 2 | 3 | 4 | 5 | 6 | 7 | 9 |
|---|---|---|---|---|---|---|---|
| k = | −3.7763E−01 | −5.5110E+00 | −4.1219E−01 | −6.0000E−01 | −6.6975E+00 | −5.7411E+01 | −6.0793E+00 |
| A4 = | −2.5340E−03 | 7.6871E−03 | −1.5424E−01 | −1.6548E−01 | 2.3682E−02 | −4.2734E−02 | −1.6317E−01 |
| A6 = | 3.6742E−02 | 9.5136E−02 | 2.4293E−01 | 1.9826E−01 | 6.6881E−02 | −4.0771E−04 | 3.0305E−02 |
| A8 = | −7.6956E−02 | −2.3206E−01 | −4.3265E−01 | −2.8199E−01 | −1.4905E−01 | 1.4678E−02 | −7.7842E−02 |
| A10 = | 9.0550E−02 | 2.9296E−01 | 4.8652E−01 | 2.7837E−01 | 2.0530E−01 | −1.3192E−02 | 1.0999E−01 |
| A12 = | −5.9800E−02 | −2.1025E−01 | −3.2724E−01 | −1.7472E−01 | −1.6735E−01 | −1.0195E−03 | −6.6574E−02 |
| A14 = | 2.1121E−02 | 8.2506E−02 | 1.2119E−01 | 6.2827E−02 | 7.4315E−02 | 7.2571E−03 | 1.7393E−02 |
| A16 = | −3.0590E−03 | −1.3823E−02 | −1.9271E−02 | −1.0048E−02 | −1.3743E−02 | −2.8515E−03 | −1.2172E−03 |

| Surface # | 10 | 11 | 12 | 13 | 14 | 15 | 16 |
|---|---|---|---|---|---|---|---|
| k = | −8.6679E−10 | −4.6232E+01 | −1.0249E+01 | −3.6614E+01 | −5.5111E+00 | −8.9979E+01 | −1.9377E+01 |
| A4 = | −1.3454E−01 | −3.9448E−02 | 6.2631E−02 | 8.7782E−02 | −2.0100E−02 | −3.7075E−01 | −1.2272E−01 |
| A6 = | −2.6405E−02 | 1.8391E−01 | −3.1111E−01 | −3.9141E−01 | −6.4115E−02 | 3.7699E−01 | 8.1707E−02 |
| A8 = | 5.9541E−02 | −7.8957E−01 | 4.9110E−01 | 4.5546E−01 | −5.0287E−02 | −3.7385E−01 | −4.8625E−02 |
| A10 = | −1.1223E−01 | 1.6291E+00 | −6.4627E−01 | −4.9653E−01 | 1.4763E−01 | 2.5574E−01 | 2.2014E−02 |
| A12 = | 1.6764E−01 | −2.1482E+00 | 6.7540E−01 | 5.3443E−01 | −1.2296E−01 | −1.0888E−01 | −6.9698E−03 |
| A14 = | −1.3323E−01 | 1.8432E+00 | −4.9233E−01 | −4.1162E−01 | 5.3714E−02 | 2.8759E−02 | 1.4615E−03 |
| A16 = | 5.2472E−02 | −9.9772E−01 | 2.2199E−01 | 1.8766E−01 | −1.3272E−02 | −4.6619E−03 | −1.9262E−04 |
| A18 = | −8.1428E−03 | 3.0952E−01 | −5.4824E−02 | −4.5125E−02 | 1.7537E−03 | 4.3677E−04 | 1.4386E−05 |
| A20 = | | −4.2382E−02 | 5.6208E−03 | 4.4068E−03 | −9.6247E−05 | −1.8688E−05 | −4.6183E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.91 | f1/f4 | 0.04 |
| Fno | 1.45 | f3/f1 | 1.06 |
| HFOV [deg.] | 40.0 | tan(HFOV) | 0.84 |
| T23/CT2 | 1.05 | f/EPD | 1.45 |
| T67/CT6 | 2.21 | TL/EPD | 1.87 |
| (T23 + T34 + T45 + T67)/(T12 + T56) | 17.23 | TL/ImgH | 1.51 |
| R1/R6 | −0.06 | TL [mm] | 5.04 |
| R4/R1 | 0.69 | SD/TD | 0.89 |
| |R5/R6| | 0.10 | CRAmax [deg.] | 36.88 |
| R14/R13 | −0.34 | (TL × f)/(EPD × ImgH) | 2.20 |
| R14/EPD | 0.77 | Yc72/Yc62 | 1.50 |
| R3/TD | 0.52 | Yc72/f | 0.24 |
| |f/f2| | 0.60 | | |

Furthermore, according to the 4th embodiment, each of at least two of the first lens element 410, the second lens element 420, the third lens element 430, the fourth lens element 440, the fifth lens element 450, the sixth lens element 480 and the seventh lens element 470 has an Abbe number which is smaller than 25.0; in detail, the Abbe numbers of the second lens element 420, the fourth lens element 440 and the sixth lens element 460 are smaller than 25.0.

According to the 4th embodiment, a number of inflection points on each of object-side surfaces and image-side surfaces of the first lens element 410, the second lens element 420, the third lens element 430, the fourth lens element 440, the fifth lens element 450, the sixth lens element 460 and the seventh lens element 470 is listed as follows.

| 4th Embodiment - Numbers of inflection points | | | | | | | |
|---|---|---|---|---|---|---|---|
| | 410 | 420 | 430 | 440 | 450 | 460 | 470 |
| Object-side surface | 0 | 1 | 0 | 0 | 0 | 0 | 1 |
| Image-side surface | 1 | 1 | 0 | 0 | 0 | 2 | 1 |

5th Embodiment

Figure 9:
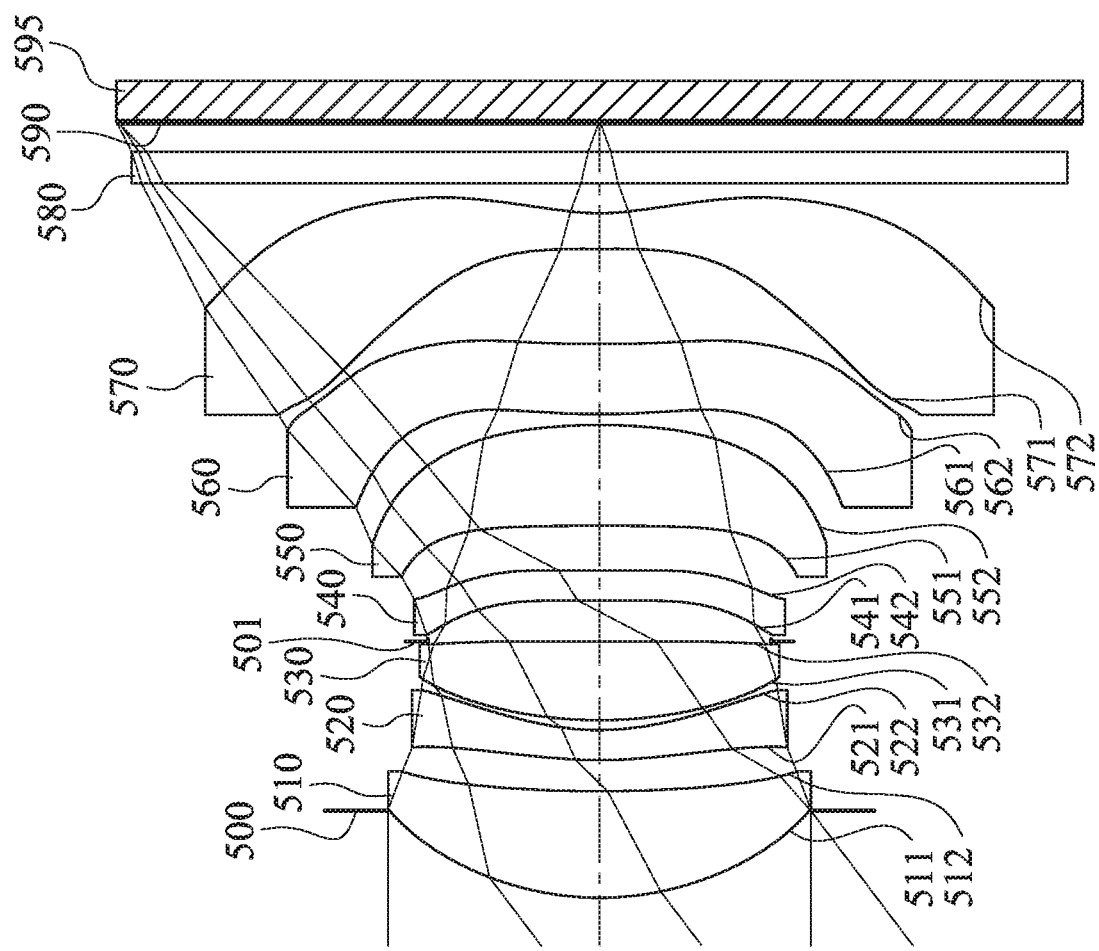
FIG. 9 is a schematic view of an imaging apparatus according to the 5th embodiment of the present disclosure.
Figure 10:
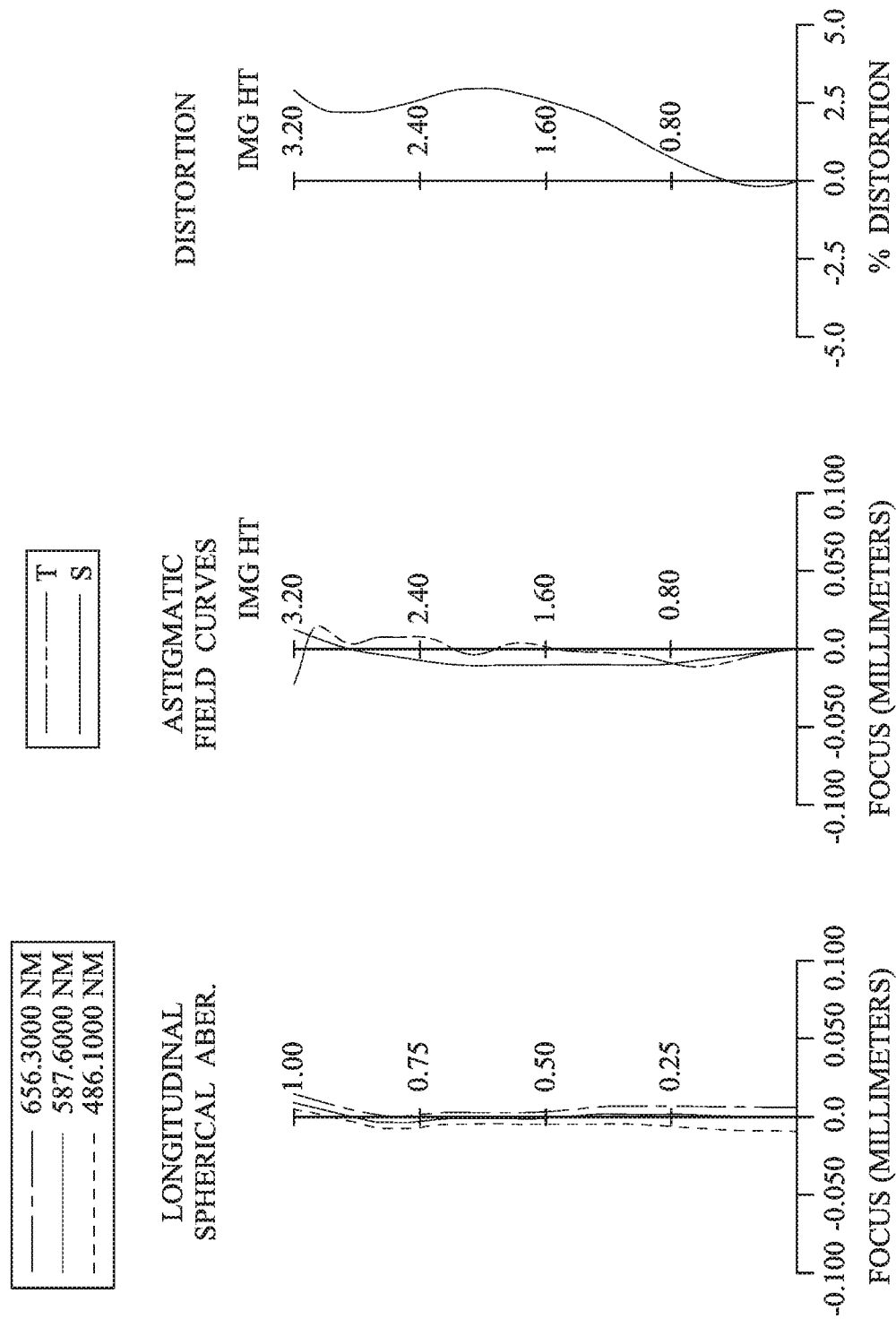
FIG. 10 shows spherical aberration curves, astigmatic field curves and a distortion curve of the imaging apparatus according to the 5th embodiment.

FIG. 9 is a schematic view of an imaging apparatus according to the 5th embodiment of the present disclosure. FIG. 10 shows spherical aberration curves, astigmatic field curves and a distortion curve of the imaging apparatus according to the 5th embodiment. In FIG. 9, the imaging apparatus includes an image capturing optical system (its reference numeral is omitted) and an image sensor 595. The image capturing optical system includes, in order from an object side to an image side, an aperture stop 500, a first lens element 510, a second lens element 520, a third lens element 530, a stop 501, a fourth lens element 540, a fifth lens element 550, a sixth lens element 560, a seventh lens element 570, a filter 580 and an image surface 590, wherein the image sensor 595 is disposed on the image surface 590 of the image capturing optical system.

The image capturing optical system includes seven lens elements (510, 520, 530, 540, 550, 560 and 570) without additional one or more lens elements inserted between the first lens element 510 and the seventh lens element 570, and each of the seven lens elements has an object-side surface towards the object side and an image-side surface towards the image side.

The first lens element 510 with positive refractive power has an object-side surface 511 being convex in a paraxial region thereof and an image-side surface 512 being concave in a paraxial region thereof. The first lens element 510 is made of a plastic material, and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 620 is made of plastic material, and has the object-side surface 521 and the image-side surface 522 being both aspheric. Furthermore, each of the object-side surface 521 and the image-side surface 522 of the second lens element 520 includes at least one inflection point.

The third lens element 530 with positive refractive power has an object-side surface 531 being convex in a paraxial region thereof and an image-side surface 532 being concave in a paraxial region thereof. The third lens element 530 is made of plastic material, and has the object-side surface 531 and the image-side surface 532 being both aspheric. Furthermore, the image-side surface 532 of the third lens element 530 includes at least one inflection point.

The fourth lens element 540 with negative refractive power has an object-side surface 541 being convex in a paraxial region thereof and an image-side surface 542 being concave in a paraxial region thereof. The fourth lens element 540 is made of plastic material, and has the object-side surface 541 and the image-side surface 542 being both aspheric. Furthermore, each of the object-side surface 541 and the image-side surface 542 of the fourth lens element 540 includes at least one inflection point.

The fifth lens element 550 with positive refractive power has an object-side surface 551 being concave in a paraxial region thereof and an image-side surface 552 being convex in a paraxial region thereof. The fifth lens element 550 is made of plastic material, and has the object-side surface 551 and the image-side surface 552 being both aspheric.

The sixth lens element 560 with positive refractive power has an object-side surface 561 being convex in a paraxial region thereof and an image-side surface 562 being concave in a paraxial region thereof. The sixth lens element 560 is made of plastic material, and has the object-side surface 561 and the image-side surface 562 being both aspheric. Furthermore, each of the object-side surface 561 and the image-side surface 562 of the sixth lens element 580 includes at least one inflection point.

The seventh lens element 570 with negative refractive power has an object-side surface 571 being convex in a paraxial region thereof and an image-side surface 572 being concave in a paraxial region thereof. The seventh lens element 570 is made of plastic material, and has the object-side surface 571 and the image-side surface 572 being both aspheric. Furthermore, each of the object-side surface 571 and the image-side surface 572 of the seventh lens element 570 includes at least one inflection point.

The filter 580 is made of a glass material and located between the seventh lens element 570 and the image surface 590, and will not affect the focal length of the image capturing optical system.

The detailed optical data of the 5th embodiment are shown in Table 9 and the aspheric surface data are shown in Table 10 below.

TABLE 9

5th Embodiment
f = 4.11 mm, Fno = 1.46, HFOV = 37.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.580 | | | | |
| 2 | Lens 1 | 2.040 | ASP | 0.710 | Plastic | 1.534 | 55.9 | 4.82 |
| 3 | | 8.647 | ASP | 0.208 | | | | |
| 4 | Lens 2 | 3.135 | ASP | 0.200 | Plastic | 1.671 | 19.3 | −6.16 |
| 5 | | 1.737 | ASP | 0.066 | | | | |
| 6 | Lens 3 | 2.921 | ASP | 0.524 | Plastic | 1.559 | 40.4 | 5.71 |
| 7 | | 32.258 | ASP | 0.000 | | | | |
| 8 | Stop | Plano | | 0.274 | | | | |
| 9 | Lens 4 | 28.236 | ASP | 0.200 | Plastic | 1.634 | 23.8 | −70.05 |
| 10 | | 17.214 | ASP | 0.298 | | | | |

TABLE 9-continued

5th Embodiment
f = 4.11 mm, Fno = 1.46, HFOV = 37.1 deg.

| Surface # | | Curvature Radius | | Thickness | Material | Index | Abbe # | Focal Length |
|---|---|---|---|---|---|---|---|---|
| 11 | Lens 5 | −19.846 | ASP | 0.671 | Plastic | 1.534 | 55.9 | 7.12 |
| 12 | | −3.227 | ASP | 0.074 | | | | |
| 13 | Lens 6 | 8.162 | ASP | 0.466 | Plastic | 1.534 | 55.9 | 46.80 |
| 14 | | 11.882 | ASP | 0.634 | | | | |
| 15 | Lens 7 | 168.979 | ASP | 0.238 | Plastic | 1.534 | 55.9 | −3.00 |
| 16 | | 1.583 | ASP | 0.200 | | | | |
| 17 | Filter | Plano | | 0.210 | Glass | 1.517 | 64.2 | — |
| 18 | | Plano | | 0.198 | | | | |
| 19 | Image | Plano | | — | | | | |

Reference wavelength is 587.6 nm (d-line).
Effective radius of Stop on Surface 8 is 1.142 mm.

TABLE 10

Aspheric Coefficients

| Surface # | 2 | 3 | 4 | 5 | 6 | 7 | 9 |
|---|---|---|---|---|---|---|---|
| k = | −3.4676E−01 | −5.5111E+00 | −4.0000E−01 | −6.0517E−01 | −6.8499E+00 | −5.7411E+01 | −6.0793E+00 |
| A4 = | 3.3401E−03 | −1.0873E−02 | −1.5294E−01 | −1.7869E−01 | 2.8887E−03 | −4.0137E−02 | −1.7788E−01 |
| A6 = | 4.0881E−04 | 4.3770E−02 | 2.0546E−01 | 3.0680E−01 | 1.2962E−01 | 2.6369E−02 | −5.0725E−02 |
| A8 = | 1.0440E−02 | −7.7076E−02 | −3.2025E−01 | −4.9409E−01 | −2.1506E−02 | −3.0396E−02 | 1.9410E−01 |
| A10 = | −1.9707E−02 | 9.1328E−02 | 3.6043E−01 | 4.7116E−01 | 1.2929E−01 | 3.7709E−02 | −2.7272E−01 |
| A12 = | 1.7883E−02 | −6.2509E−02 | −2.4853E−01 | −2.4683E−01 | 1.6257E−02 | −4.7128E−02 | 2.2408E−01 |
| A14 = | −7.6123E−03 | 2.3306E−02 | 9.2065E−02 | 6.2472E−02 | −4.1725E−02 | 3.6547E−02 | −9.3723E−02 |
| A16 = | 1.3232E−03 | −3.6057E−03 | −1.4278E−02 | −5.7622E−03 | 1.1374E−02 | −1.0118E−02 | 1.5845E−02 |

| Surface # | 10 | 11 | 12 | 13 | 14 | 15 | 16 |
|---|---|---|---|---|---|---|---|
| k = | −7.1763E−05 | −4.6232E+01 | −1.0807E+01 | −3.6614E+01 | −5.5110E+00 | −8.9979E+01 | −1.9379E+01 |
| A4 = | −1.5303E−01 | 2.1835E−02 | 1.8490E−01 | 2.3691E−01 | 7.1008E−02 | −4.6763E−01 | −8.9838E−02 |
| A6 = | −3.2481E−02 | −9.0723E−02 | −7.9611E−01 | −8.8495E−01 | −1.5853E−01 | 7.0728E−01 | 6.1981E−02 |
| A8 = | 2.8750E−02 | −7.4738E−02 | 1.2594E+00 | 1.2383E+00 | 3.9023E−03 | −9.1531E−01 | −5.2482E−02 |
| A10 = | 1.3676E−01 | 3.5803E−01 | −1.2730E+00 | −1.2056E+00 | 1.1870E−01 | 7.4519E−01 | 3.2048E−02 |
| A12 = | −2.7587E−01 | −5.6580E−01 | 8.9190E−01 | 8.9657E−01 | −9.6135E−02 | −3.6584E−01 | −1.1927E−02 |
| A14 = | 2.4746E−01 | 5.0794E−01 | −4.3954E−01 | −4.8090E−01 | 3.6153E−02 | 1.0904E−01 | 2.6633E−03 |
| A16 = | −1.1060E−01 | −2.7305E−01 | 1.4434E−01 | 1.6580E−01 | −7.4099E−03 | −1.9339E−02 | −3.5034E−04 |
| A18 = | 2.0418E−02 | 8.0609E−02 | −2.8021E−02 | −3.2032E−02 | 8.0913E−04 | 1.8806E−03 | 2.5067E−05 |
| A20 = | | −1.0144E−02 | 2.3925E−03 | 2.6105E−03 | −3.7411E−05 | −7.7381E−05 | −7.5281E−07 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table as the following values and satisfy the following conditions:

| 5th Embodiment | | | |
|---|---|---|---|
| f [mm] | 4.11 | f1/f4 | −0.07 |
| Fno | 1.46 | f3/f1 | 1.18 |
| HFOV [deg.] | 37.1 | tan(HFOV) | 0.76 |
| T23/CT2 | 0.33 | f/EPD | 1.46 |
| T67/CT6 | 1.36 | TL/EPD | 1.84 |
| (T23 + T34 + T45 + T67)/(T12 + T56) | 4.52 | TL/ImgH | 1.62 |
| R1/R6 | 0.06 | TL [mm] | 5.17 |
| R4/R1 | 0.85 | SD/TD | 0.87 |
| |R5/R6| | 0.09 | CRAmax [deg.] | 35.89 |
| R14/R13 | 0.01 | (TL × f)/(EPD × ImgH) | 2.36 |
| R14/EPD | 0.56 | Yc72/Yc62 | 1.35 |

-continued

| 5th Embodiment | | | |
|---|---|---|---|
| R3/TD | 0.69 | Yc72/f | 0.25 |
| |f/f2| | 0.67 | | |

Furthermore, according to the 5th embodiment, each of at least two of the first lens element 510, the second lens element 520, the third lens element 530, the fourth lens element 540, the fifth lens element 550, the sixth lens element 560 and the seventh lens element 570 has an Abbe number which is smaller than 25.0; In detail, the Abbe numbers of the second lens element 520 and the fourth lens element 540 are smaller than 25.0.

According to the 5th embodiment, a number of inflection points on each of object-side surfaces and image-side surfaces of the first lens element 510, the second lens element 520, the third lens element 530, the fourth lens element 540, the fifth lens element 550, the sixth lens element 560 and the seventh lens element 570 is listed as follows.

| 5th Embodiment - Numbers of inflection points | | | | | | | |
|---|---|---|---|---|---|---|---|
| | 510 | 520 | 530 | 540 | 550 | 560 | 570 |
| Object-side surface | 0 | 1 | 0 | 1 | 0 | 1 | 3 |
| Image-side surface | 0 | 1 | 2 | 2 | 0 | 3 | 3 |

6th Embodiment

Figure 11:
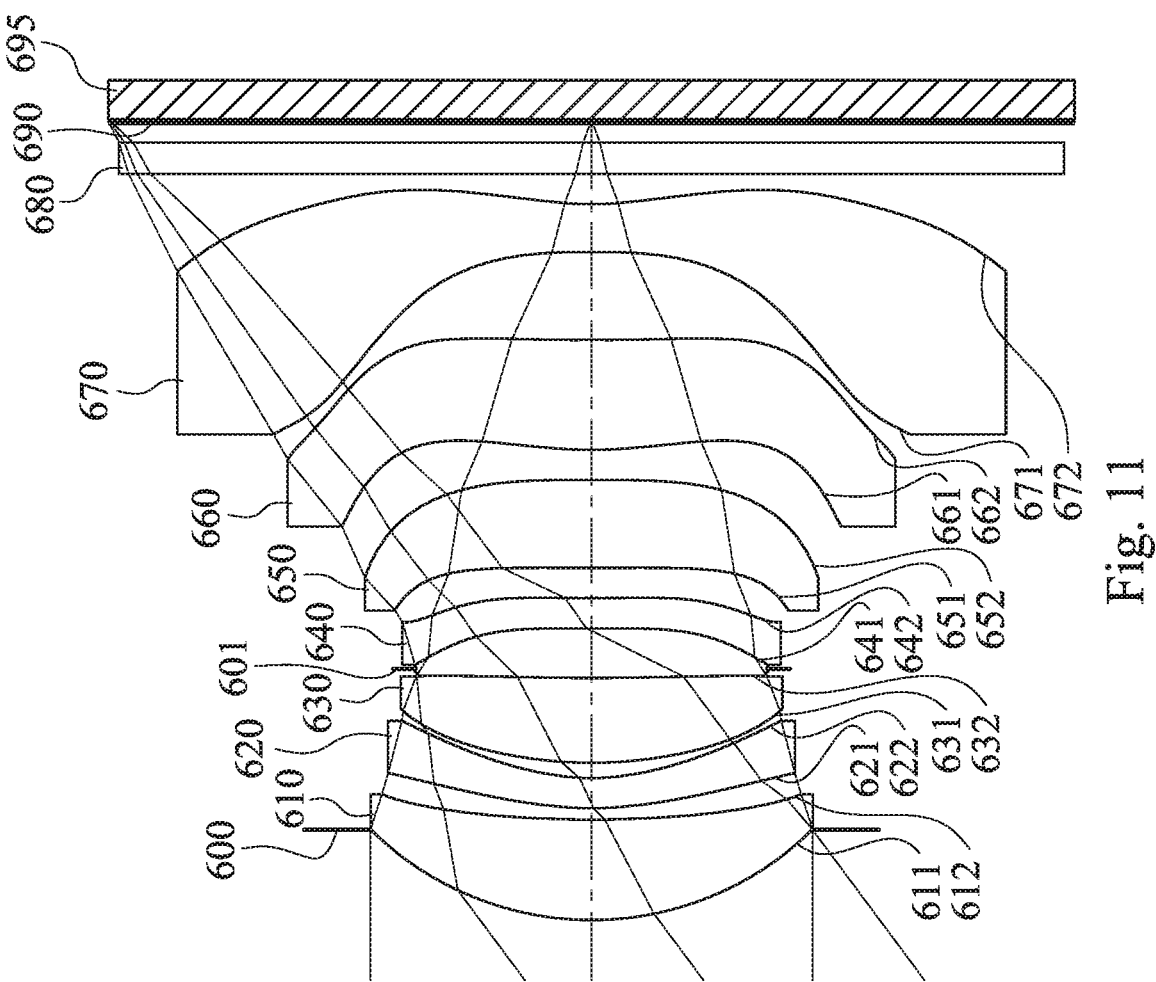
FIG. 11 is a schematic view of an imaging apparatus according to the 6th embodiment of the present disclosure.
Figure 12:
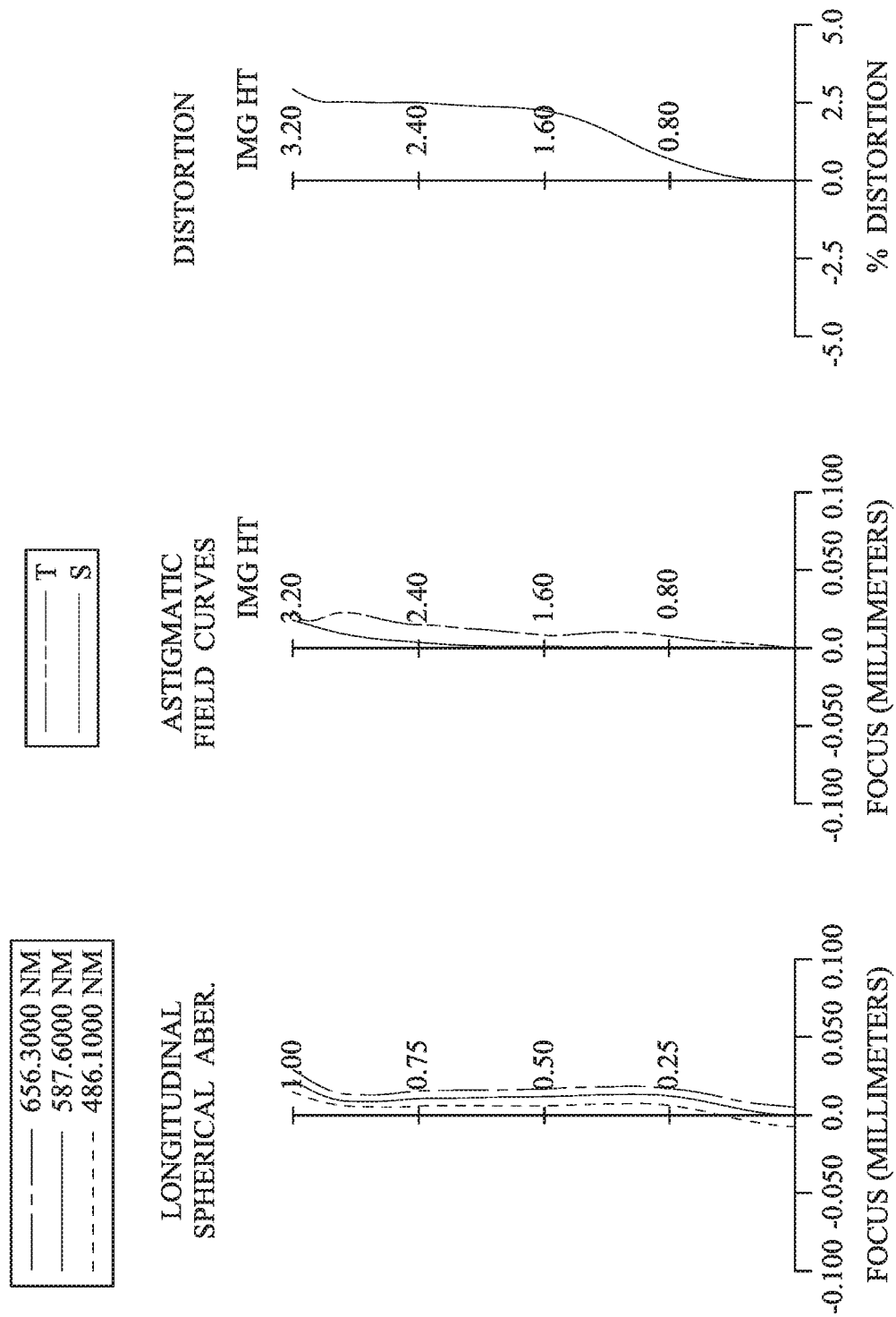
FIG. 12 shows spherical aberration curves, astigmatic field curves and a distortion curve of the imaging apparatus according to the 6th embodiment.

FIG. 11 is a schematic view of an imaging apparatus according to the 6th embodiment of the present disclosure. FIG. 12 shows spherical aberration curves, astigmatic field curves and a distortion curve of the imaging apparatus according to the 6th embodiment. In FIG. 11, the imaging apparatus includes an image capturing optical system (Its reference numeral is omitted) and an image sensor 695. The image capturing optical system includes, in order from an object side to an image side, an aperture stop 600, a first lens element 610, a second lens element 620, a third lens element 630, a stop 601, a fourth lens element 640, a fifth lens element 650, a sixth lens element 660, a seventh lens element 670, a filter 680 and an image surface 690, wherein the image sensor 695 is disposed on the image surface 690 of the image capturing optical system.

The image capturing optical system includes seven lens elements (610, 620, 630, 640, 650, 660 and 670) without additional one or more lens elements inserted between the first lens element 610 and the seventh lens element 670, and each of the seven lens elements has an object-side surface towards the object side and an image-side surface towards the image side.

The first lens element 610 with positive refractive power has an object-side surface 611 being convex in a paraxial region thereof and an image-side surface 612 being concave in a paraxial region thereof. The first lens element 610 is made of a plastic material, and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The 20 second lens element 620 is made of plastic material, and has the object-side surface 621 and the image-side surface 622 being both aspheric. Furthermore, each of the object-side surface 621 and the image-side surface 622 of the second lens element 620 includes at least one inflection point.

The third lens element 630 with positive refractive power has an object-side surface 631 being convex in a paraxial region thereof and an image-side surface 632 being concave in a paraxial region thereof. The third lens element 630 is made of plastic material, and has the object-side surface 631 and the image-side surface 632 being both aspheric. Furthermore, the image-side surface 632 of the third lens element 630 includes at least one inflection point.

The fourth lens element 640 with negative refractive power has an object-side surface 641 being convex in a paraxial region thereof and an image-side surface 642 being concave in a paraxial region thereof. The fourth lens element 640 is made of plastic material, and has the object-side surface 641 and the image-side surface 642 being both aspheric. Furthermore, each of the object-side surface 641 and the image-side surface 642 of the fourth lens element 640 includes at least one inflection point.

The fifth lens element 650 with positive refractive power has an object-side surface 651 being convex in a paraxial region thereof and an image-side surface 652 being convex in a paraxial region thereof. The fifth lens element 650 is made of plastic material, and has the object-side surface 651 and the image-side surface 652 being both aspheric. Furthermore, the object-side surface 651 of the fifth lens element 650 includes at least one inflection point.

The sixth lens element 660 with positive refractive power has an object-side surface 661 being convex in a paraxial region thereof and an image-side surface 662 being concave in a paraxial region thereof. The sixth lens element 660 is made of plastic material, and has the object-side surface 661 and the image-side surface 662 being both aspheric. Furthermore, each of the object-side surface 661 and the image-side surface 662 of the sixth lens element 660 includes at least one inflection point.

The seventh lens element 670 with negative refractive power has an object-side surface 671 being concave in a paraxial region thereof and an image-side surface 672 being concave in a paraxial region thereof. The seventh lens element 670 is made of plastic material, and has the object-side surface 671 and the image-side surface 672 being both aspheric. Furthermore, each of the object-side surface 671 and the image-side surface 672 of the seventh lens element 670 includes at least one inflection point.

The filter 680 is made of a glass material and located between the seventh lens element 670 and the image surface 690, and will not affect the focal length of the image capturing optical system.

The detailed optical data of the 6th embodiment are shown in Table 11 and the aspheric surface data are shown in Table 12 below.

TABLE 11

6th Embodiment
f = 4.17 mm, Fno = 1.42, HFOV = 36.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.600 | | | | |
| 2 | Lens 1 | 2.087 | ASP | 0.668 | Plastic | 1.534 | 55.9 | 5.19 |
| 3 | | 7.491 | ASP | 0.076 | | | | |
| 4 | Lens 2 | 2.291 | ASP | 0.200 | Plastic | 1.671 | 19.3 | −7.67 |
| 5 | | 1.530 | ASP | 0.102 | | | | |
| 6 | Lens 3 | 2.776 | ASP | 0.564 | Plastic | 1.534 | 55.9 | 6.38 |
| 7 | | 13.899 | ASP | 0.060 | | | | |
| 8 | Stop | Plano | | 0.271 | | | | |
| 9 | Lens 4 | 739.602 | ASP | 0.200 | Plastic | 1.559 | 40.4 | −24.92 |
| 10 | | 13.667 | ASP | 0.201 | | | | |
| 11 | Lens 5 | 85.531 | ASP | 0.586 | Plastic | 1.534 | 55.9 | 37.09 |

TABLE 11-continued

6th Embodiment
f = 4.17 mm, Fno = 1.42, HFOV = 36.6 deg.

| Surface # | | Curvature Radius | | Thickness | Material | Index | Abbe # | Focal Length |
|---|---|---|---|---|---|---|---|---|
| 12 | | −25.706 | ASP | 0.200 | | | | |
| 13 | Lens 6 | 3.037 | ASP | 0.730 | Plastic | 1.534 | 55.9 | 6.83 |
| 14 | | 16.607 | ASP | 0.585 | | | | |
| 15 | Lens 7 | −9.197 | ASP | 0.318 | Plastic | 1.534 | 55.9 | −3.20 |
| 16 | | 2.119 | ASP | 0.200 | | | | |
| 17 | Filter | Plano | | 0.210 | Glass | 1.517 | 64.2 | — |
| 18 | | Plano | | 0.139 | | | | |
| 19 | Image | Plano | | — | | | | |

Reference wavelength is 587.6 nm (d-line).
Effective radius of Stop on Surface 8 is 1.169 mm.

TABLE 12

Aspheric Coefficients

| Surface # | 2 | 3 | 4 | 5 | 6 | 7 | 9 |
|---|---|---|---|---|---|---|---|
| k = | −5.2123E−01 | −5.5111E+00 | −4.0000E−01 | −6.0000E−01 | −5.5492E+00 | −5.7411E+01 | −6.0793E+00 |
| A4 = | 6.7501E−03 | −3.0211E−02 | −1.8195E−01 | −2.0470E−01 | −6.6854E−03 | −2.4778E−02 | −1.7342E−01 |
| A6 = | 3.8466E−03 | 1.2727E−01 | 3.3178E−01 | 3.3073E−01 | 5.3820E−02 | 7.0201E−04 | 1.7991E−02 |
| A8 = | −6.3514E−03 | −2.1244E−01 | −4.9878E−01 | −4.2105E−01 | 4.1072E−02 | 1.5467E−02 | −4.3519E−02 |
| A10 = | 6.4908E−03 | 2.0248E−01 | 4.6362E−01 | 2.9918E−01 | −1.9181E−01 | −1.9584E−02 | 1.3125E−01 |
| A12 = | −3.4514E−03 | −1.1131E−01 | −2.5469E−01 | −9.8687E−02 | 2.1894E−01 | 1.0199E−02 | −1.3975E−01 |
| A14 = | 9.5256E−04 | 3.3287E−02 | 7.6548E−02 | 7.1490E−03 | −1.0547E−01 | −1.4796E−03 | 7.3883E−02 |
| A16 = | −8.7889E−05 | −4.1665E−03 | −9.7702E−03 | 1.7140E−03 | 1.8945E−02 | −2.1400E−04 | −1.5389E−02 |

| Surface # | 10 | 11 | 12 | 13 | 14 | 15 | 16 |
|---|---|---|---|---|---|---|---|
| k = | −7.1763E−05 | −4.6232E+01 | −1.0807E+01 | −3.6614E+01 | −5.5110E+00 | −8.9979E+01 | −1.9379E+01 |
| A4 = | −1.4188E−01 | −2.1015E−02 | −1.3780E−01 | 1.3398E−02 | −1.1324E−02 | −3.0902E−01 | −1.0372E−01 |
| A6 = | −3.0183E−02 | −2.9224E−02 | 1.3369E−01 | −1.4464E−01 | −4.1586E−03 | 3.3468E−01 | 9.2664E−02 |
| A8 = | 4.4309E−02 | −1.1476E−02 | −1.9136E−01 | 2.0567E−01 | −3.2995E−02 | −3.1558E−01 | −6.1913E−02 |
| A10 = | 3.2749E−03 | −5.0416E−02 | 1.8850E−01 | −2.4699E−01 | 2.5862E−02 | 1.9497E−01 | 2.5352E−02 |
| A12 = | −6.3614E−03 | 1.8155E−01 | −1.3292E−01 | 2.0499E−01 | −9.8116E−03 | −8.2045E−02 | −6.4034E−03 |
| A14 = | −1.3962E−03 | −2.3872E−01 | 6.4713E−02 | −1.1107E−01 | 1.4895E−03 | 2.3861E−02 | 1.0147E−03 |
| A16 = | 1.3427E−03 | 1.6046E−01 | −2.1610E−02 | 3.7223E−02 | 1.4898E−04 | −4.4893E−03 | −9.9114E−05 |
| A18 = | 4.7351E−04 | −5.6255E−02 | 4.5813E−03 | −7.0397E−03 | −6.8028E−05 | 4.8117E−04 | 5.4834E−06 |
| A20 = | | 8.0341E−03 | −4.8235E−04 | 5.7791E−04 | 5.1332E−06 | −2.2093E−05 | −1.3182E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 4.17 | f1/f4 | −0.21 |
| Fno | 1.42 | f3/f1 | 1.23 |
| HFOV [deg.] | 36.6 | tan(HFOV) | 0.74 |
| T23/CT2 | 0.51 | f/EPD | 1.42 |
| T67/CT6 | 0.80 | TL/EPD | 1.81 |
| (T23 + T34 + T45 + T67)/(T12 + T56) | 4.43 | TL/ImgH | 1.66 |
| R1/R6 | 0.15 | TL [mm] | 5.31 |
| R4/R1 | 0.73 | SD/TD | 0.87 |
| |R5/R6| | 0.20 | CRAmax [deg.] | 36.45 |
| R14/R13 | −0.23 | (TL × f)/(EPD × ImgH) | 2.36 |

-continued

| 6th Embodiment | | | |
|---|---|---|---|
| R14/EPD | 0.72 | Yc72/Yc62 | 1.52 |
| R3/TD | 0.48 | Yc72/f | 0.27 |
| |f/f2| | 0.54 | | |

According to the 6th embodiment, a number of inflection points on each of object-side surfaces and image-side surfaces of the first lens element 610, the second lens element 620, the third lens element 630, the fourth lens element 640, the fifth lens element 650, the sixth lens element 660 and the seventh lens element 670 is listed as follows.

| 6th Embodiment - Numbers of inflection points | | | | | | | |
|---|---|---|---|---|---|---|---|
| | 610 | 620 | 630 | 640 | 650 | 660 | 670 |
| Object-side surface | 0 | 1 | 0 | 1 | 1 | 2 | 2 |
| Image-side surface | 0 | 1 | 1 | 2 | 0 | 3 | 1 |

7th Embodiment

Figure 13:
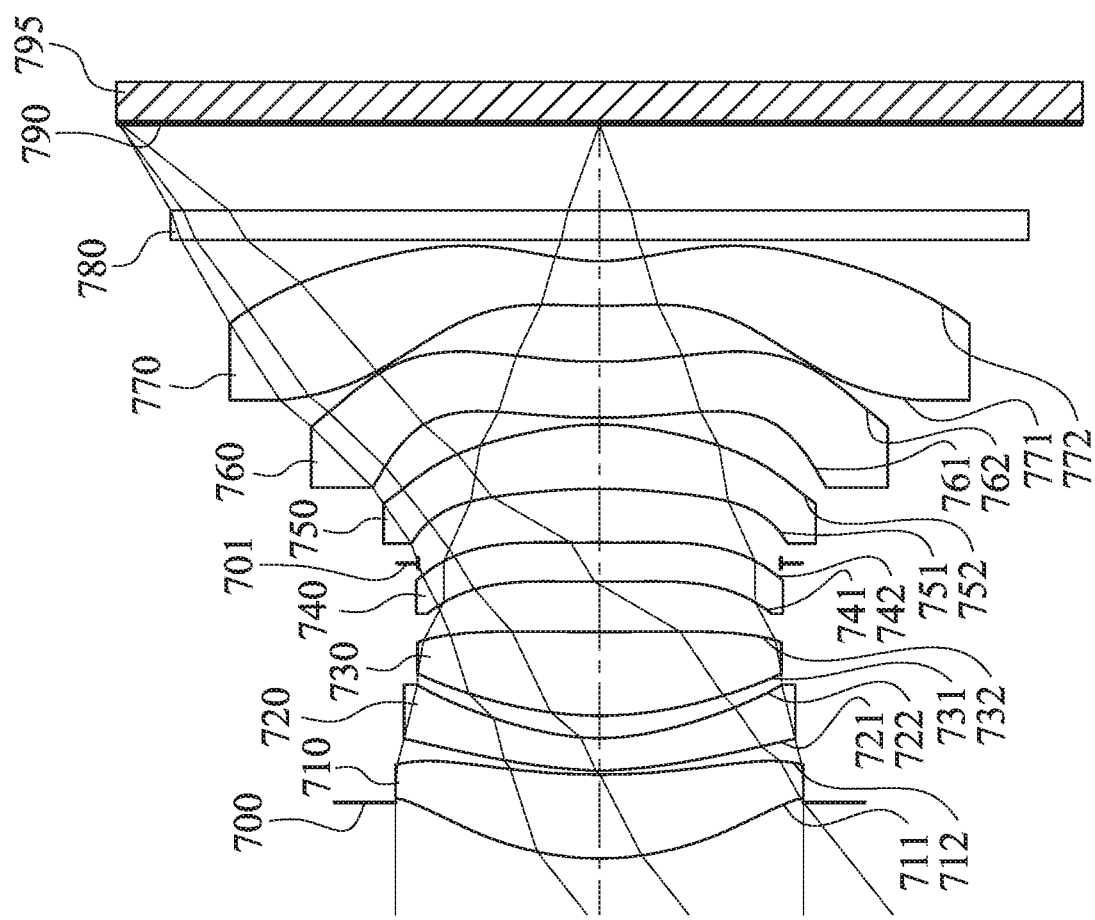
FIG. 13 is a schematic view of an imaging apparatus according to the 7th embodiment of the present disclosure.
Figure 14:
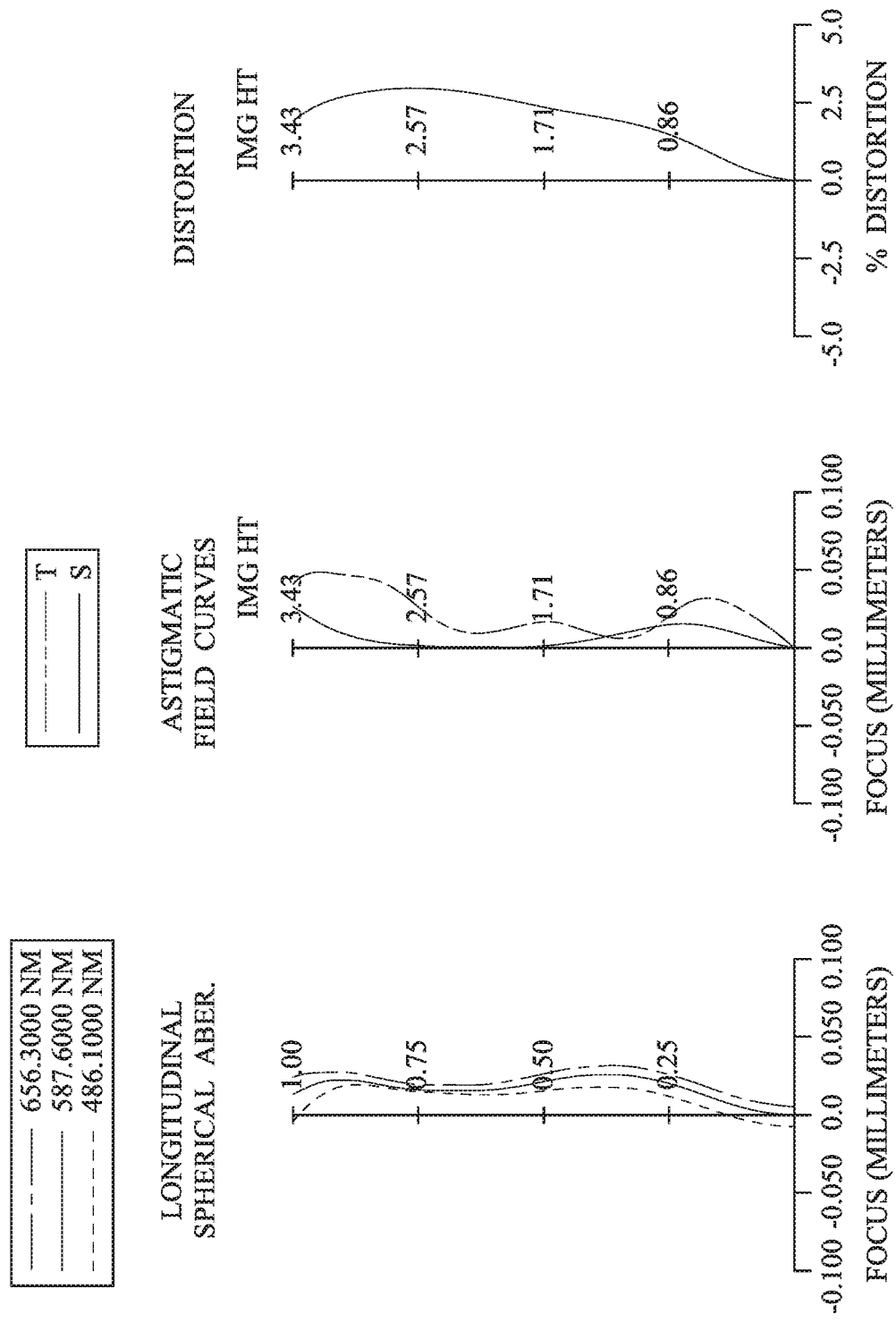
FIG. 14 shows spherical aberration curves, astigmatic field curves and a distortion curve of the imaging apparatus according to the 7th embodiment.

FIG. 13 is a schematic view of an imaging apparatus according to the 7th embodiment of the present disclosure. FIG. 14 shows spherical aberration curves, astigmatic field curves and a distortion curve of the imaging apparatus according to the 7th embodiment. In FIG. 13, the imaging apparatus includes an image capturing optical system (its reference numeral is omitted) and an image sensor 795. The image capturing optical system includes, in order from an object side to an image side, an aperture stop 700, a first lens element 710, a second lens element 720, a third lens element 730, a fourth lens element 740, a stop 701, a fifth lens element 750, a sixth lens element 760, a seventh lens element 770, a filter 780 and an image surface 790, wherein the image sensor 795 is disposed on the image surface 790 of the image capturing optical system.

The image capturing optical system includes seven lens elements (710, 720, 730, 740, 750, 760 and 770) without additional one or more lens elements inserted between the first lens element 710 and the seventh lens element 770, and each of the seven lens elements has an object-side surface towards the object side and an image-side surface towards the image side.

The first lens element 710 with positive refractive power has an object-side surface 711 being convex in a paraxial region thereof and an image-side surface 712 being concave in a paraxial region thereof. The first lens element 710 is made of a plastic material, and has the object-side surface 711 and the image-side surface 712 being both aspheric. Furthermore, each of the object-side surface 711 and the image-side surface 712 of the first lens element 710 includes at least one inflection point.

The second lens element 720 with negative refractive power has an object-side surface 721 being convex in a paraxial region thereof and an image-side surface 722 being concave in a paraxial region thereof. The second lens element 720 is made of plastic material, and has the object-side surface 721 and the image-side surface 722 being both aspheric. Furthermore, the object-side surface 721 of the second lens element 720 includes at least one inflection point.

The third lens element 730 with positive refractive power has an object-side surface 731 being convex in a paraxial region thereof and an image-side surface 732 being concave in a paraxial region thereof. The third lens element 730 is made of plastic material, and has the object-side surface 731 and the image-side surface 732 being both aspheric. Furthermore, the image-side surface 732 of the third lens element 730 includes at least one inflection point.

The fourth lens element 740 with positive refractive power has an object-side surface 741 being convex in a paraxial region thereof and an image-side surface 742 being concave in a paraxial region thereof. The fourth lens element 740 is made of plastic material, and has the object-side surface 741 and the image-side surface 742 being both aspheric. Furthermore, each of the object-side surface 741 and the image-side surface 742 of the fourth lens element 740 includes at least one inflection point.

The fifth lens element 750 with positive refractive power has an object-side surface 751 being concave in a paraxial region thereof and an image-side surface 752 being convex in a paraxial region thereof. The fifth lens element 750 is made of plastic material, and has the object-side surface 751 and the image-side surface 752 being both aspheric. Furthermore, the image-side surface 752 of the fifth lens element 750 includes at least one inflection point.

The sixth lens element 760 with negative refractive power has an object-side surface 761 being convex in a paraxial region thereof and an image-side surface 762 being concave in a paraxial region thereof. The sixth lens element 760 is made of plastic material, and has the object-side surface 761 and the image-side surface 762 being both aspheric. Furthermore, each of the object-side surface 761 and the image-side surface 762 of the sixth lens element 760 includes at least one inflection point.

The seventh lens element 770 with negative refractive power has an object-side surface 771 being convex in a paraxial region thereof and an image-side surface 772 being concave in a paraxial region thereof. The seventh lens element 770 is made of plastic material, and has the object-side surface 771 and the image-side surface 772 being both aspheric. Furthermore, each of the object-side surface 771 and the image-side surface 772 of the seventh lens element 770 includes at least one inflection point.

The filter 780 is made of a glass material and located between the seventh lens element 770 and the image surface 790, and will not affect the focal length of the image capturing optical system.

The detailed optical data of the 7th embodiment are shown in Table 13 and the aspheric surface data are shown in Table 14 below.

TABLE 13

7th Embodiment
f = 4.22 mm, Fno = 1.45, HFOV = 38.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.400 | | | | |
| 2 | Lens 1 | 2.123 | ASP | 0.598 | Plastic | 1.545 | 56.0 | 6.23 |
| 3 | | 5.106 | ASP | 0.030 | | | | |
| 4 | Lens 2 | 2.597 | ASP | 0.230 | Plastic | 1.660 | 20.4 | −7.95 |
| 5 | | 1.676 | ASP | 0.160 | | | | |
| 6 | Lens 3 | 2.529 | ASP | 0.597 | Plastic | 1.544 | 55.9 | 5.15 |
| 7 | | 23.939 | ASP | 0.359 | | | | |
| 8 | Lens 4 | 19.422 | ASP | 0.280 | Plastic | 1.660 | 20.4 | 88.83 |
| 9 | | 28.878 | ASP | −0.150 | | | | |
| 10 | Stop | Plano | | 0.532 | | | | |
| 11 | Lens 5 | −4.310 | ASP | 0.458 | Plastic | 1.544 | 55.9 | 5.92 |
| 12 | | −1.911 | ASP | 0.050 | | | | |
| 13 | Lens 6 | 5.677 | ASP | 0.398 | Plastic | 1.660 | 20.4 | −15.22 |
| 14 | | 3.526 | ASP | 0.397 | | | | |
| 15 | Lens 7 | 4.166 | ASP | 0.320 | Plastic | 1.544 | 55.9 | −4.23 |

TABLE 13-continued

7th Embodiment
f = 4.22 mm, Fno = 1.45, HFOV = 38.5 deg.

| Surface # | | Curvature Radius | | Thickness | Material | Index | Abbe # | Focal Length |
|---|---|---|---|---|---|---|---|---|
| 16 | | 1.442 | ASP | 0.150 | | | | |
| 17 | Filter | Plano | | 0.210 | Glass | 1.517 | 64.2 | — |
| 18 | | Plano | | 0.624 | | | | |
| 19 | Image | Plano | | — | | | | |

Reference wavelength is 587.6 nm (d-line).
Effective radius of Stop on Surface 10 is 1.291 mm.

TABLE 14

Aspheric Coefficients

| Surface # | 2 | 3 | 4 | 5 | 6 | 7 | 8 |
|---|---|---|---|---|---|---|---|
| k = | −3.9375E−03 | −4.6348E+01 | −9.3756E−01 | −7.2043E−01 | −1.5599E+01 | −1.4893E+00 | −9.0000E+01 |
| A4 = | −5.1106E−04 | 5.6094E−02 | −8.5483E−02 | −1.3489E−01 | 7.9114E−02 | −3.1653E−02 | −1.1296E−01 |
| A6 = | −9.4003E−03 | −8.0936E−02 | 5.0256E−02 | 1.1764E−01 | −8.1557E−02 | 1.5753E−03 | 2.4740E−01 |
| A8 = | 1.6369E−03 | 4.8519E−02 | −4.6751E−02 | −8.8916E−02 | 9.1603E−02 | −2.9039E−03 | −1.0206E−01 |
| A10 = | −2.1212E−03 | −1.6473E−02 | 3.9952E−02 | 4.4177E−02 | −8.0845E−02 | −2.4411E−04 | 1.3480E−01 |
| A12 = | 3.0256E−05 | 1.9837E−03 | −1.6662E−02 | −1.0770E−02 | 3.9663E−02 | −1.8758E−04 | −8.3328E−02 |
| A14 = | | | 2.5021E−03 | 9.9730E−04 | −7.4806E−03 | 1.0607E−04 | 2.3937E−02 |
| A16 = | | | | | | | −2.3326E−03 |

| Surface # | 9 | 11 | 12 | 13 | 14 | 15 | 16 |
|---|---|---|---|---|---|---|---|
| k = | −9.0000E+01 | −1.9979E+01 | −1.2059E+01 | −1.3565E+01 | −1.1541E+01 | −9.0000E+01 | −8.7835E+00 |
| A4 = | −9.4351E−02 | −4.4753E−02 | −3.1100E−02 | 8.0352E−02 | −1.5578E−02 | −2.9342E−01 | −1.7616E−01 |
| A6 = | 3.6894E−02 | 3.7501E−01 | 7.4869E−02 | −2.8453E−01 | −6.0648E−02 | 1.1975E−01 | 9.3325E−02 |
| A8 = | −1.2805E−01 | −1.0974E+00 | −2.3430E−01 | 3.1158E−01 | 3.9206E−02 | −1.1313E−01 | −3.3245E−02 |
| A10 = | 1.4056E−01 | 1.6973E+00 | 3.2495E−01 | −2.5525E−01 | −1.1695E−02 | −6.1699E−03 | 8.7078E−03 |
| A12 = | −6.8158E−02 | −1.6601E+00 | −2.5975E−01 | 1.5370E−01 | 1.9127E−04 | 2.7665E−03 | −1.6517E−03 |
| A14 = | 1.0638E−02 | 1.0190E+00 | 1.1990E−01 | −6.5995E−02 | 8.7239E−04 | −5.5689E−04 | 2.1258E−04 |
| A16 = | 2.1380E−03 | −3.7678E−01 | −3.0798E−02 | 1.7961E−02 | −2.3116E−04 | 6.3637E−05 | −1.7117E−05 |
| A18 = | −6.3511E−04 | 7.5603E−02 | 4.0405E−03 | −2.6368E−03 | 2.4083E−05 | −3.9570E−06 | 7.6341E−07 |
| A20 = | | −6.2369E−03 | −2.0967E−04 | 1.5578E−04 | −9.1403E−07 | 1.0311E−07 | −1.4211E−08 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 4.22 | f1/f4 | 0.07 |
| Fno | 1.45 | f3/f1 | 0.83 |
| HFOV [deg.] | 38.5 | tan(HFOV) | 0.79 |
| T23/CT2 | 0.70 | f/EPD | 1.45 |
| T67/CT6 | 1.00 | TL/EPD | 1.80 |
| (T23 + T34 + T45 + T67)/(T12 + T56) | 16.23 | TL/ImgH | 1.53 |
| R1/R6 | 0.09 | TL [mm] | 5.24 |
| R4/R1 | 0.79 | SD/TD | 0.91 |
| |R5/RQ| | 0.11 | CRAmax [deg.] | 37.35 |
| R14/R13 | 0.35 | (TL × f)/(EPD × ImgH) | 2.22 |
| R14/EPD | 0.50 | Yc72/Yc62 | 0.97 |
| R3/TD | 0.61 | Yc72/f | 0.23 |
| |f/f2| | 0.53 | | |

Furthermore, according to the 7th embodiment, each of at least two of the first lens element 710, the second lens element 720, the third lens element 730, the fourth lens element 740, the fifth lens element 750, the sixth lens element 760 and the seventh lens element 770 has an Abbe number which is smaller than 25.0; in detail, the Abbe numbers of the second lens element 720, the fourth lens element 740 and the sixth lens element 760 are smaller than 25.0.

According to the 7th embodiment, a number of inflection points on each of object-side surfaces and image-side surfaces of the first lens element 710, the second lens element 720, the third lens element 730, the fourth lens element 740, the fifth lens element 750, the sixth lens element 760 and the seventh lens element 770 is listed as follows.

| 7th Embodiment - Numbers of inflection points | | | | | | | |
|---|---|---|---|---|---|---|---|
| | 710 | 720 | 730 | 740 | 750 | 760 | 770 |
| Object-side surface | 1 | 1 | 0 | 1 | 0 | 2 | 2 |
| Image-side surface | 1 | 0 | 1 | 1 | 1 | 2 | 1 |

8th Embodiment

Figure 15:
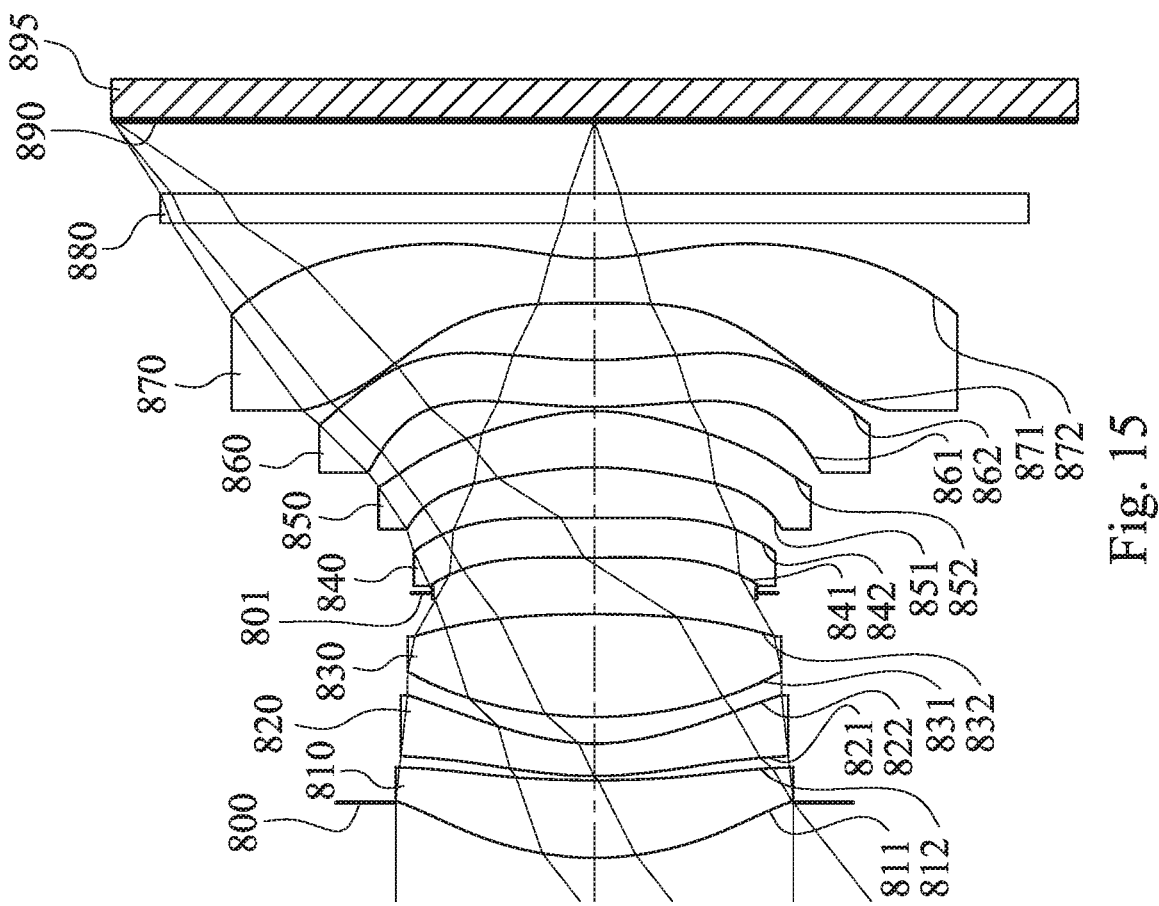
FIG. 15 is a schematic view of an imaging apparatus according to the 8th embodiment of the present disclosure.
Figure 16:
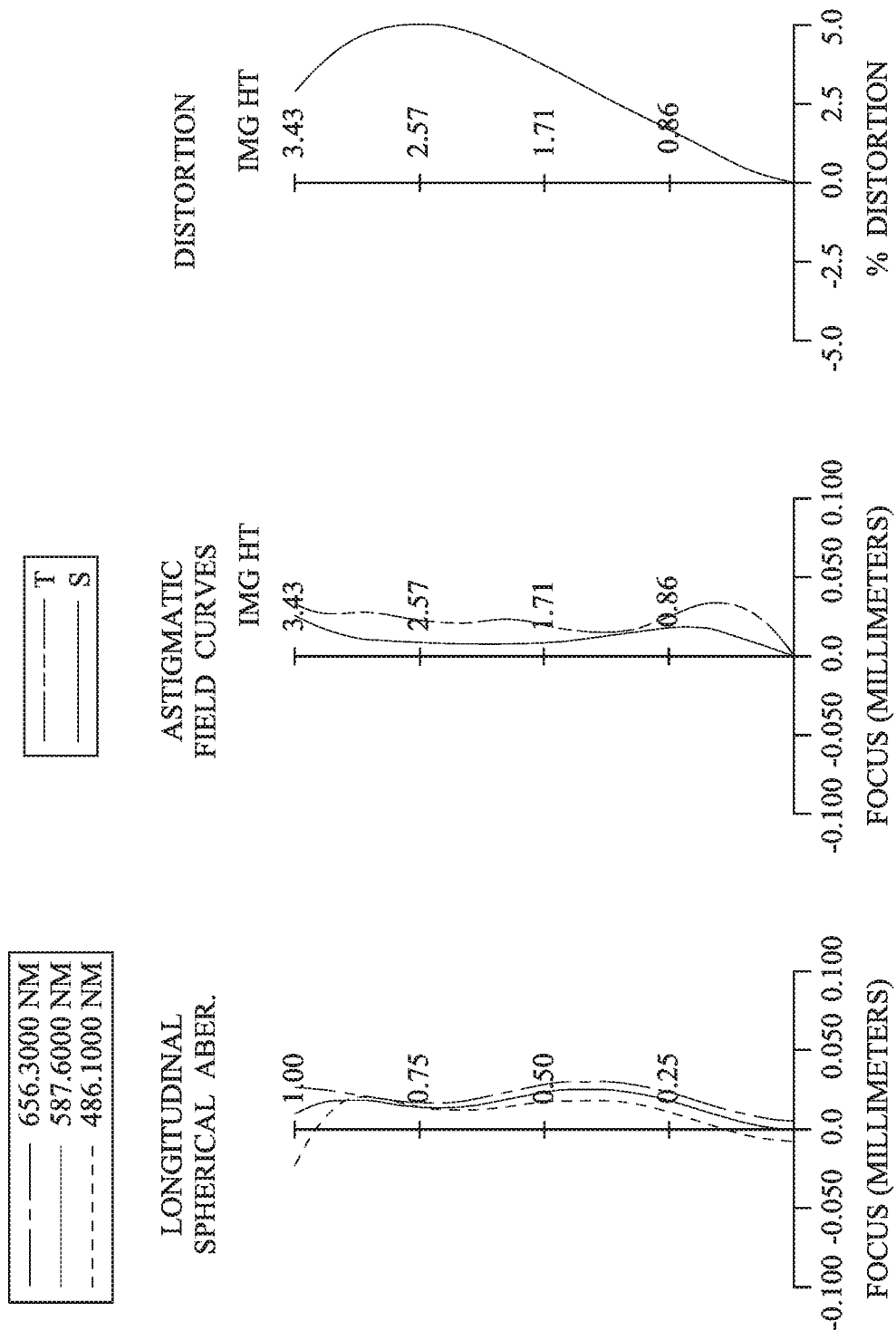
FIG. 16 shows spherical aberration curves, astigmatic field curves and a distortion curve of the imaging apparatus according to the 8th embodiment.

FIG. 15 is a schematic view of an imaging apparatus according to the 8th embodiment of the present disclosure. FIG. 16 shows spherical aberration curves, astigmatic field curves and a distortion curve of the imaging apparatus according to the 8th embodiment. In FIG. 15, the imaging apparatus includes an image capturing optical system (its reference numeral is omitted) and an image sensor 895. The image capturing optical system includes, in order from an object side to an image side, an aperture stop 800, a first lens element 810, a second lens element 820, a third lens element 830, a stop 801, a fourth lens element 840, a fifth lens element 850, a sixth lens element 860, a seventh lens element 870, a filter 880 and an image surface 890, wherein the image sensor 895 is disposed on the image surface 890 of the image capturing optical system.

The Image capturing optical system includes seven lens elements (810, 820, 830, 840, 850, 860 and 870) without additional one or more lens elements inserted between the first lens element 810 and the seventh lens element 870, and each of the seven lens elements has an object-side surface towards the object side and an image-side surface towards the image side.

The first lens element 810 with positive refractive power has an object-side surface 811 being convex in a paraxial region thereof and an image-side surface 812 being concave in a paraxial region thereof. The first lens element 810 is made of a plastic material, and has the object-side surface 811 and the image-side surface 812 being both aspheric. Furthermore, each of the object-side surface 811 and the image-side surface 812 of the first lens element 810 includes at least one inflection point.

The second lens element 820 with negative refractive power has an object-side surface 821 being convex in a paraxial region thereof and an image-side surface 822 being concave in a paraxial region thereof. The second lens element 820 is made of plastic material, and has the object-side surface 821 and the image-side surface 822 being both aspheric. Furthermore, each of the object-side surface 821 and the image-side surface 822 of the second lens element 820 includes at least one inflection point.

The third lens element 830 with positive refractive power has an object-side surface 831 being convex in a paraxial region thereof and an image-side surface 832 being convex in a paraxial region thereof. The third lens element 830 is made of plastic material, and has the object-side surface 831 and the image-side surface 832 being both aspheric.

The fourth lens element 840 with negative refractive power has an object-side surface 841 being convex in a paraxial region thereof and an image-side surface 842 being concave in a paraxial region thereof. The fourth lens element 840 is made of plastic material, and has the object-side surface 841 and the image-side surface 842 being both aspheric. Furthermore, each of the object-side surface 841 and the image-side surface 842 of the fourth lens element 840 includes at least one inflection point.

The fifth lens element 850 with positive refractive power has an object-side surface 851 being concave in a paraxial region thereof and an image-side surface 852 being convex in a paraxial region thereof. The fifth lens element 850 is made of plastic material, and has the object-side surface 851 and the image-side surface 852 being both aspheric. Furthermore, the image-side surface 852 of the fifth lens element 850 includes at least one inflection point.

The sixth lens element 860 with negative refractive power has an object-side surface 861 being convex in a paraxial region thereof and an image-side surface 862 being concave in a paraxial region thereof. The sixth lens element 860 is made of plastic material, and has the object-side surface 861 and the image-side surface 862 being both aspheric. Furthermore, each of the object-side surface 861 and the image-side surface 862 of the sixth lens element 860 includes at least one inflection point.

The seventh lens element 870 with negative refractive power has an object-side surface 871 being convex in a paraxial region thereof and an image-side surface 872 being concave in a paraxial region thereof. The seventh lens element 870 is made of plastic material, and has the object-side surface 871 and the image-side surface 872 being both aspheric. Furthermore, each of the object-side surface 871 and the image-side surface 872 of the seventh lens element 870 includes at least one inflection point.

The filter 880 is made of a glass material and located between the seventh lens element 870 and the image surface 890, and will not affect the focal length of the image capturing optical system.

The detailed optical data of the 8th embodiment are shown in Table 15 and the aspheric surface data are shown in Table 16 below.

TABLE 15

8th Embodiment
$f = 4.21$ mm, Fno = 1.49, HFOV = 38.3 deg.

| Surface # |           | Curvature Radius |     | Thickness | Material | Index | Abbe # | Focal Length |
|-----------|-----------|------------------|-----|-----------|----------|-------|--------|--------------|
| 0         | Object    | Plano            |     | Infinity  |          |       |        |              |
| 1         | Ape. Stop | Plano            |     | −0.392    |          |       |        |              |
| 2         | Lens 1    | 2.248            | ASP | 0.551     | Plastic  | 1.545 | 56.0   | 5.44         |
| 3         |           | 8.518            | ASP | 0.030     |          |       |        |              |
| 4         | Lens 2    | 2.739            | ASP | 0.230     | Plastic  | 1.639 | 23.5   | −6.39        |
| 5         |           | 1.586            | ASP | 0.190     |          |       |        |              |
| 6         | Lens 3    | 2.985            | ASP | 0.731     | Plastic  | 1.544 | 55.9   | 4.28         |
| 7         |           | −9.601           | ASP | 0.150     |          |       |        |              |
| 8         | Stop      | Plano            |     | 0.253     |          |       |        |              |
| 9         | Lens 4    | 27.984           | ASP | 0.280     | Plastic  | 1.639 | 23.5   | −169.37      |
| 10        |           | 22.145           | ASP | 0.360     |          |       |        |              |
| 11        | Lens 5    | −2.584           | ASP | 0.401     | Plastic  | 1.544 | 55.9   | 6.14         |
| 12        |           | −1.536           | ASP | 0.030     |          |       |        |              |
| 13        | Lens 6    | 5.274            | ASP | 0.332     | Plastic  | 1.639 | 23.5   | −23.69       |
| 14        |           | 3.815            | ASP | 0.403     |          |       |        |              |
| 15        | Lens 7    | 29.487           | ASP | 0.320     | Plastic  | 1.544 | 55.9   | −3.52        |
| 16        |           | 1.790            | ASP | 0.250     |          |       |        |              |
| 17        | Filter    | Plano            |     | 0.210     | Glass    | 1.517 | 64.2   | —            |
| 18        |           | Plano            |     | 0.519     |          |       |        |              |
| 19        | Image     | Plano            |     | —         |          |       |        |              |

Reference wavelength is 587.6 nm (d-line).
Effective radius of Stop on Surface 8 is 1.150 mm

TABLE 16

Aspheric Coefficients

| Surface # | 2 | 3 | 4 | 5 | 6 | 7 | 9 |
|---|---|---|---|---|---|---|---|
| k = | 4.2275E−03 | −2.3940E+00 | −2.0676E+00 | −8.4062E−01 | −1.9798E+01 | −1.0000E+00 | −9.0000E+01 |
| A4 = | 3.9014E−03 | 1.7500E−02 | −1.2221E−01 | −1.6701E−01 | 7.2314E−02 | −3.8904E−02 | −1.3447E−01 |
| A6 = | −1.8376E−02 | 1.0087E−02 | 1.4533E−01 | 1.7783E−01 | −4.0161E−02 | −3.6532E−04 | 1.5698E−02 |
| A8 = | 1.4705E−02 | −3.5213E−02 | −1.5503E−01 | −1.7608E−01 | 2.8964E−02 | 1.8137E−02 | −7.8385E−02 |
| A10 = | −9.9585E−03 | 1.6673E−02 | 8.8993E−02 | 1.0435E−01 | −2.1502E−02 | −2.2703E−02 | 1.5053E−01 |
| A12 = | 1.8463E−03 | −2.2315E−03 | −2.4448E−02 | −3.1058E−02 | 1.2026E−02 | 1.5083E−02 | −1.1727E−01 |
| A14 = | | | 2.5490E−03 | 3.2878E−03 | −2.6646E−03 | −4.7948E−03 | 4.2299E−02 |
| A16 = | | | | | | 5.9091E−04 | −5.7556E−03 |

| Surface # | 10 | 11 | 12 | 13 | 14 | 15 | 16 |
|---|---|---|---|---|---|---|---|
| k = | −6.6764E+01 | −4.6428E+00 | −1.2020E+01 | −1.9856E+01 | −1.0912E+00 | −2.0737E+01 | −1.1024E+01 |
| A4 = | −9.8906E−02 | 1.3999E−02 | −1.1315E−01 | 7.9398E−02 | −7.1374E−02 | −2.8812E−01 | −1.3611E−01 |
| A6 = | 9.7399E−04 | 2.8659E−01 | 2.7411E−01 | −3.3442E−01 | −2.1044E−02 | 1.7796E−01 | 7.9569E−02 |
| A8 = | −4.6454E−02 | −9.1227E−01 | −5.2673E−01 | 3.9646E−01 | −9.1022E−03 | −9.6184E−02 | −3.1575E−02 |
| A10 = | 6.5391E−02 | 1.3621E+00 | 6.2338E−01 | −3.3007E−01 | 3.4655E−02 | 4.3464E−02 | 8.6731E−03 |
| A12 = | −2.4554E−02 | −1.2549E+00 | −4.5025E−01 | 2.0252E−01 | −2.5364E−02 | −1.2917E−02 | −1.6670E−03 |
| A14 = | −6.8052E−03 | 7.2913E−01 | 1.9330E−01 | −8.7936E−02 | 8.9214E−03 | 2.3453E−03 | 2.1916E−04 |
| A16 = | 6.3810E−03 | −2.6057E−01 | −4.7333E−02 | 2.3858E−02 | −1.6623E−03 | −2.4970E−04 | −1.8738E−05 |
| A18 = | −1.0612E−03 | 5.1617E−02 | 6.0343E−03 | −3.4706E−03 | 1.5711E−04 | 1.4205E−05 | 9.3416E−07 |
| A20 = | | −4.2624E−03 | −3.0826E−04 | 2.0321E−04 | −5.9203E−06 | −3.3095E−07 | −2.0408E−08 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 4.21 | f1/f4 | −0.03 |
| Fno | 1.49 | f3/f1 | 0.79 |
| HFOV [deg.] | 38.3 | tan(HFOV) | 0.79 |
| T23/CT2 | 0.83 | f/EPD | 1.49 |
| T67/CT6 | 1.21 | TL/EPD | 1.86 |
| (T23 + T34 + T45 + T67)/(T12 + T5S) | 22.60 | TL/ImgH | 1.53 |
| R1/RB | −0.23 | TL [mm] | 5.24 |
| R4/R1 | 0.71 | SD/TD | 0.91 |
| |R5/R6| | 0.31 | CRAmax [deg.] | 39.90 |
| R14/R13 | 0.06 | (TL × f)/(EPD × ImgH) | 2.28 |
| R14/EPD | 0.63 | Yc72/Yc62 | 1.24 |
| R3/TD | 0.64 | Yc72/f | 0.26 |
| |f/f2| | 0.66 | | |

Furthermore, according to the 8th embodiment, each of at least two of the first lens element 810, the second lens element 820, the third lens element 830, the fourth lens element 840, the fifth lens element 850, the sixth lens element 860 and the seventh lens element 870 has an Abbe number which is smaller than 25.0; in detail, the Abbe numbers of the second lens element 820, the fourth lens element 840 and the sixth lens element 860 are smaller than 25.0.

According to the 8th embodiment, a number of inflection points on each of object-side surfaces and image-side surfaces of the first lens element 810, the second lens element 820, the third lens element 830, the fourth lens element 840, the fifth lens element 850, the sixth lens element 860 and the seventh lens element 870 is listed as follows.

| 8th Embodiment - Numbers of inflection points | | | | | | | |
|---|---|---|---|---|---|---|---|
| | 810 | 820 | 830 | 840 | 850 | 860 | 870 |
| Object-side surface | 1 | 1 | 0 | 1 | 0 | 1 | 2 |
| Image-side surface | 2 | 1 | 0 | 1 | 1 | 2 | 1 |

9th Embodiment

Figure 17:
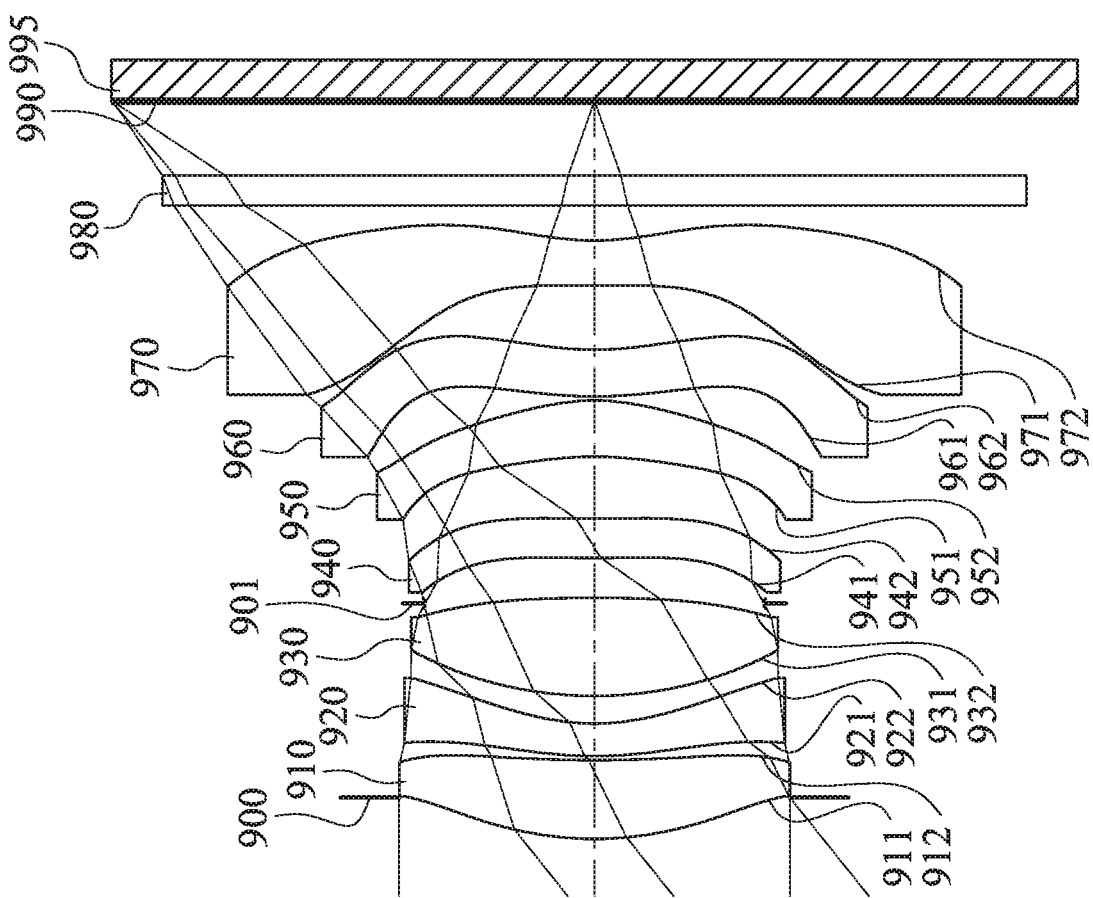
FIG. 17 is a schematic view of an imaging apparatus according to the 9th embodiment of the present disclosure.
Figure 18:
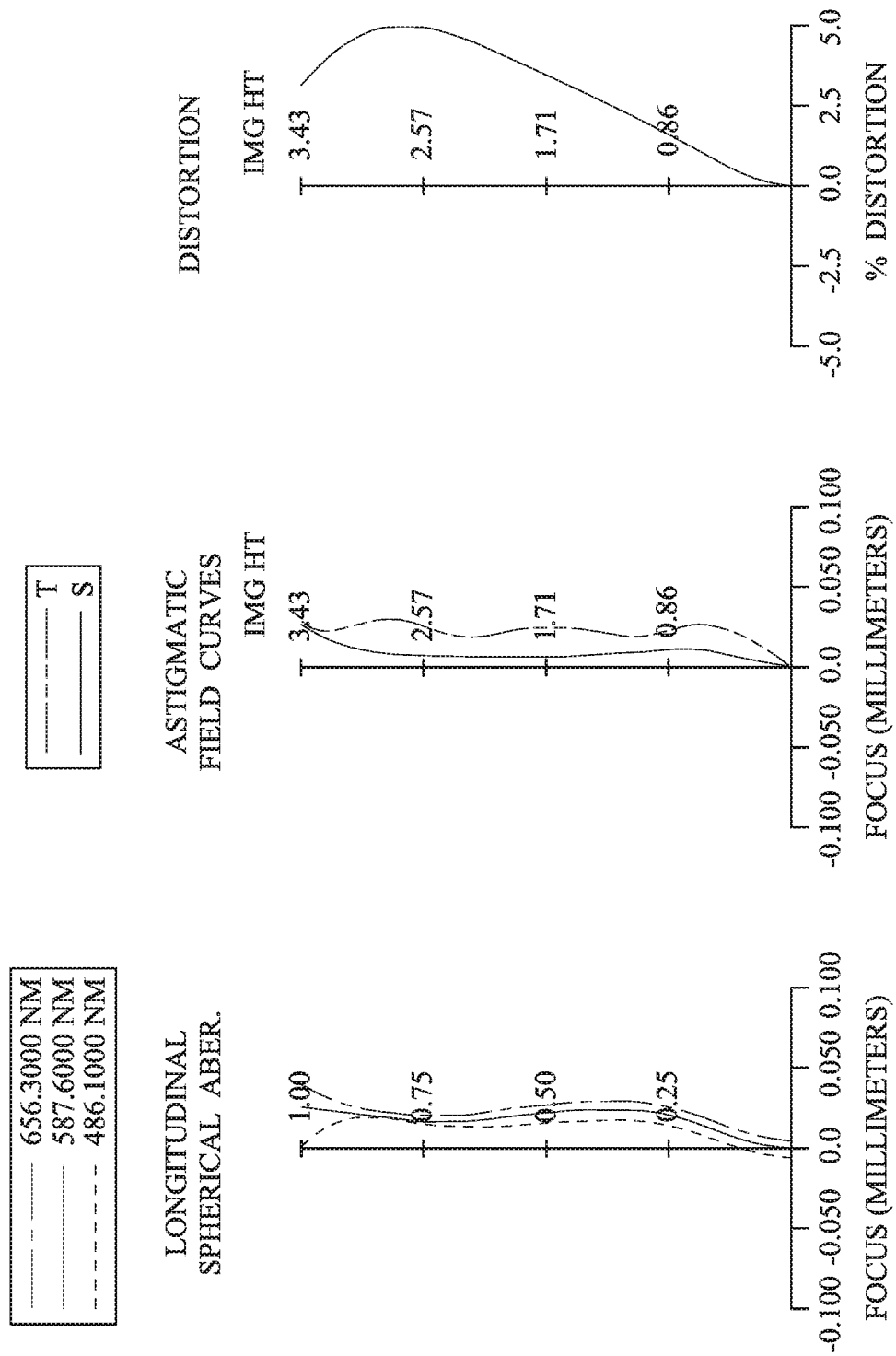
FIG. 18 shows spherical aberration curves, astigmatic field curves and a distortion curve of the imaging apparatus according to the 9th embodiment.

FIG. 17 is a schematic view of an imaging apparatus according to the 9th embodiment of the present disclosure. FIG. 18 shows spherical aberration curves, astigmatic field curves and a distortion curve of the imaging apparatus according to the 9th embodiment. In FIG. 17, the imaging apparatus includes an image capturing optical system (its reference numeral is omitted) and an image sensor 995. The image capturing optical system includes, in order from an object side to an image side, an aperture stop 900, a first lens element 910, a second lens element 920, a third lens element 930, a stop 901, a fourth lens element 940, a fifth lens element 950, a sixth lens element 960, a seventh lens element 970, a filter 980 and an image surface 990, wherein the image sensor 995 is disposed on the image surface 990 of the image capturing optical system.

The image capturing optical system includes seven lens elements (910, 920, 930, 940, 950, 960 and 970) without additional one or more lens elements inserted between the first lens element 910 and the seventh lens element 970, and each of the seven lens elements has an object-side surface towards the object side and an image-side surface towards the image side.

The first lens element 910 with positive refractive power has an object-side surface 911 being convex in a paraxial region thereof and an image-side surface 912 being concave in a paraxial region thereof. The first lens element 910 is made of a plastic material, and has the object-side surface 911 and the image-side surface 912 being both aspheric. Furthermore, each of the object-side surface 911 and the image-side surface 912 of the first lens element 910 includes at least one inflection point.

The second lens element 920 with negative refractive power has an object-side surface 921 being convex in a paraxial region thereof and an image-side surface 922 being concave in a paraxial region thereof. The second lens element 920 is made of plastic material, and has the object-side surface 921 and the image-side surface 922 being both aspheric. Furthermore, each of the object-side surface 921 and the image-side surface 922 of the second lens element 920 includes at least one inflection point.

The third lens element 930 with positive refractive power has an object-side surface 931 being convex in a paraxial region thereof and an image-side surface 932 being convex in a paraxial region thereof. The third lens element 930 is made of plastic material, and has the object-side surface 931 and the image-side surface 932 being both aspheric.

The fourth lens element 940 with positive refractive power has an object-side surface 941 being convex in a paraxial region thereof and an image-side surface 942 being concave in a paraxial region thereof. The fourth lens element 940 is made of plastic material, and has the object-side surface 941 and the image-side surface 942 being both aspheric. Furthermore, each of the object-side surface 941 and the image-aide surface 942 of the fourth lens element 940 includes at least one inflection point.

The fifth lens element 950 with positive refractive power has an object-side surface 951 being concave in a paraxial region thereof and an image-side surface 952 being convex in a paraxial region thereof. The fifth lens element 950 is made of plastic material, and has the object-side surface 951 and the image-side surface 9562 being both aspheric. Furthermore, the image-side surface 952 of the fifth lens element 950 includes at least one inflection point.

The sixth lens element 960 with negative refractive power has an object-side surface 961 being convex in a paraxial region thereof and an image-side surface 962 being concave in a paraxial region thereof. The sixth lens element 960 is made of plastic material, and has the object-side surface 961 and the image-side surface 962 being both aspheric. Furthermore, each of the object-side surface 961 and the image-side surface 962 of the sixth lens element 960 includes at least one inflection point.

The seventh lens element 970 with negative refractive power has an object-side surface 971 being convex in a paraxial region thereof and an image-side surface 972 being concave in a paraxial region thereof. The seventh lens element 970 is made of plastic material, and has the object-side surface 971 and the image-side surface 972 being both aspheric. Furthermore, each of the object-side surface 971 and the image-side surface 972 of the seventh lens element 970 includes at least one inflection point.

The filter 980 is made of a glass material and located between the seventh lens element 970 and the image surface 990, and will not affect the focal length of the image capturing optical system.

The detailed optical data of the 9th embodiment are shown in Table 17 and the aspheric surface data are shown in Table 18 below.

TABLE 17

9th Embodiment
f = 4.14 mm, Fno = 1.49, HFOV = 38.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.295 | | | | |
| 2 | Lens 1 | 2.429 | ASP | 0.560 | Plastic | 1.545 | 56.1 | 5.58 |
| 3 | | 11.071 | ASP | 0.030 | | | | |
| 4 | Lens 2 | 2.965 | ASP | 0.230 | Plastic | 1.639 | 23.5 | −5.98 |
| 5 | | 1.619 | ASP | 0.196 | | | | |
| 6 | Lens 3 | 2.798 | ASP | 0.697 | Plastic | 1.544 | 56.0 | 4.41 |
| 7 | | −15.412 | ASP | −0.039 | | | | |
| 8 | Stop | Plano | | 0.324 | | | | |
| 9 | Lens 4 | 12.989 | ASP | 0.280 | Plastic | 1.544 | 56.0 | 52.13 |
| 10 | | 23.784 | ASP | 0.439 | | | | |
| 11 | Lens 5 | −2.727 | ASP | 0.400 | Plastic | 1.544 | 56.0 | 5.54 |
| 12 | | −1.506 | ASP | 0.030 | | | | |
| 13 | Lens 6 | 3.849 | ASP | 0.332 | Plastic | 1.584 | 28.2 | −13.67 |
| 14 | | 2.515 | ASP | 0.455 | | | | |
| 15 | Lens 7 | 20.511 | ASP | 0.320 | Plastic | 1.544 | 56.0 | −3.79 |
| 16 | | 1.862 | ASP | 0.250 | | | | |
| 17 | Filter | Plano | | 0.210 | Glass | 1.517 | 64.2 | — |
| 18 | | Plano | | 0.529 | | | | |
| 19 | Image | Plano | | — | | | | |

Reference wavelength is 587.6 nm (d-line).
Effective radius of Stop on Surface 8 is 1.210 mm.

TABLE 18

Aspheric Coefficients

| Surface # | 2 | 3 | 4 | 5 | 6 | 7 | 9 |
|---|---|---|---|---|---|---|---|
| k = | 2.1828E−01 | 5.3927E+00 | −2.0017E+00 | −9.2918E−01 | −2.4042E+01 | −1.0000E+00 | −1.0000E+00 |
| A4 = | −8.9524E−03 | 1.9654E−02 | −9.5379E−02 | −1.3836E−01 | 1.1906E−01 | −5.4278E−02 | −1.4624E−01 |
| A6 = | −9.1973E−03 | −3.6634E−02 | 7.4028E−02 | 1.2391E−01 | −1.2593E−01 | 9.5432E−03 | 9.1912E−03 |

TABLE 18-continued

| Aspheric Coefficients | | | | | | | |
|---|---|---|---|---|---|---|---|
| A8 = | −3.8614E−04 | 6.8633E−03 | −8.2103E−02 | −1.0356E−01 | 1.3607E−01 | 2.5667E−03 | −5.8210E−02 |
| A10 = | −1.5507E−03 | −4.3058E−04 | 5.1979E−02 | 4.9401E−02 | −9.8156E−02 | −4.5939E−04 | 1.0314E−01 |
| A12 = | 9.0707E−05 | −1.3236E−06 | −1.7515E−02 | −1.2619E−02 | 3.9663E−02 | | −6.5780E−02 |
| A14 = | | | | 2.5636E−03 | 1.2775E−03 | | 1.7688E−02 |
| A16 = | | | | | −6.6583E−03 | | −1.7556E−03 |

| Surface # | 10 | 11 | 12 | 13 | 14 | 15 | 16 |
|---|---|---|---|---|---|---|---|
| k = | −1.5781E+01 | −1.4951E+00 | −7.4329E+00 | −1.0000E+00 | −1.0000E+00 | −1.0000E+00 | −7.1070E+00 |
| A4 = | −1.0062E−01 | 2.3163E−02 | 1.2638E−02 | 7.2307E−02 | −8.7292E−02 | −2.1019E−01 | −1.4429E−01 |
| A6 = | 1.4504E−02 | 3.2225E−01 | 1.8181E−02 | −3.6102E−01 | −4.5665E−02 | 4.5449E−02 | 7.0553E−02 |
| A8 = | −9.7165E−02 | −9.5439E−01 | −1.0613E−01 | 4.5258E−01 | 4.1596E−02 | −1.5448E−03 | −2.3702E−02 |
| A10 = | 1.3446E−01 | 1.3986E+00 | 1.6758E−01 | −3.8085E−01 | −1.3924E−02 | 5.4936E−03 | 6.5482E−03 |
| A12 = | −8.4405E−02 | −1.2975E+00 | −1.5322E−01 | 2.2048E−01 | −7.2240E−04 | −3.7705E−03 | −1.4792E−03 |
| A14 = | 2.6910E−02 | 7.5981E−01 | 7.8887E−02 | −8.8092E−02 | 1.8322E−03 | 1.0167E−03 | 2.3933E−04 |
| A16 = | −4.2991E−03 | −2.6944E−01 | −2.1924E−02 | 2.2368E−02 | −4.8890E−04 | −1.3743E−04 | −2.4631E−05 |
| A18 = | 2.6305E−04 | 5.2078E−02 | 3.0410E−03 | −3.1153E−03 | 5.2834E−05 | 9.1862E−06 | 1.4170E−06 |
| A20 = | | −4.1529E−03 | −1.6414E−04 | 1.7720E−04 | −2.0793E−06 | −2.4020E−07 | −3.4362E−08 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 4.14 | f1/f4 | 0.11 |
| Fno | 1.49 | f3/f1 | 0.79 |
| HFOV [deg.] | 38.7 | tan(HFOV) | 0.80 |
| T23/CT2 | 0.85 | f/EPD | 1.49 |
| T67/CT6 | 1.37 | TL/EPD | 1.89 |
| (T23 + T34 + T45 + T67)/(T12 + T56) | 22.92 | TL/ImgH | 1.53 |
| R1/R6 | −0.16 | TL [mm] | 5.24 |
| R4/R1 | 0.67 | SD/TD | 0.93 |
| |R5/R6| | 0.18 | CRAmax [deg.] | 41.07 |
| R14/R13 | 0.09 | (TL × f)/(EPD × ImgH) | 2.28 |
| R14/EPD | 0.67 | Yc72/Yc62 | 1.10 |
| R3/TD | 0.70 | Yc72/f | 0.26 |
| |f/f2| | 0.69 | | |

According to the 9th embodiment, a number of inflection points on each of object-side surfaces and image-side surfaces of the first lens element 910, the second lens element 920, the third lens element 930, the fourth lens element 940, the fifth lens element 950, the sixth lens element 960 and the seventh lens element 970 is listed as follows.

| 9th Embodiment - Numbers of inflection points | | | | | | | |
|---|---|---|---|---|---|---|---|
| | 910 | 920 | 930 | 940 | 950 | 960 | 970 |
| Object-side surface | 1 | 1 | 0 | 1 | 0 | 2 | 2 |
| Image-side surface | 1 | 1 | 0 | 1 | 1 | 2 | 1 |

10th Embodiment

Figure 19:
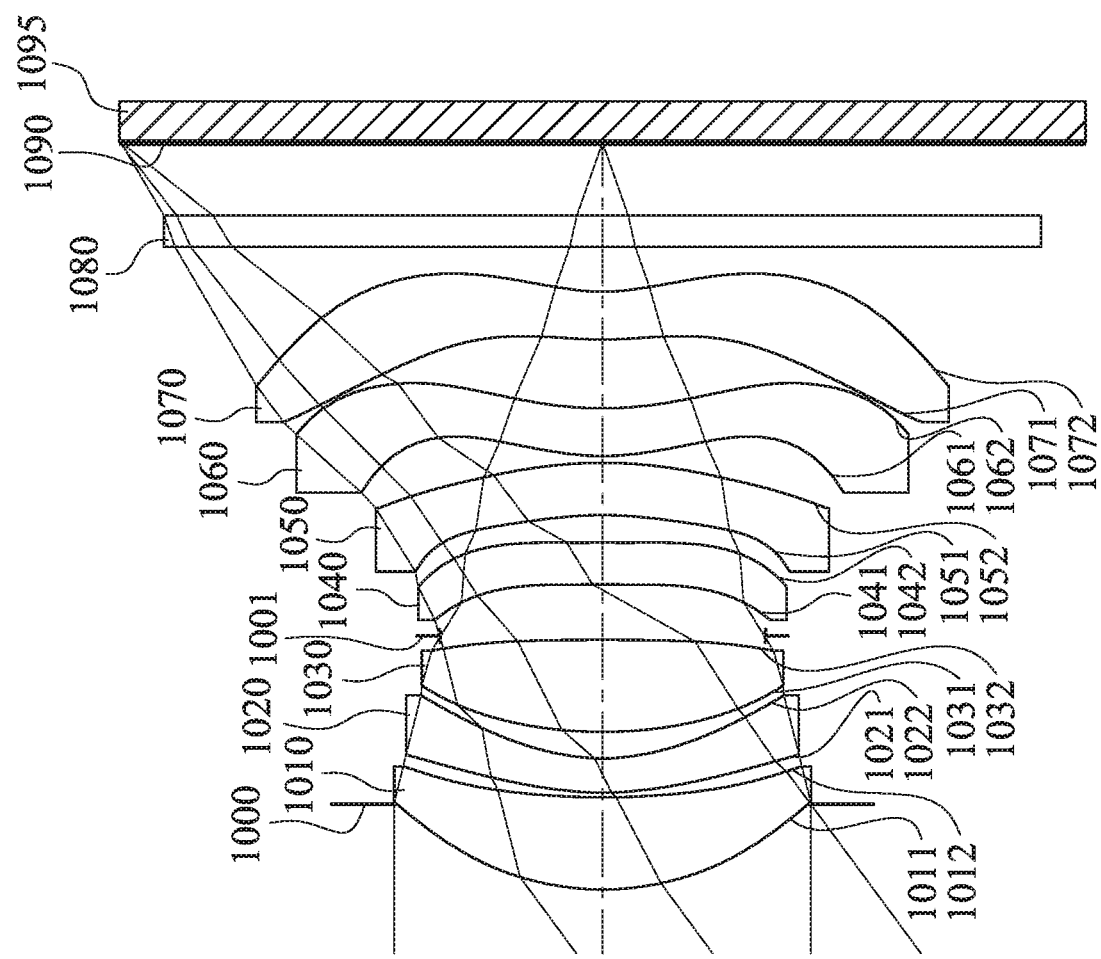
FIG. 19 is a schematic view of an imaging apparatus according to the 10th embodiment of the present disclosure.
Figure 20:
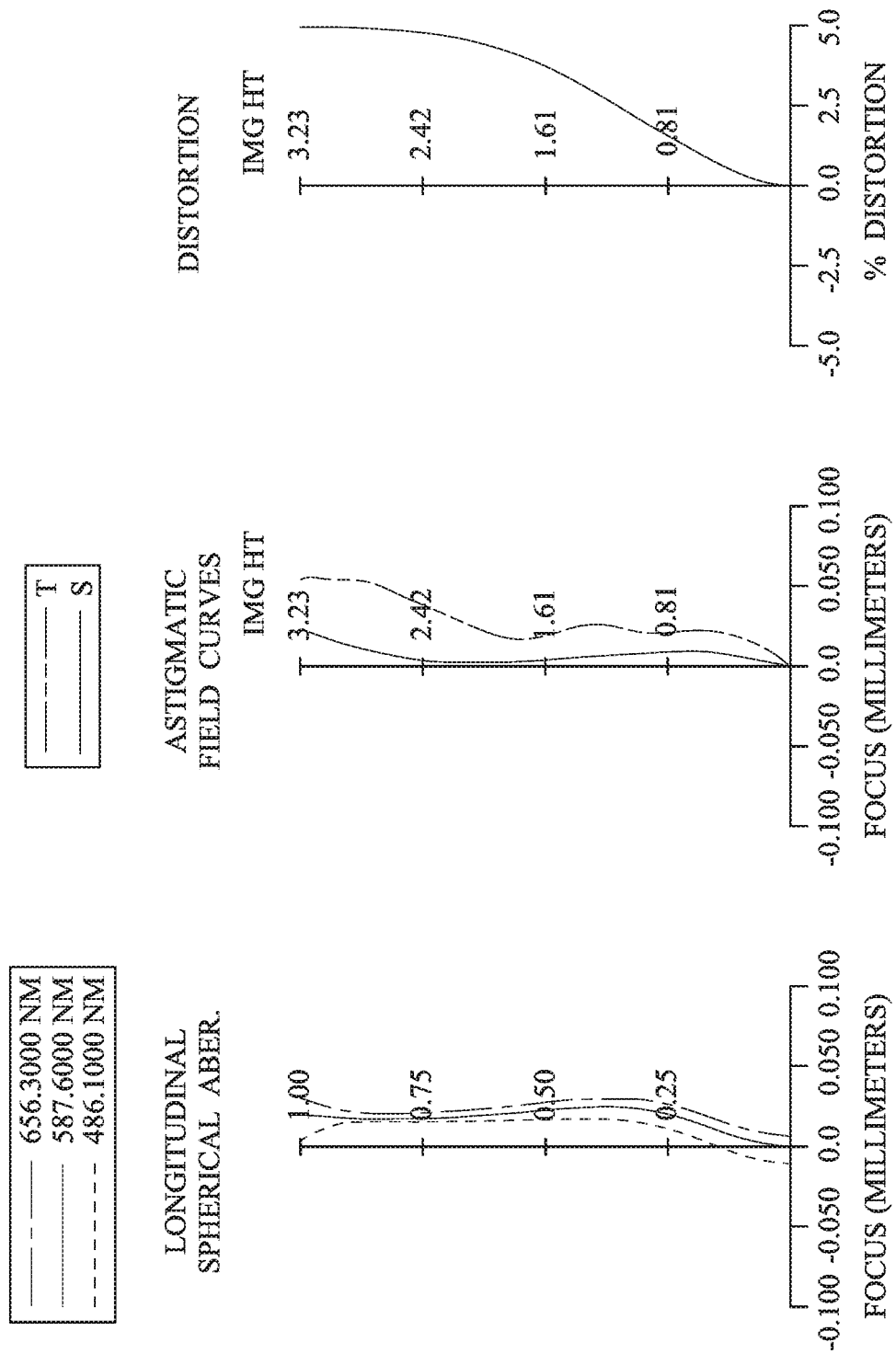
FIG. 20 shows spherical aberration curves, astigmatic field curves and a distortion curve of the imaging apparatus according to the 10th embodiment.

FIG. 19 is a schematic view of an imaging apparatus according to the 10th embodiment of the present disclosure. FIG. 20 shows spherical aberration curves, astigmatic field curves and a distortion curve of the imaging apparatus according to the 10th embodiment. In FIG. 19, the imaging apparatus includes an image capturing optical system (its reference numeral is omitted) and an image sensor 1095. The image capturing optical system includes, in order from an object side to an image side, an aperture stop 1000, a first lens element 1010, a second lens element 1020, a third lens element 1030, a stop 1001, a fourth lens element 1040, a fifth lens element 1050, a sixth lens element 1060, a seventh lens element 1070, a filter 1080 and an image surface 1090, wherein the image sensor 1095 is disposed on the image surface 1090 of the image capturing optical system. The image capturing optical system includes seven lens elements (1010, 1020, 1030, 1040, 1050, 1060 and 1070) without additional one or more lens elements inserted between the first lens element 1010 and the seventh lens element 1070, and each of the seven lens elements has an object-side surface towards the object side and an image-side surface towards the image side.

The first lens element 1010 with positive refractive power has an object-side surface 1011 being convex in a paraxial region thereof and an image-side surface 1012 being concave in a paraxial region thereof. The first lens element 1010 is made of a plastic material, and has the object-side surface 1011 and the image-side surface 1012 being both aspheric. Furthermore, each of the object-side surface 1011 and the image-side surface 1012 of the first lens element 1010 includes at least one inflection point.

The second lens element 1020 with negative refractive power has an object-side surface 1021 being convex in a paraxial region thereof and an image-side surface 1022 being concave in a paraxial region thereof. The second lens element 1020 is made of plastic material, and has the object-side surface 1021 and the image-side surface 1022 being both aspheric. Furthermore, each of the object-side surface 1021 and the image-side surface 1022 of the second lens element 1020 includes at least one inflection point.

The third lens element 1030 with positive refractive power has an object-side surface 1031 being convex in a paraxial region thereof and an image-side surface 1032 being convex in a paraxial region thereof. The third lens element 1030 is made of plastic material, and has the object-side surface 1031 and the image-side surface 1032 being both aspheric. Furthermore, the image-side surface 1032 of the third lens element 1030 includes at least one inflection point.

The fourth lens element 1040 with negative refractive power has an object-side surface 1041 being concave in a paraxial region thereof and an image-side surface 1042 being concave in a paraxial region thereof. The fourth lens element 1040 is made of plastic material, and has the object-side surface 1041 and the image-side surface 1042 being both aspheric.

Furthermore, the image-side surface 1042 of the fourth lens element 1040 includes at least one inflection point.

The fifth lens element 1050 with negative refractive power has an object-side surface 1051 being concave in a paraxial region thereof and an image-side surface 1052 being convex in a paraxial region thereof. The fifth lens element 1050 is made of plastic material, and has the object-side surface 1051 and the image-side surface 1052 being both aspheric. Furthermore, the image-side surface 1052 of the fifth lens element 1050 includes at least one inflection point.

The sixth lens element 1060 with positive refractive power has an object-side surface 1061 being convex in a paraxial region thereof and an image-side surface 1062 being concave in a paraxial region thereof. The sixth lens element 1060 is made of plastic material, and has the object-side surface 1061 and the image-side surface 1062 being both aspheric. Furthermore, each of the object-side surface 1061 and the image-side surface 1062 of the sixth lens element 1060 includes at least one inflection point.

The seventh lens element 1070 with negative refractive power has an object-side surface 1071 being convex in a paraxial region thereof and an image-side surface 1072 being concave in a paraxial region thereof. The seventh lens element 1070 is made of plastic material, and has the object-side surface 1071 and the image-side surface 1072 being both aspheric.

Furthermore, each of the object-side surface 1071 and the image-side surface 1072 of the seventh lens element 1070 includes at least one inflection point.

The filter 1080 is made of a glass material and located between the seventh lens element 1070 and the image surface 1090, and will not affect the focal length of the image capturing optical system.

The detailed optical data of the 10th embodiment are shown in Table 19 and the aspheric surface data are shown in Table 20 below.

TABLE 19

10th Embodiment
f = 4.15 mm, Fno = 1.49, HFOV = 36.4 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.572 | | | | |
| 2 | Lens 1 | 1.872 ASP | 0.618 | Plastic | 1.545 | 56.1 | 4.94 |
| 3 | | 5.434 ASP | 0.030 | | | | |
| 4 | Lens 2 | 2.145 ASP | 0.230 | Plastic | 1.639 | 23.5 | −7.15 |
| 5 | | 1.398 ASP | 0.177 | | | | |
| 6 | Lens 3 | 2.898 ASP | 0.617 | Plastic | 1.544 | 56.0 | 4.93 |
| 7 | | −33.635 ASP | 0.027 | | | | |
| 8 | Stop | Plano | 0.345 | | | | |
| 9 | Lens 4 | −149.822 ASP | 0.280 | Plastic | 1.660 | 20.4 | −84.42 |
| 10 | | 88.767 ASP | 0.184 | | | | |
| 11 | Lens 5 | −2.416 ASP | 0.350 | Plastic | 1.639 | 23.5 | −18.18 |
| 12 | | −3.223 ASP | 0.046 | | | | |
| 13 | Lens 6 | 1.775 ASP | 0.320 | Plastic | 1.544 | 56.0 | 9.11 |
| 14 | | 2.590 ASP | 0.460 | | | | |
| 15 | Lens 7 | 2.809 ASP | 0.320 | Plastic | 1.544 | 56.0 | −5.64 |
| 16 | | 1.408 ASP | 0.300 | | | | |
| 17 | Filter | Plano | 0.210 | Glass | 1.517 | 64.2 | — |
| 18 | | Plano | 0.488 | | | | |
| 19 | Image | Plano | — | | | | |

Reference wavelength is 587.6 nm (d-line).
Effective radius of Stop on Surface 8 is 1.090 mm.

TABLE 20

Aspheric Coefficients

| Surface # | 2 | 3 | 4 | 5 | 6 | 7 | 9 |
|---|---|---|---|---|---|---|---|
| k = | −3.9699E−17 | −1.0000E+00 | −1.1221E+00 | −7.9815E−01 | −3.2291E+01 | −1.0000E+00 | −1.0000E+00 |
| A4 = | 3.2023E−03 | 1.0870E−02 | −9.6081E−02 | −1.0433E−01 | 1.6101E−01 | −3.3463E−02 | −1.3684E−01 |
| A6 = | −5.8603E−03 | 1.3768E−02 | 2.9833E−02 | 2.7343E−02 | −1.8095E−01 | −7.0869E−03 | −1.9627E−02 |
| A8 = | 9.9123E−03 | −3.8938E−02 | −2.6583E−02 | 3.5560E−02 | 1.9010E−01 | 1.3400E−02 | −5.0533E−02 |
| A10 = | −1.4182E−02 | 4.6011E−02 | 1.4324E−02 | −3.2237E−02 | −1.2024E−01 | −1.1376E−02 | 1.2639E−01 |
| A12 = | 8.7406E−03 | −2.1121E−02 | −1.2738E−02 | 7.2837E−03 | 4.1860E−02 | 5.3028E−03 | −8.4128E−02 |
| A14 = | −2.1594E−03 | 3.0071E−03 | 2.8778E−03 | −3.7778E−04 | −5.7201E−03 | −2.4906E−04 | 1.6556E−02 |

| Surface # | 10 | 11 | 12 | 13 | 14 | 15 | 16 |
|---|---|---|---|---|---|---|---|
| k = | 3.3068E−10 | −1.0342E+01 | −6.3993E+01 | −3.8685E+00 | −3.1193E+00 | −2.2279E+01 | −7.6328E+00 |
| A4 = | −6.6010E−02 | 1.3547E−01 | −2.2973E−01 | −1.2403E−01 | 3.0041E−02 | −3.1421E−01 | −1.9036E−01 |
| A6 = | −6.5929E−02 | −3.2418E−01 | 3.7105E−01 | 5.9350E−02 | −1.2412E−01 | 2.4494E−01 | 1.3186E−01 |

TABLE 20-continued

Aspheric Coefficients

| A8 =  | 3.8348E−03  | 6.8507E−01  | −3.8078E−01 | −8.2861E−02 | 9.0547E−02  | −1.3944E−01 | −7.0957E−02 |
| ----- | ----------- | ----------- | ----------- | ----------- | ----------- | ----------- | ----------- |
| A10 = | 2.3859E−02  | −1.1145E+00 | 3.2452E−01  | 6.0664E−02  | −3.9182E−02 | 5.9963E−02  | 2.6103E−02  |
| A12 = | −1.4997E−02 | 1.1103E+00  | −2.2360E−01 | −2.3610E−02 | 1.1073E−02  | −1.7983E−02 | −6.4425E−03 |
| A14 = | 2.7126E−03  | −6.8393E−01 | 1.0184E−01  | 4.2513E−03  | −2.0419E−03 | 3.4995E−03  | 1.0284E−03  |
| A16 = |             | 2.4355E−01  | −2.6846E−02 | −1.6125E−04 | 2.3056E−04  | −4.1314E−04 | −1.0085E−04 |
| A18 = |             | −4.4862E−02 | 3.6486E−03  | −3.9980E−05 | −1.4166E−05 | 2.6617E−05  | 5.5541E−06  |
| A20 = |             | 3.2762E−03  | −1.9625E−04 | 3.4595E−06  | 3.5695E−07  | −7.1395E−07 | −1.3328E−07 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table as the following values and satisfy the following conditions:

| 10th Embodiment | | | |
| --- | --- | --- | --- |
| f [mm] | 4.15 | f1/f4 | −0.06 |
| Fno | 1.49 | f3/f1 | 1.00 |
| HFOV [deg.] | 36.4 | tan(HFOV) | 0.74 |
| T23/CT2 | 0.77 | f/EPD | 1.49 |
| T67/CT6 | 1.44 | TL/EPD | 1.79 |
| (T23 + T34 + T45 + T67)/ (T12 + T56) | 15.70 | TL/ImgH | 1.55 |
| R1/R6 | −0.06 | TL [mm] | 5.00 |
| R4/R1 | 0.75 | SD/TD | 0.86 |
| |R5/R6| | 0.00 | CRAmax [deg.] | 38.00 |
| R14/R13 | 0.50 | (TL × f)/(EPD × ImgH) | 2.31 |
| R14/EPD | 0.51 | Yc72/Yc62 | 0.79 |
| R3/TD | 0.54 | Yc72/f | 0.24 |
| |f/f2| | 0.58 | | |

Furthermore, according to the 10th embodiment, each of at least two of the first lens element 1010, the second lens element 1020, the third lens element 1030, the fourth lens element 1040, the fifth lens element 1050, the sixth lens element 1060 and the seventh lens element 1070 has an Abbe number which is smaller than 25.0; in detail, the Abbe numbers of the second lens element 1020, the fourth lens element 1040 and the fifth lens element 1050 are smaller than 25.0.

According to the 10th embodiment, a number of inflection points on each of object-side surfaces and image-side surfaces of the first lens element 1010, the second lens element 1020, the third lens element 1030, the fourth lens element 1040, the fifth lens element 1050, the sixth lens element 1060 and the seventh lens element 1070 is listed as follows.

| 10th Embodiment - Numbers of inflection points | | | | | | | |
| --- | --- | --- | --- | --- | --- | --- | --- |
|  | 1010 | 1020 | 1030 | 1040 | 1050 | 1060 | 1070 |
| Object-side surface | 1 | 1 | 0 | 0 | 0 | 1 | 2 |
| Image-side surface | 1 | 1 | 1 | 1 | 1 | 1 | 2 |

11th Embodiment

Figure 21:
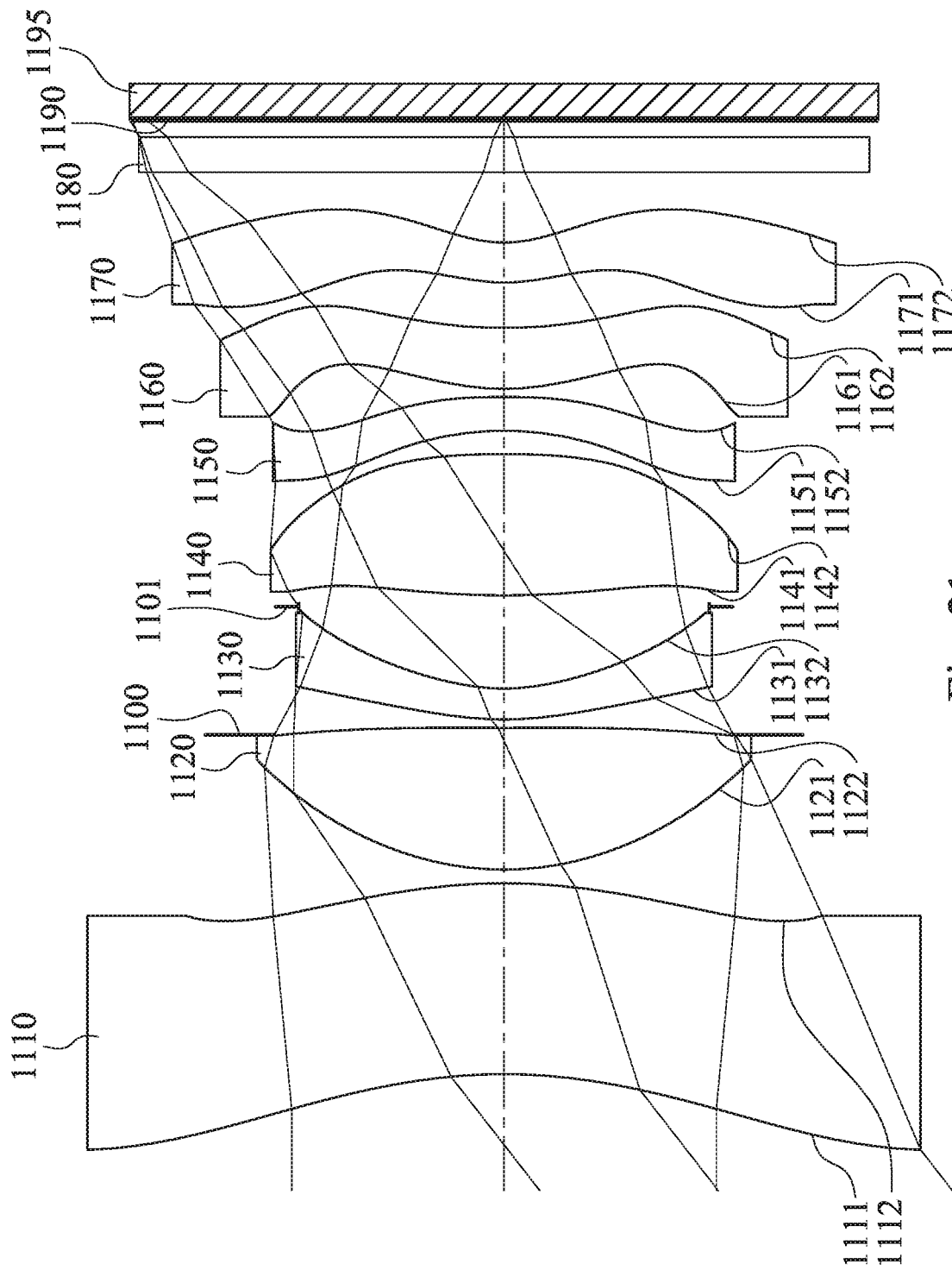
FIG. 21 is a schematic view of an imaging apparatus according to the 11th embodiment of the present disclosure.
Figure 22:
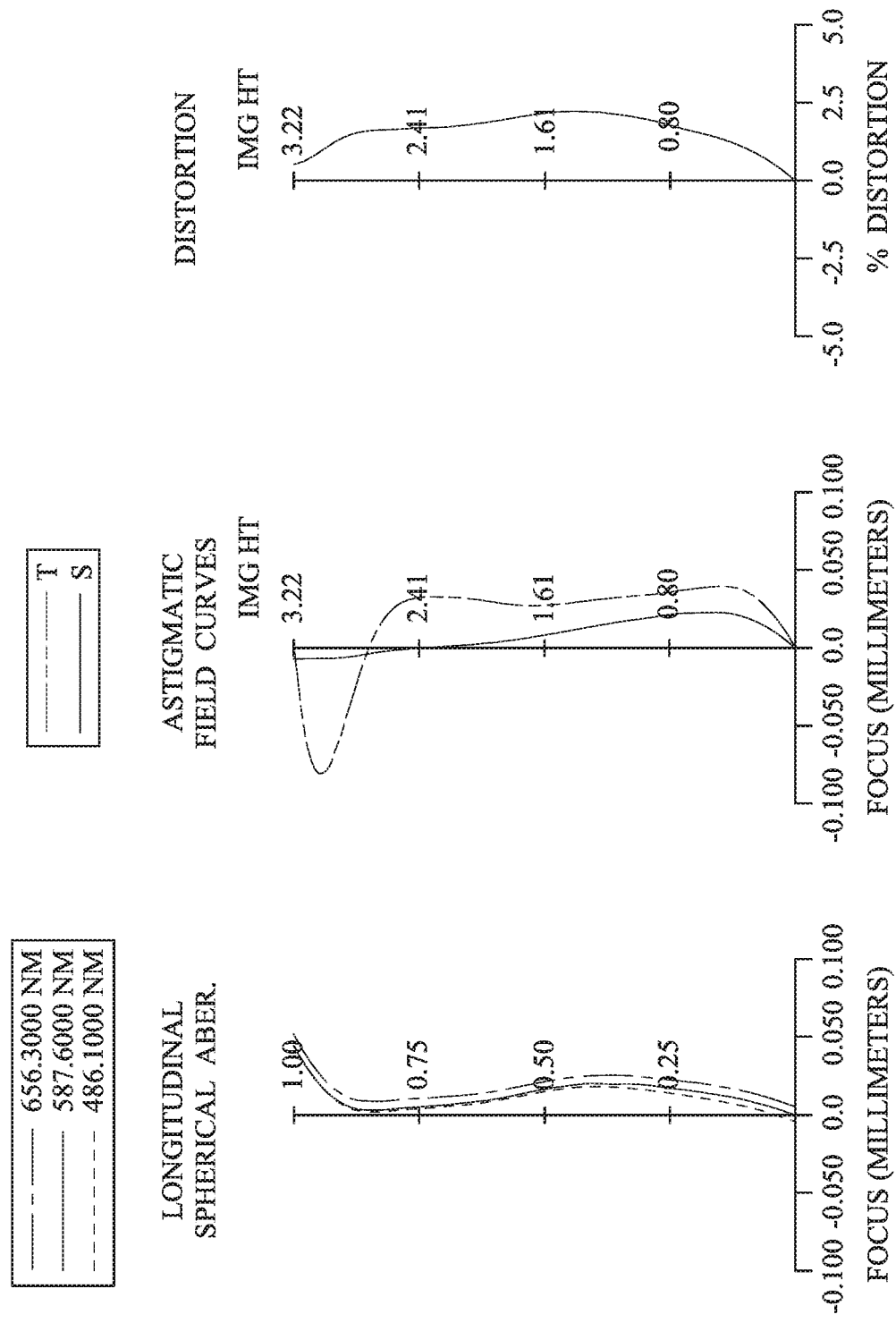
FIG. 22 shows spherical aberration curves, astigmatic field curves and a distortion curve of the imaging apparatus according to the 11th embodiment.

FIG. 21 is a schematic view of an imaging apparatus according to the 11th embodiment of the present disclosure. FIG. 22 shows spherical aberration curves, astigmatic field curves and a distortion curve of the imaging apparatus according to the 11th embodiment. In FIG. 21, the imaging apparatus includes an image capturing optical system (its reference numeral is omitted) and an image sensor 1195. The image capturing optical system includes, in order from an object side to an image side, a first lens element 1110, a second lens element 1120, an aperture stop 1100, a third lens element 1130, a stop 1101, a fourth lens element 1140, a fifth lens element 1150, a sixth lens element 1160, a seventh lens element 1170, a filter 1180 and an image surface 1190, wherein the image sensor 1195 is disposed on the image surface 1190 of the image capturing optical system. The image capturing optical system includes seven lens elements (1110, 1120, 1130, 1140, 1150, 1160 and 1170) without additional one or more lens elements inserted between the first lens element 1110 and the seventh lens element 1170, and each of the seven lens elements has an object-side surface towards the object side and an image-side surface towards the image side.

The first lens element 1110 with positive refractive power has an object-side surface 1111 being concave in a paraxial region thereof and an image-side surface 1112 being convex in a paraxial region thereof. The first lens element 1110 is made of a plastic material, and has the object-side surface 1111 and the image-side surface 1112 being both aspheric. Furthermore, each of the object-side surface 1111 and the image-side surface 1112 of the first lens element 1110 includes at least one inflection point.

The second lens element 1120 with positive refractive power has an object-side surface 1121 being convex in a paraxial region thereof and an image-side surface 1122 being concave in a paraxial region thereof. The second lens element 1120 is made of plastic material, and has the object-side surface 1121 and the image-side surface 1122 being both aspheric.

Furthermore, the image-side surface 1122 of the second lens element 1120 includes at least one inflection point.

The third lens element 1130 with negative refractive power has an object-side surface 1131 being convex in a paraxial region thereof and an image-side surface 1132 being concave in a paraxial region thereof. The third lens element 1130 is made of plastic material, and has the object-side surface 1131 and the image-side surface 1132 being both aspheric. Furthermore, the object-side surface 1131 of the third lens element 1130 includes at least one inflection point.

The fourth lens element 1140 with positive refractive power has an object-side surface 1141 being convex in a paraxial region thereof and an image-side surface 1142 being convex in a paraxial region thereof. The fourth lens element 1140 is made of plastic material, and has the object-side surface 1141 and the image-side surface 1142 being both aspheric. Furthermore, the object-side surface 1141 of the fourth lens element 1140 includes at least one inflection point.

The fifth lens element 1150 with negative refractive power has an object-side surface 1151 being concave in a paraxial region thereof and an image-side surface 1152 being convex in a paraxial region thereof. The fifth lens element 1150 is made of plastic material, and has the object-side surface 1151 and the image-side surface 1152 being both aspheric. Furthermore, each of the object-side surface 1151 and the image-side surface 1152 of the fifth lens element 1150 includes at least one inflection point.

The sixth lens element 1160 with positive refractive power has an object-side surface 1161 being convex in a paraxial region thereof and an image-side surface 1162 being concave in a paraxial region thereof. The sixth lens element 1160 is made of plastic material, and has the object-side surface 1161 and the image-side surface 1162 being both aspheric. Furthermore, each of the object-side surface 1161 and the image-side surface 1162 of the sixth lens element 1160 includes at least one inflection point.

The seventh lens element 1170 with negative refractive power has an object-side surface 1171 being convex in a paraxial region thereof and an image-side surface 1172 being concave in a paraxial region thereof. The seventh lens element 1170 is made of plastic material, and has the object-side surface 1171 and the image-side surface 1172 being both aspheric. Furthermore, each of the object-side surface 1171 and the image-side surface 1172 of the seventh lens element 1170 includes at least one inflection point.

The filter 1180 is made of a glass material and located between the seventh lens element 1170 and the image surface 1190, and will not affect the focal length of the image capturing optical system.

The detailed optical data of the 11th embodiment are shown in Table 21 and the aspheric surface data are shown in Table 22 below.

TABLE 21

11th Embodiment
f = 4.09 mm, Fno = 1.12, HFOV = 37.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −4.785 | ASP | 1.640 | Plastic | 1.544 | 55.9 | 975.08 |
| 2 | | −5.315 | ASP | 0.118 | | | | |
| 3 | Lens 2 | 2.609 | ASP | 1.218 | Plastic | 1.544 | 55.9 | 4.90 |
| 4 | | 102.380 | ASP | −0.060 | | | | |
| 5 | Ape. Stop | Plano | | 0.132 | | | | |
| 6 | Lens 3 | 2.944 | ASP | 0.266 | Plastic | 1.650 | 21.4 | −9.07 |
| 7 | | 1.893 | ASP | 0.700 | | | | |
| 8 | Stop | Plano | | 0.100 | | | | |
| 9 | Lens 4 | 7.190 | ASP | 1.215 | Plastic | 1.544 | 55.9 | 7.12 |
| 10 | | −7.905 | ASP | 0.198 | | | | |
| 11 | Lens 5 | −3.012 | ASP | 0.292 | Plastic | 1.660 | 20.4 | −7.56 |
| 12 | | −7.904 | ASP | 0.070 | | | | |
| 13 | Lens 6 | 2.226 | ASP | 0.526 | Plastic | 1.535 | 55.8 | 6.33 |
| 14 | | 5.963 | ASP | 0.387 | | | | |
| 15 | Lens 7 | 1.535 | ASP | 0.344 | Plastic | 1.515 | 56.5 | −10.71 |
| 16 | | 1.109 | ASP | 0.604 | | | | |
| 17 | Filter | Plano | | 0.300 | Glass | 1.517 | 64.2 | — |
| 18 | | Plano | | 0.152 | | | | |
| 19 | Image | Plano | | — | | | | |

Reference wavelength is 587.6 nm (d-line).
Effective radius of Stop on Surface 8 is 1.763 mm.

TABLE 22

Aspheric Coefficients

| Surface # | 1 | 2 | 3 | 4 | 6 | 7 | 9 |
|---|---|---|---|---|---|---|---|
| k = | −9.0562E+00 | −4.6828E+00 | 8.7405E−02 | −8.9160E+01 | −1.8526E+01 | −8.4824E+00 | −1.1163E+01 |
| A3 = | −8.6248E−04 | 1.4391E−04 | | | | | |
| A4 = | −3.9326E−03 | −1.0429E−03 | −6.7713E−03 | −8.4732E−03 | 2.6788E−02 | 7.4099E−02 | −6.8304E−03 |
| A5 = | 1.8944E−03 | −1.8145E−03 | | | | | |
| A6 = | −1.2377E−03 | 3.3890E−03 | −6.7049E−04 | −6.4840E−03 | −5.7500E−02 | −8.8577E−02 | 3.0264E−03 |
| A7 = | 1.0417E−03 | 6.5406E−04 | | | | | |
| A8 = | −3.0819E−04 | −1.3946E−03 | 1.4114E−03 | 8.6484E−03 | 5.2807E−02 | 7.4679E−02 | −6.3994E−03 |
| A9 = | 4.3531E−05 | 2.5913E−04 | | | | | |
| A10 = | −2.4024E−05 | 9.4821E−05 | −1.0767E−03 | −4.6388E−03 | −2.6729E−02 | −3.7055E−02 | 4.5420E−03 |
| A11 = | 1.1651E−05 | −8.2252E−06 | | | | | |
| A12 = | −2.2147E−06 | −1.5379E−05 | 3.7447E−04 | 1.3421E−03 | 7.7134E−03 | 1.0535E−02 | −2.2192E−03 |
| A13 = | 1.4418E−07 | 4.5189E−06 | | | | | |
| A14 = | | −4.4546E−07 | −6.6263E−05 | −2.0356E−04 | −1.1731E−03 | −1.4880E−03 | 5.5156E−04 |
| A15 = | | −2.9800E−08 | | | | | |
| A16 = | | 1.5030E−08 | 4.7067E−06 | 1.2757E−05 | 7.1153E−05 | 7.2791E−05 | −4.9777E−05 |

TABLE 22-continued

| Aspheric Coefficients | | | | | | | |
|---|---|---|---|---|---|---|---|
| Surface # | 10 | 11 | 12 | 13 | 14 | 15 | 16 |
| k = | −5.0356E+01 | 1.2682E−01 | −5.8572E−01 | −9.8567E−01 | −5.1719E+01 | −1.0103E+00 | −3.1850E+00 |
| A3 = | | | | | | −4.5296E−02 | −2.1214E−03 |
| A4 = | −5.8484E−02 | −4.9804E−02 | −1.4361E−01 | −6.4281E−02 | 1.1283E−01 | −2.5334E−01 | −1.5165E−01 |
| A5 = | | | | | | −3.0848E−04 | 2.9316E−03 |
| A6 = | 8.5721E−03 | 4.3426E−02 | 1.1426E−01 | 2.0426E−02 | −9.8732E−02 | 9.3517E−02 | 6.8228E−02 |
| A7 = | | | | | | −6.4006E−05 | −4.2874E−05 |
| A8 = | −8.0382E−03 | −2.1892E−02 | −5.3551E−02 | −2.0452E−02 | 4.2128E−02 | −1.9317E−02 | −2.2818E−02 |
| A9 = | | | | | | 5.7297E−06 | −1.3716E−05 |
| A10 = | 7.5305E−03 | 1.3023E−02 | 1.9335E−02 | 9.2781E−03 | −1.1660E−02 | 2.6526E−03 | 5.1509E−03 |
| A11 = | | | | | | 5.4323E−07 | 1.3162E−07 |
| A12 = | −3.0725E−03 | −4.8794E−03 | −4.8637E−03 | −2.3388E−03 | 1.9621E−03 | −2.4048E−04 | −7.2807E−04 |
| A13 = | | | | | | 8.5096E−09 | 1.2847E−08 |
| A14 = | 5.7538E−04 | 9.4158E−04 | 7.3101E−04 | 2.3959E−04 | −1.7614E−04 | 1.2951E−05 | 6.0294E−05 |
| A15 = | | | | | | −6.4340E−09 | 1.9760E−10 |
| A16 = | −4.2163E−05 | −7.3580E−05 | −4.7561E−05 | −2.6062E−07 | 6.3958E−06 | −3.1259E−07 | −2.6297E−06 |
| A17 = | | | | | | | 1.5564E−08 |
| A18 = | | | | | | | 4.0877E−08 |

In the 11th embodiment, the equation of the aspheric surface profiles of the aforementioned lens elements is the same as the equation of the 1st embodiment, wherein k represents the conic coefficient of the equation of the aspheric surface profiles, and A3-A18 represent the aspheric coefficients ranging from the 3th order to the 18th order. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 4.09 | f1/f4 | 136.92 |
| Fno | 1.12 | f3/f1 | −0.01 |
| HFOV [deg.] | 37.9 | tan(HFOV) | 0.78 |
| T23/CT2 | 0.06 | f/EPD | 1.12 |
| T67/CT6 | 0.74 | TL/EPD | 2.25 |
| (T23 + T34 + T45 + T67)/(T12 + T56) | 7.75 | TL/ImgH | 2.55 |
| R1/R6 | −2.53 | TL [mm] | 8.20 |
| R4/R1 | −21.40 | SD/TD | 0.59 |
| |R5/R6| | 1.55 | CRAmax [deg.] | 31.82 |
| R14/R13 | 0.72 | (TL × f)/(EPD × ImgH) | 2.87 |
| R14/EPD | 0.30 | Yc72/Yc62 | 0.94 |
| R3/TD | 0.37 | Yc72/f | 0.35 |
| |f/f2| | 0.84 | | |

Furthermore, according to the 11th embodiment, each of at least two of the first lens element 1110, the second lens element 1120, the third lens element 1130, the fourth lens element 1140, the fifth lens element 1150, the sixth lens element 1160 and the seventh lens element 1170 has an Abbe number which is smaller than 25.0; in detail, the Abbe numbers of the third lens element 1130 and the fifth lens element 1150 are smaller than 25.0.

According to the 11th embodiment, a number of inflection points on each of object-side surfaces and image-side surfaces of the first lens element 1110, the second lens element 1120, the third lens element 1130, the fourth lens element 1140, the fifth lens element 1150, the sixth lens element 1160 and the seventh lens element 1170 is listed as follows.

| 11th Embodiment - Numbers of inflection points | | | | | | | |
|---|---|---|---|---|---|---|---|
| | 1110 | 1120 | 1130 | 1140 | 1150 | 1160 | 1170 |
| Object-side surface | 1 | 0 | 1 | 2 | 2 | 2 | 2 |
| Image-side surface | 1 | 2 | 0 | 0 | 1 | 3 | 1 |

12th Embodiment

Figure 23:
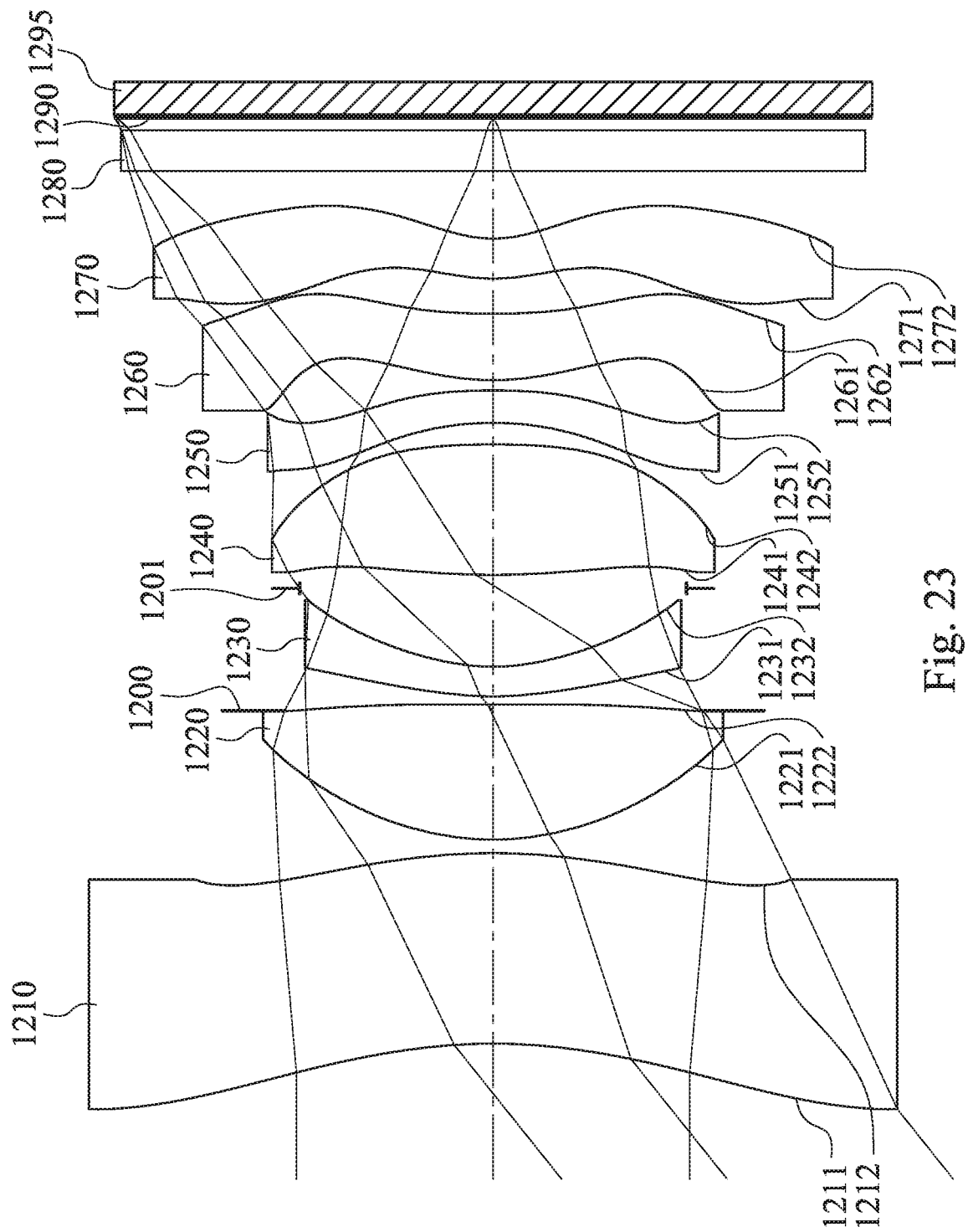
FIG. 23 is a schematic view of an imaging apparatus according to the 12th embodiment of the present disclosure.
Figure 24:
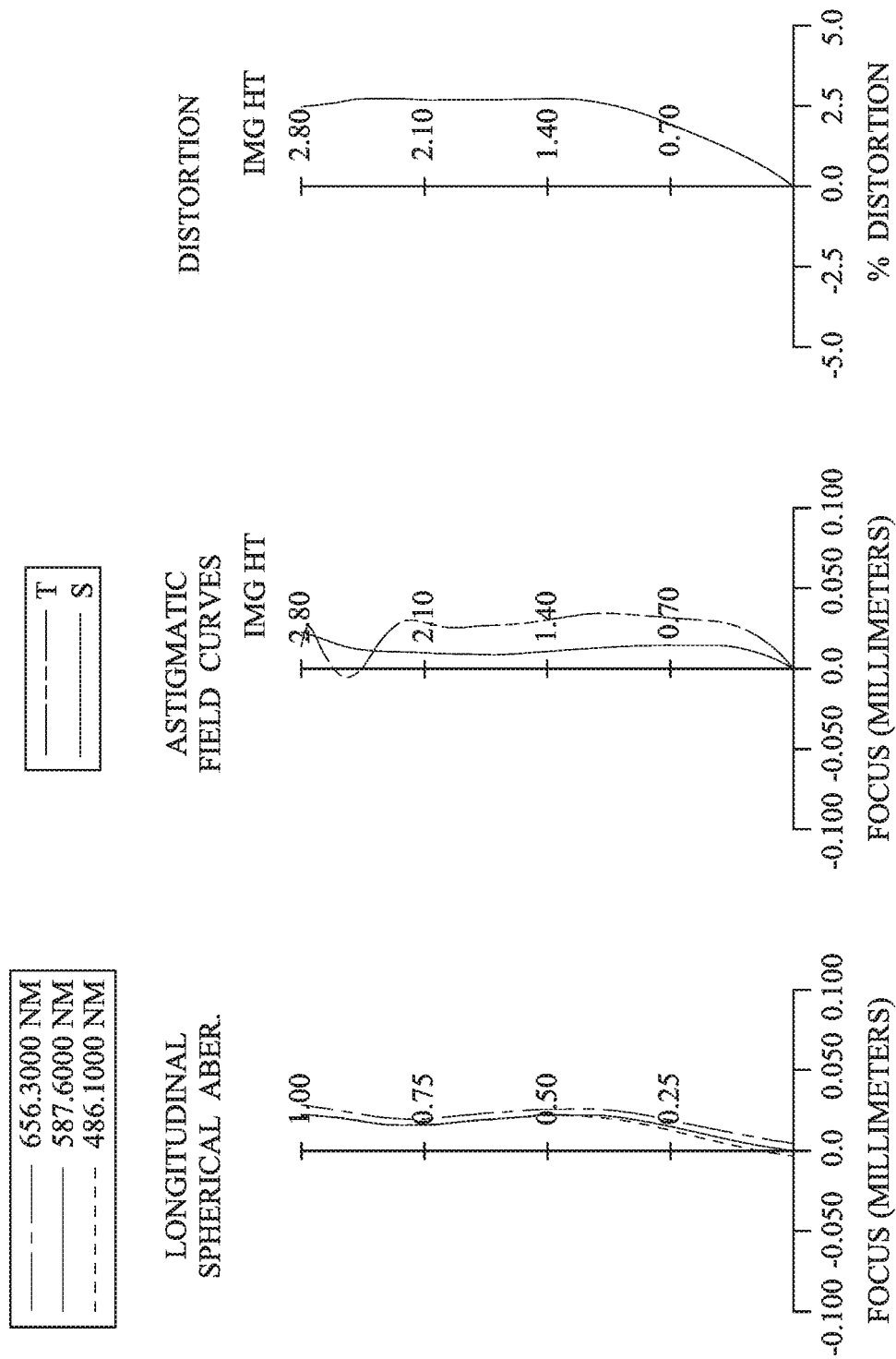
FIG. 24 shows spherical aberration curves, astigmatic field curves and a distortion curve of the imaging apparatus according to the 12th embodiment.

FIG. 23 is a schematic view of an imaging apparatus according to the 12th embodiment of the present disclosure. FIG. 24 shows spherical aberration curves, astigmatic field curves and a distortion curve of the imaging apparatus according to the 12th embodiment. In FIG. 23, the imaging apparatus includes an image capturing optical system (its reference numeral is omitted) and an image sensor 1295. The image capturing optical system includes, in order from an object side to an image side, a first lens element 1210, a second lens element 1220, an aperture stop 1200, a third lens element 1230, a stop 1201, a fourth lens element 1240, a fifth lens element 1250, a sixth lens element 1280, a seventh lens element 1270, a filter 1280 and an image surface 1290, wherein the image sensor 1295 is disposed on the image surface 1290 of the image capturing optical system. The image capturing optical system includes seven lens elements (1210, 1220, 1230, 1240, 1250, 1260 and 1270) without additional one or more lens elements inserted between the first lens element 1210 and the seventh lens element 1270, and each of the seven lens elements has an object-side surface towards the object side and an image-side surface towards the image side.

The first lens element 1210 with negative refractive power has an object-side surface 1211 being concave in a paraxial region thereof and an image-side surface 1212 being convex in a paraxial region thereof. The first lens element 1210 is made of a plastic material, and has the object-side surface 1211 and the image-side surface 1212 being both aspheric. Furthermore, each of the object-side surface 1211 and the image-side surface 1212 of the first lens element 1210 includes at least one inflection point.

The second lens element 1220 with positive refractive power has an object-side surface 1221 being convex in a paraxial region thereof and an image-side surface 1222 being concave in a paraxial region thereof. The second lens element 1220 is made of plastic material, and has the object-side surface 1221 and the image-side surface 1222 being both aspheric.

Furthermore, the image-side surface 1222 of the second lens element 1220 includes at least one inflection point.

The third lens element 1230 with negative refractive power has an object-side surface 1231 being convex in a paraxial region thereof and an image-side surface 1232 being concave in a paraxial region thereof. The third lens element 1230 is made of plastic material, and has the object-side surface 1231 and the image-side surface 1232 being both aspheric. Furthermore, the object-side surface 1231 of the third lens element 1230 includes at least one inflection point.

The fourth lens element 1240 with positive refractive power has an object-side surface 1241 being convex in a paraxial region thereof and an image-side surface 1242 being convex in a paraxial region thereof. The fourth lens element 1240 is made of plastic material, and has the object-side surface 1241 and the image-side surface 1242 being both aspheric. Furthermore, the object-side surface 1241 of the fourth lens element 1240 includes at least one inflection point.

The fifth lens element 1250 with negative refractive power has an object-side surface 1251 being concave in a paraxial region thereof and an image-side surface 1252 being convex in a paraxial region thereof. The fifth lens element 1250 is made of plastic material, and has the object-side surface 1251 and the image-side surface 1252 being both aspheric. Furthermore, each of the object-side surface 1251 and the image-side surface 1252 of the fifth lens element 1250 includes at least one inflection point.

The sixth lens element 1260 with positive refractive power has an object-side surface 1261 being convex in a paraxial region thereof and an image-side surface 1262 being concave in a paraxial region thereof. The sixth lens element 1260 is made of plastic material, and has the object-side surface 1261 and the image-side surface 1262 being both aspheric. Furthermore, each of the object-side surface 1261 and the image-side surface 1262 of the sixth lens element 1260 includes at least one inflection point.

The seventh lens element 1270 with negative refractive power has an object-side surface 1271 being convex in a paraxial region thereof and an image-side surface 1272 being concave in a paraxial region thereof. The seventh lens element 1270 is made of plastic material, and has the object-side surface 1271 and the image-side surface 1272 being both aspheric. Furthermore, each of the object-side surface 1271 and the image-side surface 1272 of the seventh lens element 1270 includes at least one inflection point.

The filter 1280 is made of a glass material and located between the seventh lens element 1270 and the image surface 1290, and will not affect the focal length of the image capturing optical system.

The detailed optical data of the 12th embodiment are shown in Table 23 and the aspheric surface data are shown in Table 24 below.

TABLE 23

12th Embodiment
f = 3.40 mm, Fno = 1.17, HFOV = 38.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −4.276 | ASP | 1.408 | Plastic | 1.544 | 55.9 | −1511.84 |
| 2 | | −4.797 | ASP | 0.100 | | | | |
| 3 | Lens 2 | 2.123 | ASP | 0.998 | Plastic | 1.544 | 55.9 | 3.99 |
| 4 | | 78.298 | ASP | −0.045 | | | | |
| 5 | Ape. Stop | Plano | | 0.105 | | | | |
| 6 | Lens 3 | 2.568 | ASP | 0.220 | Plastic | 1.650 | 21.4 | −7.57 |
| 7 | | 1.630 | ASP | 0.579 | | | | |
| 8 | Stop | Plano | | 0.100 | | | | |
| 9 | Lens 4 | 6.012 | ASP | 0.964 | Plastic | 1.544 | 55.9 | 6.00 |
| 10 | | −6.735 | ASP | 0.159 | | | | |
| 11 | Lens 5 | −2.511 | ASP | 0.239 | Plastic | 1.660 | 20.4 | −6.49 |
| 12 | | −6.296 | ASP | 0.077 | | | | |
| 13 | Lens 6 | 1.967 | ASP | 0.491 | Plastic | 1.535 | 55.8 | 4.90 |
| 14 | | 7.209 | ASP | 0.259 | | | | |
| 15 | Lens 7 | 1.345 | ASP | 0.296 | Plastic | 1.514 | 56.8 | −6.88 |
| 16 | | 0.902 | ASP | 0.500 | | | | |
| 17 | Filter | Plano | | 0.300 | Glass | 1.517 | 64.2 | — |
| 18 | | Plano | | 0.102 | | | | |
| 19 | Image | Plano | | — | | | | |

Reference wavelength is 587.6 nm (d-line).
Effective radius of Stop on Surface 8 is 1.429 mm.

TABLE 24

| Aspheric Coefficients | | | | | | | |
|---|---|---|---|---|---|---|---|
| Surface # | 1 | 2 | 3 | 4 | 6 | 7 | 9 |
| k = | −1.0336E+01 | −4.8911E+00 | 7.5182E−02 | −8.9163E+01 | −1.8836E+01 | −8.3693E+00 | −1.3965E+01 |
| A4 = | −6.1168E−03 | −4.1378E−03 | −1.6214E−02 | −2.5152E−02 | 2.8691E−02 | 1.1666E−01 | −1.3971E−02 |
| A6 = | 2.2705E−03 | 8.0834E−03 | 3.3299E−03 | 1.1885E−03 | −1.0962E−01 | −2.0328E−01 | 2.2231E−03 |

TABLE 24-continued

| Aspheric Coefficients | | | | | | | |
|---|---|---|---|---|---|---|---|
| A8 = | −3.3810E−04 | −3.3598E−03 | 1.2189E−04 | 1.4917E−02 | 1.6781E−01 | 2.8203E−01 | −9.7267E−03 |
| A10 = | 3.6591E−05 | 9.3720E−04 | −2.9601E−03 | −1.5655E−02 | −1.3755E−01 | −2.3466E−01 | 6.2497E−03 |
| A12 = | −2.4815E−06 | −1.4074E−04 | 2.1243E−03 | 7.8294E−03 | 6.3950E−02 | 1.1545E−01 | −5.7454E−03 |
| A14 = | 7.5194E−08 | 9.2973E−06 | −6.7329E−04 | −1.9759E−03 | −1.5691E−02 | −2.9794E−02 | 2.8747E−03 |
| A16 = | | | 8.3676E−05 | 2.0347E−04 | 1.5220E−03 | 2.9933E−03 | −4.5591E−04 |

| Surface # | 10 | 11 | 12 | 13 | 14 | 15 | 16 |
|---|---|---|---|---|---|---|---|
| k = | −3.6640E+01 | 1.4660E−01 | −3.2016E+00 | −9.8537E−01 | −7.5094E+01 | −1.0504E+00 | −3.2084E+00 |
| A3 = | | | | | | −5.4324E−02 | −8.0092E−03 |
| A4 = | −1.0230E−01 | −9.9460E−02 | −2.5508E−01 | −1.0658E−01 | 2.0337E−01 | −4.4762E−01 | −2.5934E−01 |
| A5 = | | | | | | 9.3715E−05 | 5.1347E−03 |
| A6 = | 1.7852E−02 | 1.4157E−01 | 3.0897E−01 | 5.2130E−02 | −2.4862E−01 | 2.4081E−01 | 1.7496E−01 |
| A7 = | | | | | | −1.8195E−04 | −7.5449E−05 |
| A8 = | −3.2106E−02 | −1.1147E−01 | −2.1989E−01 | −7.7200E−02 | 1.5320E−01 | −7.2523E−02 | −8.5645E−02 |
| A9 = | | | | | | 1.8592E−05 | −6.2764E−05 |
| A10 = | 4.6440E−02 | 8.6512E−02 | 1.1809E−01 | 5.0769E−02 | −6.1761E−02 | 1.4527E−02 | 2.8214E−02 |
| A11 = | | | | | | 2.2374E−06 | 1.9051E−07 |
| A12 = | −2.8027E−02 | −4.3259E−02 | −4.3563E−02 | −1.8679E−02 | 1.5190E−02 | −1.9227E−03 | −5.8200E−03 |
| A13 = | | | | | | −1.7478E−08 | 5.4506E−08 |
| A14 = | 7.7524E−03 | 1.1553E−02 | 9.5340E−03 | 2.8080E−03 | −1.9942E−03 | 1.5107E−04 | 7.0330E−04 |
| A15 = | | | | | | −7.1949E−08 | 1.2170E−10 |
| A16 = | −8.4493E−04 | −1.2801E−03 | −9.0280E−04 | −5.2037E−06 | 1.0596E−04 | −5.3059E−06 | −4.4355E−05 |
| A17 = | | | | | | | −5.0357E−09 |
| A18 = | | | | | | | 1.0820E−06 |

In the 12th embodiment, the equation of the aspheric surface profiles of the aforementioned lens elements is the same as the equation of the 1st embodiment, wherein k represents the conic coefficient of the equation of the aspheric surface profiles, and A3-A18 represent the aspheric coefficients ranging from the 3th order to the 18th order. Also, the definitions of these parameters shown in the following table are the same as those stated in the 1st embodiment with corresponding values for the 12th embodiment, so an explanation in this regard will not be provided again.

Moreover, these parameters can be calculated from Table 23 and Table 24 as the following values and satisfy the following conditions:

| 12th Embodiment | | | |
|---|---|---|---|
| f [mm] | 3.40 | f1/f4 | −252.09 |
| Fno | 1.17 | f3/f1 | 0.01 |
| HFOV [deg.] | 38.7 | tan(HFOV) | 0.80 |
| T23/CT2 | 0.06 | f/EPD | 1.17 |
| T67/CT6 | 0.53 | TL/EPD | 2.36 |
| (T23 + T34 + T45 + T67)/(T12 + T56) | 6.54 | TL/ImgH | 2.45 |
| R1/R6 | −2.62 | TL [mm] | 6.85 |
| R4/R1 | −18.31 | SD/TD | 0.59 |
| |R5/R6| | 1.58 | CRAmax [deg.] | 33.45 |
| R14/R13 | 0.67 | (TL × f)/(EPD × ImgH) | 2.86 |
| R14/EPD | 0.31 | Yc72/Yc62 | 0.95 |
| R3/TD | 0.36 | Yc72/f | 0.36 |
| |f/f2| | 0.85 | | |

Furthermore, according to the 12th embodiment, each of at least two the first lens element 1210, the second lens element 1220, the third lens element 1230, the fourth lens element 1240, the fifth lens element 1250, the sixth lens element 1260 and the seventh lens element 1270 has an Abbe number which is smaller than 25.0; In detail, the Abbe numbers of the third lens element 1230 and the fifth lens element 1250 are smaller than 25.0.

According to the 12th embodiment, a number of inflection points on each of object-side surfaces and image-side surfaces of the first lens element 1210, the second lens element 1220, the third lens element 1230, the fourth lens element 1240, the fifth lens element 1250, the sixth lens element 1260 and the seventh lens element 1270 is listed as follows.

| 12th Embodiment - Numbers of inflection points | | | | | | | |
|---|---|---|---|---|---|---|---|
| | 1210 | 1220 | 1230 | 1240 | 1250 | 1260 | 1270 |
| Object-side surface | 1 | 0 | 1 | 2 | 2 | 2 | 3 |
| Image-side surface | 1 | 2 | 0 | 0 | 1 | 3 | 1 |

13th Embodiment

Figure 27:
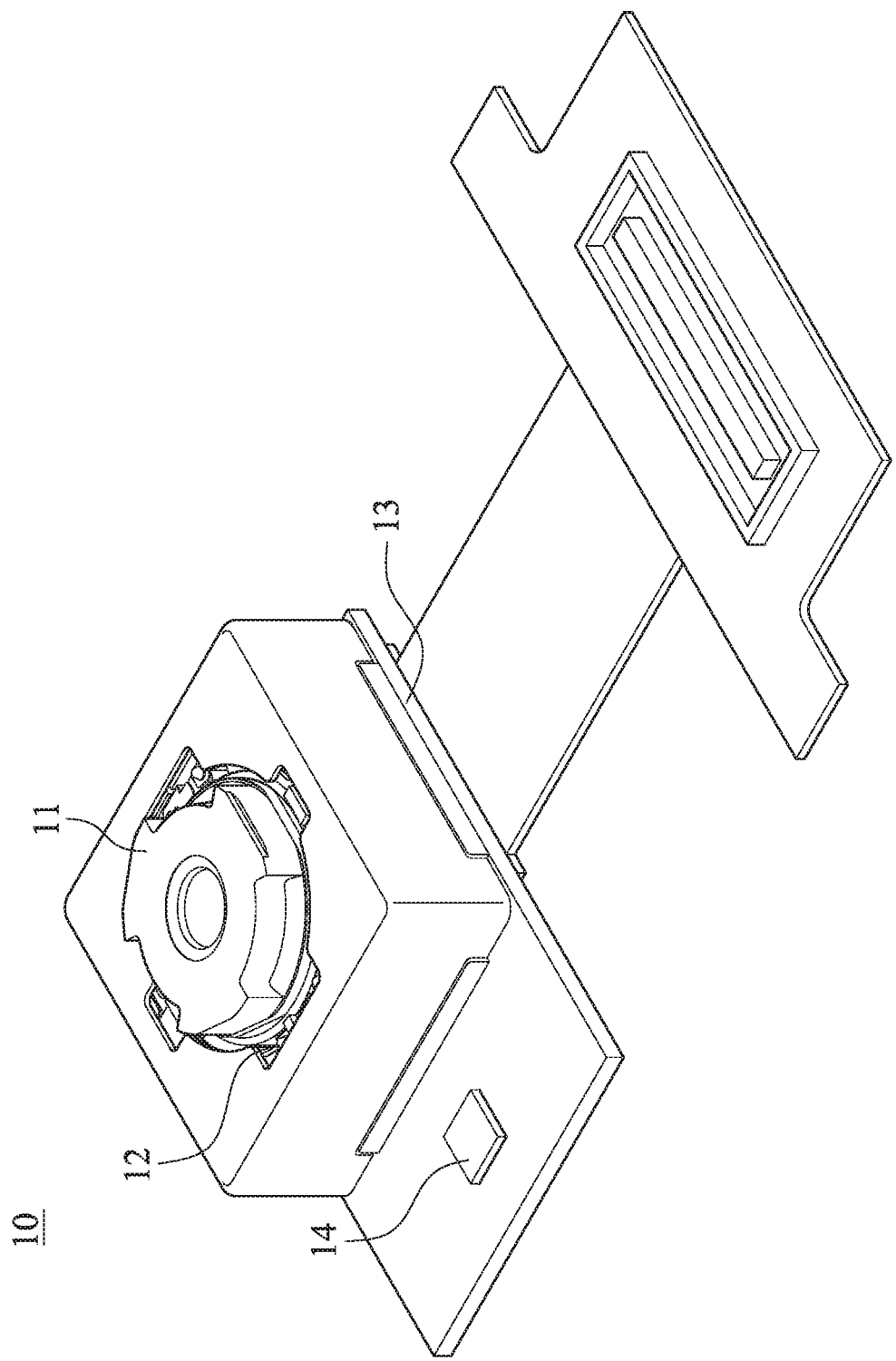
FIG. 27 is a three-dimensional schematic view of an imaging apparatus according to the 13th embodiment of the present disclosure.

FIG. 27 is a three-dimensional schematic view of an imaging apparatus according to the 13th embodiment of the present disclosure. In FIG. 27, the imaging apparatus 10 of the 13th embodiment is a camera module, the imaging apparatus 10 includes an imaging lens assembly 11, a driving apparatus 12 and an image sensor 13, wherein the imaging lens assembly 11 includes the image capturing optical system of the 1st embodiment and a lens barrel (not shown in drawings) for carrying the image capturing optical system. The imaging apparatus 10 can focus light from an imaged object via the imaging lens assembly 11, perform image focusing by the driving apparatus 12, and generate an image on the image sensor 13, and the imaging information can be transmitted.

The driving apparatus 12 can be an auto-focus module, which can be driven by driving systems, such as voice coil motors (VCM), micro electro-mechanical systems (MEMS), piezoelectric systems, and shape memory alloys etc. The image capturing optical system can obtain a favorable imaging position by the driving apparatus 12 so as to capture clear images when the imaged object is disposed at different object distances.

The imaging apparatus 10 can include the image sensor 13 disposed on the image surface of the image capturing optical system, such as CMOS and CCD, which has superior photosensitivity and low noise, thus it is favorable for providing realistic images with high definition image quality thereof.

Moreover, the imaging apparatus 10 can further include an image stabilization module 14, which can be a kinetic energy sensor, such as an accelerometer, a gyroscope, and a Hall effect sensor. In the 13th embodiment, the image stabilization module 14 is a gyroscope, but is not limited thereto. Therefore, the variation of different axial directions of the image capturing optical system can adjusted so as to compensate the image blur generated by motion at the moment of exposure, and it is further favorable for enhancing the image quality while photographing in motion and low light situation. Furthermore, advanced image compensation functions, such as optical image stabilizations (OIS) and electronic image stabilizations (EIS) etc., can be provided.

14th Embodiment

Figure 28A:
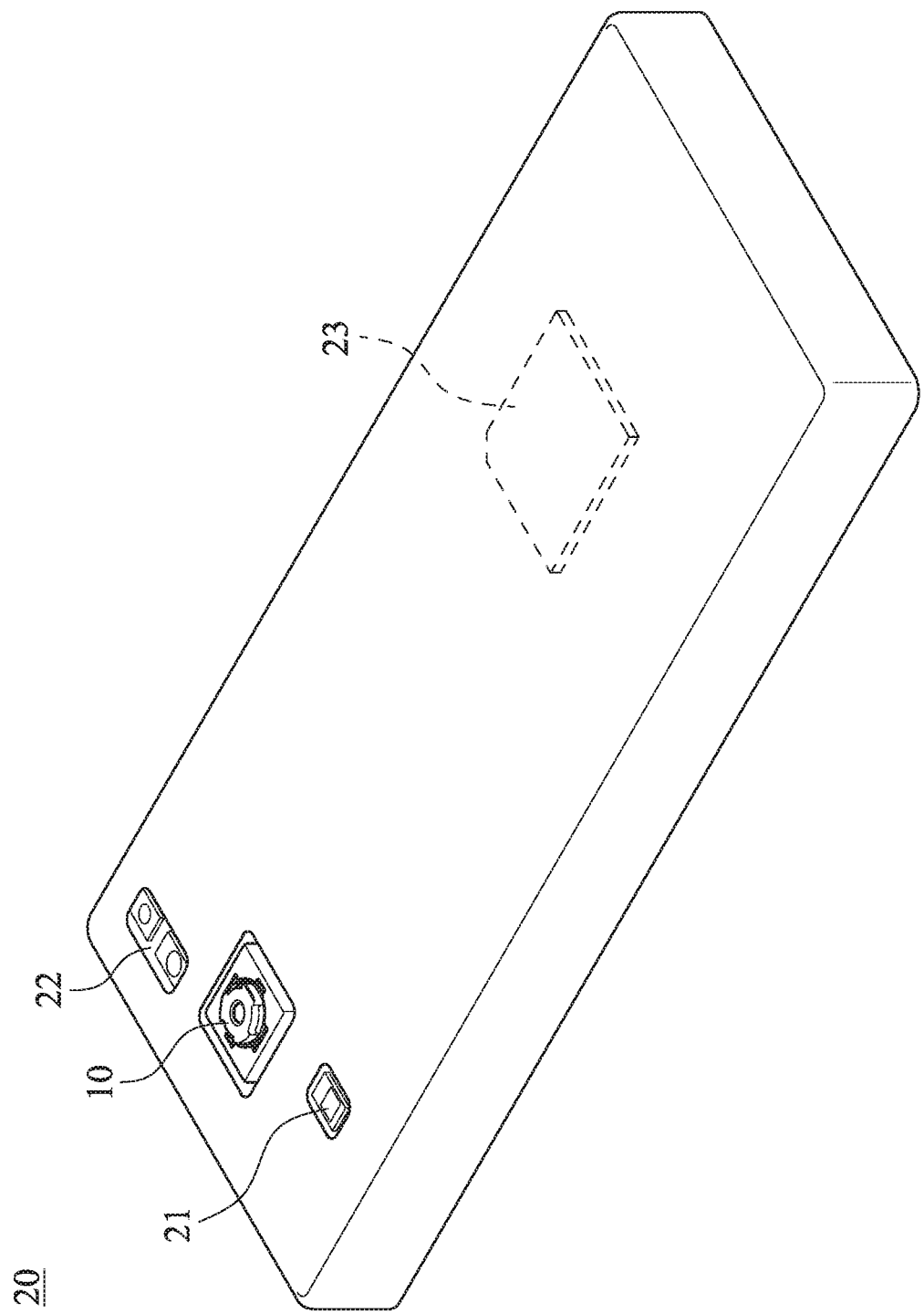
FIG. 28A is a schematic view of one side of an electronic device according to the 14th embodiment of the present disclosure.
Figure 28B:
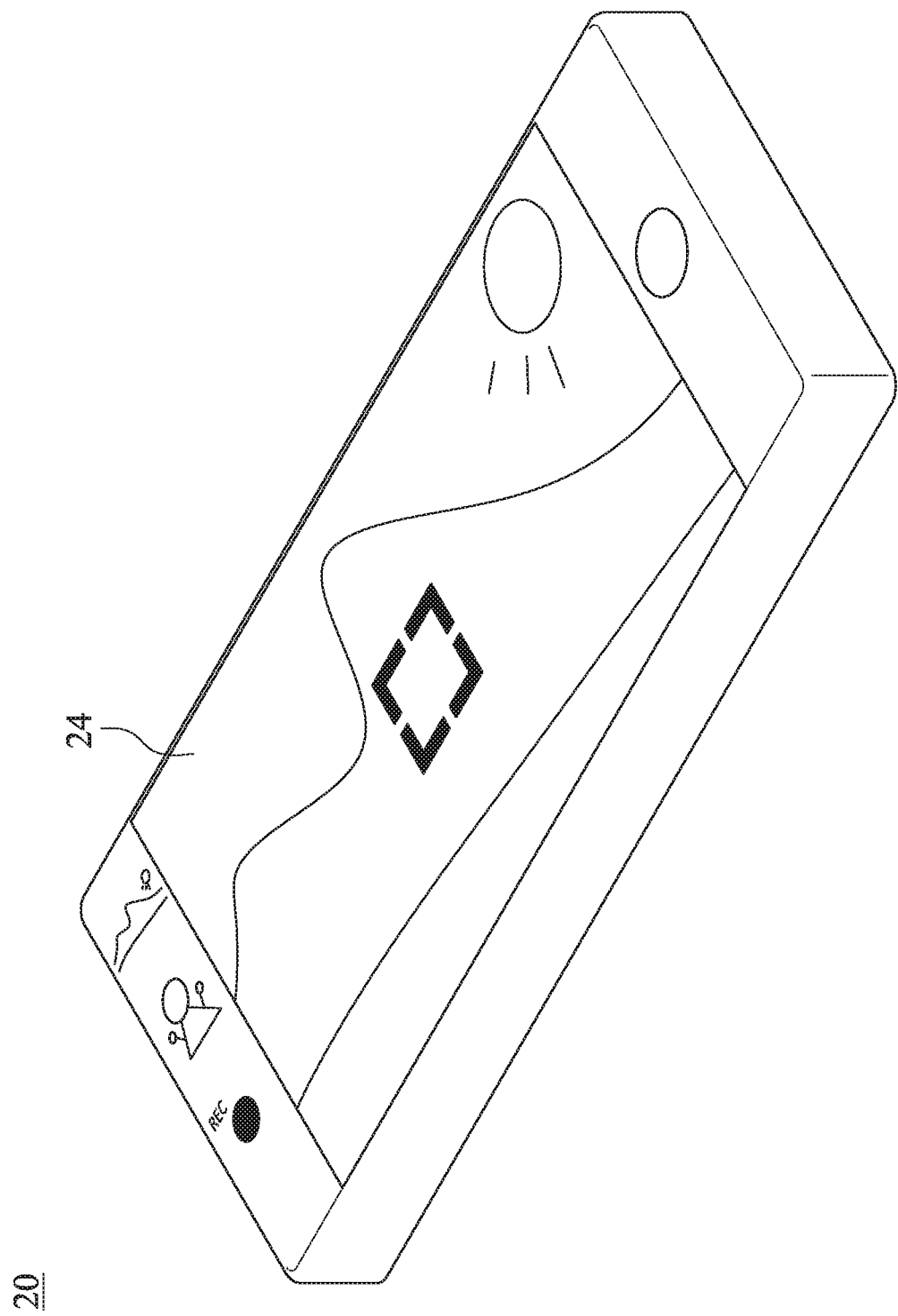
FIG. 28B is a schematic view of another side of the electronic device of FIG. 28A.
Figure 28C:
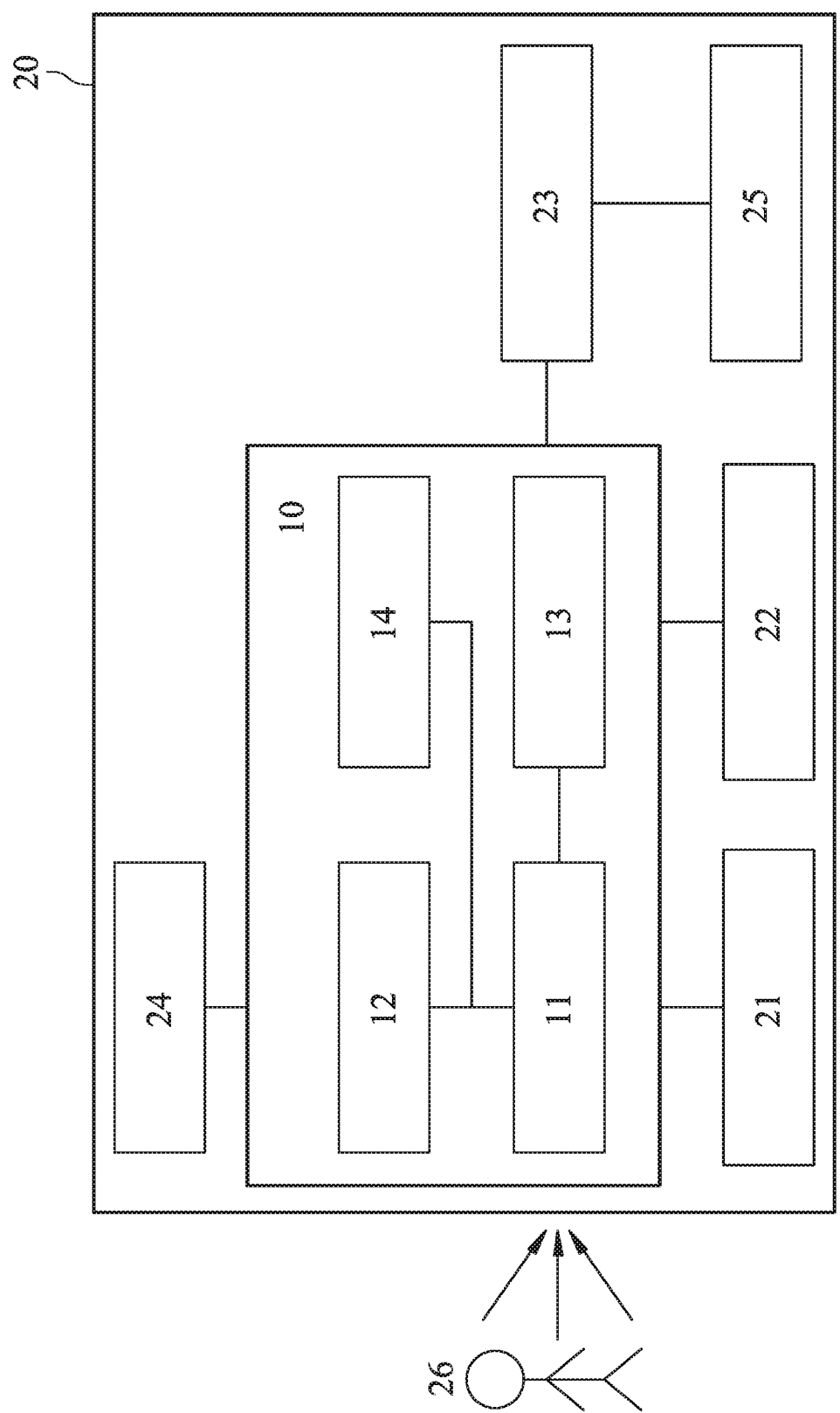
FIG. 28C is a system schematic view of the electronic device of FIG. 28A.

FIG. 28A is a schematic view of one side of an electronic device 20 according to the 14th embodiment of the present disclosure. FIG. 28B is a schematic view of another side of the electronic device 20 of FIG. 28A. FIG. 28C is a system schematic view of the electronic device 20 of FIG. 28A. In FIGS. 28A, 28B and 28C, the electronic device 20 according to the 14th embodiment is a smartphone; the electronic device 20 includes the imaging apparatus 10, a flash module 21, a focusing assisting module 22, an image signal processor 23, a user interface 24 and an image software processor 25. When the user captures images of an imaged object 26 via the user interface 24, the electronic device 20 focuses and generates an image via the imaging apparatus 10 while compensating for low illumination via the flash module 21. Then, the electronic device 20 quickly focuses on the imaged object according to its object distance information provided by the focusing assisting module 22, and optimizes the image via the image signal processor 23 (ISP) and the image software processor 25. Thus, the image quality can be further enhanced. The focusing assisting module 22 can adopt infrared or laser for obtaining quick focusing, and the user interface 24 can utilize a touch screen or a physical button for capturing and processing the image with various functions of the image processing software.

The imaging apparatus 10 according to the 14th embodiment is the same as the imaging apparatus 10 according to the 13th embodiment, and will not describe again herein.

15th Embodiment

Figure 29:
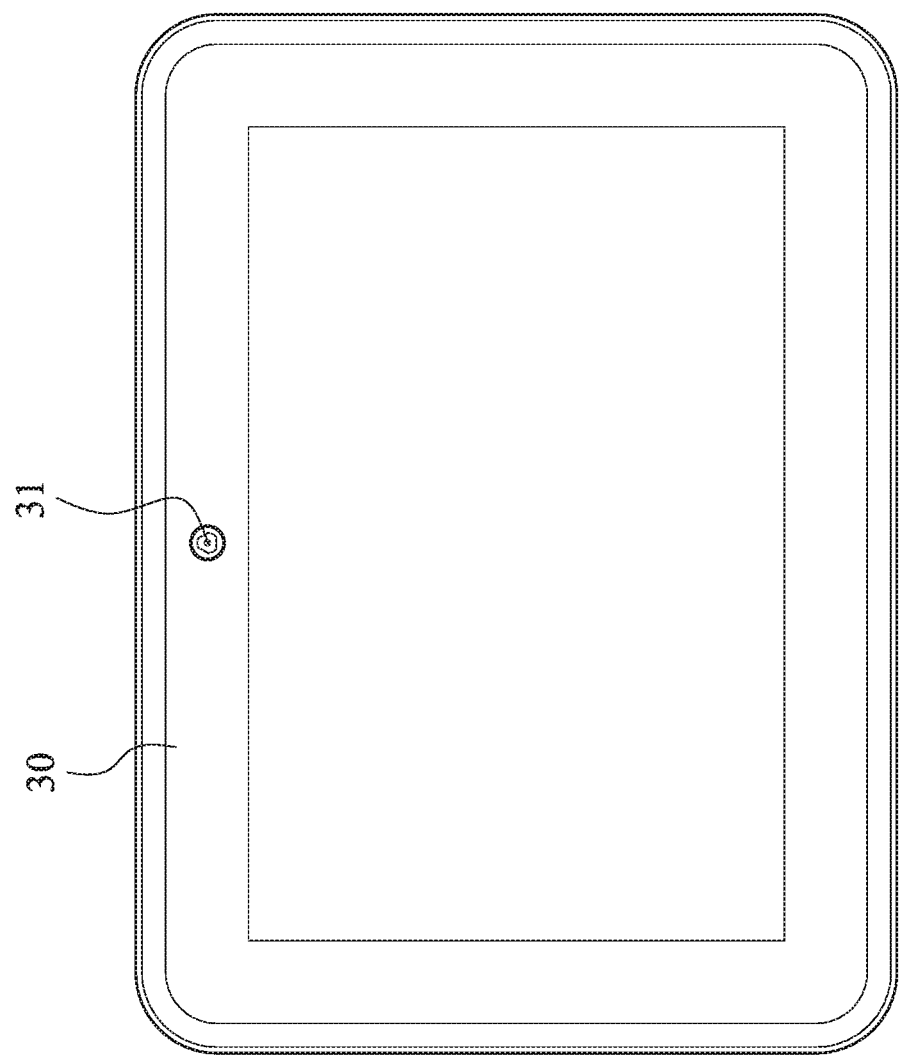
FIG. 29 is a schematic view of an electronic device according to the 15th embodiment of the present disclosure.

FIG. 29 is a schematic view of an electronic device 30 according to the 15th embodiment of the present disclosure. The electronic device 30 of the 15th embodiment is a tablet personal computer, wherein the electronic device 30 includes an imaging apparatus 31, wherein the imaging apparatus 31 is the same as stated in the 13th embodiment, and will not describe again herein.

16th Embodiment

Figure 30:
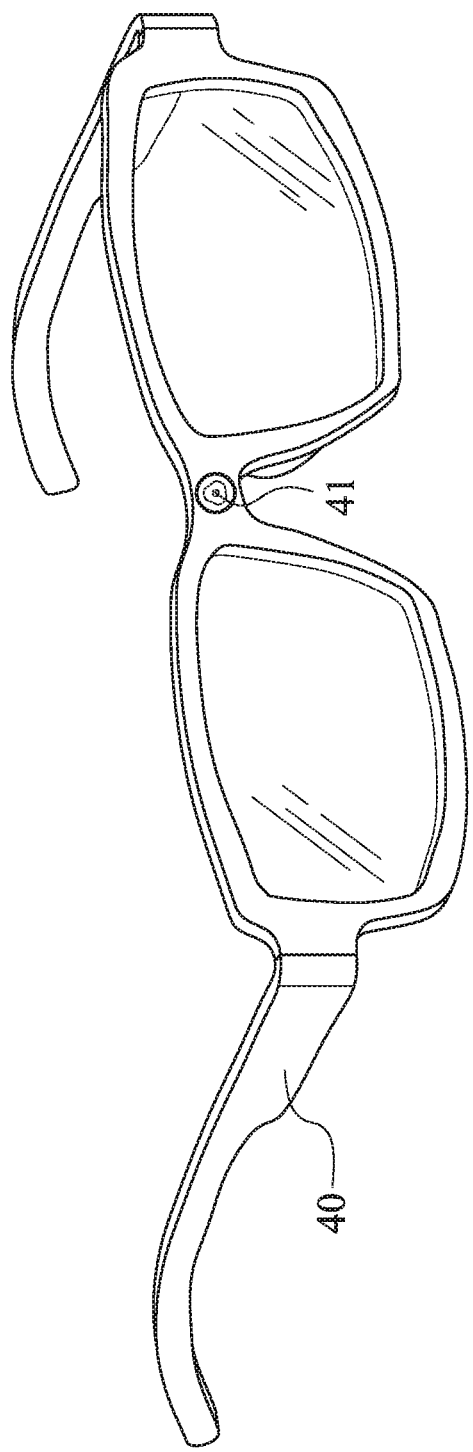
FIG. 30 is a schematic view of an electronic device according to the 16th embodiment of the present disclosure.

FIG. 30 is a schematic view of an electronic device 40 according to the 16th embodiment of the present disclosure. The electronic device 40 of the 16th embodiment is a wearable device, wherein the electronic device 40 includes an imaging apparatus 41, wherein the imaging apparatus 41 is the same as stated in the 13th embodiment, and will not describe again herein.

The foregoing description, for purpose of explanation, has been described with reference to specific embodiments. It is to be noted that Tables 1–24 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing optical system comprising seven lens elements, the seven lens elements being, in order from an object side to an image side:
  a first lens element, a second lens element, a third lens element, a fourth lens element, a fifth lens element, a sixth lens element and a seventh lens element;
  wherein each of the seven lens elements has an object-side surface facing towards the object side and an image-side surface facing towards the image side;
  wherein the first lens element has positive refractive power, the second lens element has negative refractive power, the image-side surface of the sixth lens element is concave in a paraxial region thereof, and the object-side surface of the seventh lens element is concave in a paraxial region thereof;
  wherein each of at least three of the seven lens elements has at least one aspheric surface; at least one surface of the seven lens elements comprises at least one inflection point; each of at least two of the seven lens elements has an Abbe number smaller than 25.0;
  wherein an axial distance between the object-side surface of the first lens element and an image surface is TL, an entrance pupil diameter of the image capturing optical system is EPD, an axial distance between the sixth lens element and the seventh lens element is T67, a central thickness of the sixth lens element is CT6, and the following conditions are satisfied:

$1.15 < TL/EPD < 2.0$; and $0.70 < T67/CT6 < 5.50$.

2. The image capturing optical system of claim 1, wherein the object-side surface of the first lens element is convex in a paraxial region thereof, the image-side surface of the first lens element is concave in a paraxial region thereof; the axial distance between the object-side surface of the first lens element and the image surface is TL, a maximum image height of the image capturing optical system is ImgH, and the following condition is satisfied:

$TL/ImgH \leq 1.51$.

3. The image capturing optical system of claim 1, wherein the axial distance between the object-side surface of the first lens element and the image surface is TL, a focal length of the image capturing optical system is f, the entrance pupil diameter of the image capturing optical system is EPD, a maximum image height of the image capturing optical system is ImgH, and the following condition is satisfied:

$(TL \times f)/(EPD \times ImgH) < 2.35$.

4. The image capturing optical system of claim 1, wherein each of at least three of the seven lens elements has an Abbe number smaller than 25.0.

5. The image capturing optical system of claim 1, wherein a maximum of chief ray angles of the image capturing optical system is CRAmax, and the following condition is satisfied:

35.0 degrees<CRAmax<50.0 degrees.

6. The image capturing optical system of claim 1, wherein a focal length of the image capturing optical system is f, a focal length of the second lens element is f2, the axial distance between the object-side surface of the first lens element and the image surface is TL, the entrance pupil diameter of the image capturing optical system is EPD, a maximum image height of the image capturing optical system is ImgH, and the following conditions are satisfied:

0.40<|f/f2|<1.20; and (TL×f)/(EPD×ImgH)<2.50.

7. An image capturing optical system comprising seven lens elements, the seven lens elements being, in order from an object side to an image side:
a first lens element, a second lens element, a third lens element, a fourth lens element, a fifth lens element, a sixth lens element and a seventh lens element;
wherein each of the seven lens elements has an object-side surface facing towards the object side and an image-side surface facing towards the image side;
wherein the first lens element has positive refractive power, the second lens element has negative refractive power, the image-side surface of the third lens element is convex in a paraxial region thereof, the image-side surface of the sixth lens element is concave in a paraxial region thereof, and the object-side surface of the seventh lens element is concave in a paraxial region thereof;
wherein each of at least three of the seven lens elements has at least one aspheric surface; at least one surface of the seven lens elements comprises at least one inflection point; each of at least two of the seven lens elements has an Abbe number smaller than 25.0;
wherein an axial distance between the object-side surface of the first lens element and an Image surface is TL, an entrance pupil diameter of the Image capturing optical system is EPD, an axial distance between the sixth lens element and the seventh lens element is T67, a central thickness of the sixth lens element is CT6, and the following conditions are satisfied:

1.05<TL/EPD<2.38; and 0.70<T67/CT8<5.50.

8. The Image capturing optical system of claim 7, wherein the object-side surface of the second lens element is convex in a paraxial region thereof, the image-side surface of the second lens element is concave in a paraxial region thereof; the seventh lens element has negative refractive power.

9. The image capturing optical system of claim 7, wherein each of at least three of the seven lens elements has an Abbe number smaller than 25.0.

10. The image capturing optical system of claim 7, wherein a vertical distance between a non-axial critical point on the image-side surface of the seventh lens element and an optical axis is Yc72, a focal length of the image capturing optical system is f, the axial distance between the object-side surface of the first lens element and the image surface is TL, the entrance pupil diameter of the image capturing optical system is EPD, and the following conditions are satisfied:

0.10<Yc72/f<0.85; and 1.10<TL/EPD<2.20.

11. The image capturing optical system of claim 7, wherein the axial distance between the object-side surface of the first lens element and the Image surface is TL, a maximum Image height of the Image capturing optical system is ImgH, and the following condition is satisfied:

TL/ImgH≤1.51.

12. An imaging apparatus, comprising:
the image capturing optical system of claim 7;
a driving apparatus connected to the image capturing optical system; and
an image sensor disposed on an Image surface of the image capturing optical system.

13. An electronic device, comprising:
the imaging apparatus of claim 12.

14. An image capturing optical system comprising seven lens elements, the seven lens elements being, in order from an object side to an Image side:
a first lens element, a second lens element, a third lens element, a fourth lens element, a fifth lens element, a sixth lens element and a seventh lens element;
wherein each of the seven lens elements has an object-side surface facing towards the object side and an image-side surface facing towards the image side;
wherein the first lens element has positive refractive power, the second lens element has negative refractive power, the image-side surface of the sixth lens element is concave in a paraxial region thereof, and the object-side surface of the seventh lens element is concave in a paraxial region thereof;
wherein each of at least three of the seven lens elements has at least one aspheric surface; at least one surface of the seven lens elements comprises at least one inflection point; each of at least two of the seven lens elements has an Abbe number smaller than 25.0;
wherein an axial distance between the object-side surface of the first lens element and an image surface is TL, an entrance pupil diameter of the image capturing optical system is EPD, an axial distance between the sixth lens element and the seventh lens element is T67, a central thickness of the sixth lens element is CT6, a half of a maximum field of view of the image capturing optical system is HFOV, and the following conditions are satisfied:

1.05<TL/EPD<2.38;

0.70<T67/CT6<5.50;

0.84≤tan(HFOV)<1.20; and

TL<7.5 mm.

15. The image capturing optical system of claim 14, wherein the object-side surface of the fourth lens element is concave in a paraxial region thereof.

16. The Image capturing optical system of claim 14, wherein the image-side surface of the seventh lens element is concave in a paraxial region thereof and comprises at least one convex surface in an off-axis region thereof.

17. The Image capturing optical system of claim 14, wherein the axial distance between the object-side surface of the first lens element and the Image surface is TL, a focal length of the image capturing optical system is f, the entrance pupil diameter of the Image capturing optical system is EPD, a maximum Image height of the image capturing optical system is ImgH, and the following condition is satisfied:

$(TL \times f)/(EPD \times ImgH) < 2.35$.

18. The image capturing optical system of claim 14, further comprising:
an aperture stop located on an object side of the second lens element, wherein the axial distance between the object-side surface of the first lens element and the Image surface is TL, a maximum Image height of the image capturing optical system is ImgH, an axial distance between the aperture stop and the image-side surface of the seventh lens element is SD, an axial distance between the object-side surface of the first lens element and the image-side surface of the seventh lens element is TD, and the following conditions are satisfied:

$TL/ImgH < 2.0$; and $0.80 < SD/TD < 0.98$.

19. The image capturing optical system of claim 14, wherein the axial distance between the sixth lens element and the seventh lens element is a maximum among axial distances between adjacent lens elements of the seven lens elements.

20. An Image capturing optical system comprising seven lens elements, the seven lens elements being, in order from an object side to an Image side:
a first lens element, a second lens element, a third lens element, a fourth lens element, a fifth lens element, a sixth lens element and a seventh lens element;
wherein each of the seven lens elements has an object-side surface facing towards the object side and an image-side surface facing towards the image side;
wherein the first lens element has positive refractive power, the second lens element has negative refractive power, the image-side surface of the second lens element is concave in a paraxial region thereof, the image-side surface of the sixth lens element is concave in a paraxial region thereof, and the object-side surface of the seventh lens element is concave in a paraxial region thereof;
wherein each of at least three of the seven lens elements has at least one aspheric surface; at least one surface of the seven lens elements comprises at least one inflection point; each of at least two of the seven lens elements has an Abbe number smaller than 25.0;
wherein an axial distance between the object-side surface of the first lens element and an image surface is TL, an entrance pupil diameter of the image capturing optical system is EPD, a half of a maximum field of view of the Image capturing optical system is HFOV, a focal length of the image capturing optical system is f, and the following conditions are satisfied:

$1.10 < TL/EPD < 2.20$;

$0.84 \leq \tan(HFOV) < 1.20$; and $0.75 < f/EPD < 1.65$.

21. The image capturing optical system of claim 20, wherein the third lens element has positive refractive power.

22. The Image capturing optical system of claim 20, wherein the seventh lens element has negative refractive power; the image capturing optical system further comprises an aperture stop, wherein an axial distance between the aperture stop and the image-side surface of the seventh lens element is SD, an axial distance between the object-side surface of the first lens element and the image-side surface of the seventh lens element is TD, and the following condition is satisfied:

$0.80 < SD/TD < 0.98$.

23. The image capturing optical system of claim 20, wherein the focal length of the Image capturing optical system is f, the entrance pupil diameter of the image capturing optical system is EPD, and the following condition is satisfied:

$0.85 < f/EPD < 1.55$.

24. The image capturing optical system of claim 20, wherein each of at least three of the seven lens elements has an Abbe number smaller than 25.0.

25. The Image capturing optical system of claim 20, wherein the axial distance between the object-side surface of the first lens element and the Image surface is TL, a maximum image height of the image capturing optical system is ImgH, the focal length of the Image capturing optical system is f, a focal length of the second lens element is f2, and the following conditions are satisfied:

$TL/ImgH < 2.0$;

$TL < 7.5$ mm; and $0.40 < |f/f2| < 1.20$.

* * * * *